(12) United States Patent
Marino et al.

(10) Patent No.: US 10,839,573 B2
(45) Date of Patent: Nov. 17, 2020

(54) APPARATUS, SYSTEMS, AND METHODS FOR INTEGRATING DIGITAL MEDIA CONTENT INTO OTHER DIGITAL MEDIA CONTENT

(71) Applicant: Adobe Inc., San Jose, CA (US)

(72) Inventors: William L. Marino, New York, NY (US); Brunno Fidel Maciel Attore, New York, NY (US); Johan Adami, New York, NY (US)

(73) Assignee: ADOBE INC., San Jose, CA (US)

( * ) Notice: Subject to any disclaimer, the term of this patent is extended or adjusted under 35 U.S.C. 154(b) by 55 days.

(21) Appl. No.: 15/466,135

(22) Filed: Mar. 22, 2017

(65) Prior Publication Data
US 2017/0278289 A1    Sep. 28, 2017

Related U.S. Application Data

(60) Provisional application No. 62/354,053, filed on Jun. 23, 2016, provisional application No. 62/311,472, (Continued)

(51) Int. Cl.
*G06K 9/00* (2006.01)
*G06T 11/60* (2006.01)
(Continued)

(52) U.S. Cl.
CPC .......... *G06T 11/60* (2013.01); *G06K 9/00765* (2013.01); *G06K 9/4642* (2013.01);
(Continued)

(58) Field of Classification Search
CPC .. G06K 9/00765; G06K 9/4642; G06T 11/60; G06T 2207/10004; G06T 2207/10016;
(Continued)

(56) References Cited

U.S. PATENT DOCUMENTS 5,430,808 A * 7/1995 Baird ................ G06K 9/00456
382/176
5,680,475 A * 10/1997 Zwierski ............... G06T 11/001
382/156
(Continued)

FOREIGN PATENT DOCUMENTS

EP         0750819 A1     1/1997
EP         0750819    *   9/2002 ............. H04N 5/265
(Continued)

OTHER PUBLICATIONS

Chang, Jyh-Yeong, et al. "Digital image translational and rotational motion stabilization using optical flow technique." IEEE Transactions on Consumer Electronics 48.1 (2002): 108-115.*
(Continued)

*Primary Examiner* — Avinash Yentrapati
(74) *Attorney, Agent, or Firm* — Kilpatrick Townsend & Stockton LLP

(57) ABSTRACT

Some embodiments of the present disclosure provide a content integration system. The content integration system is configured to retrieve a source digital content, retrieve a target digital content, identify a region within the target digital content for placing or integrating the source digital content, and place or integrate the target digital content onto the identified region of the source digital content. The content integration system can be configured to place the source digital content into the target digital content in an aesthetically-pleasing, unobtrusive, engaging, and/or otherwise favorable manner. The content integration system can be particularly useful for advertisements, enhanced expression, entertainment, information, or communication.

19 Claims, 51 Drawing Sheets

Related U.S. Application Data filed on Mar. 22, 2016, provisional application No. 62/419,709, filed on Nov. 9, 2016.

(51) Int. Cl.

| | |
|---|---|
| *G06Q 30/02* | (2012.01) |
| *G06T 7/44* | (2017.01) |
| *G06T 7/194* | (2017.01) |
| *G06T 7/262* | (2017.01) |
| *G06T 7/536* | (2017.01) |
| *G06T 7/11* | (2017.01) |
| *G06T 7/246* | (2017.01) |
| *G06T 7/90* | (2017.01) |
| *G06K 9/46* | (2006.01) |

(52) U.S. Cl.
CPC ............ *G06Q 30/0276* (2013.01); *G06T 7/11* (2017.01); *G06T 7/194* (2017.01); *G06T 7/246* (2017.01); *G06T 7/262* (2017.01); *G06T 7/44* (2017.01); *G06T 7/536* (2017.01); *G06T 7/90* (2017.01); *G06T 2207/10004* (2013.01); *G06T 2207/10016* (2013.01); *G06T 2207/10024* (2013.01); *G06T 2207/10028* (2013.01); *G06T 2207/20016* (2013.01); *G06T 2207/20081* (2013.01); *G06T 2207/20084* (2013.01); *G06T 2207/20221* (2013.01); *G06T 2207/30204* (2013.01); *G06T 2207/30244* (2013.01)

(58) Field of Classification Search
CPC . G06T 2207/10024; G06T 2207/10028; G06T 2207/20016; G06T 2207/20081; G06T 2207/20084; G06T 2207/20221; G06T 2207/30204; G06T 2207/30244; G06T 7/11; G06T 7/194; G06T 7/246; G06T 7/262; G06T 7/44; G06T 7/536; G06T 7/90

See application file for complete search history.

(56) References Cited

U.S. PATENT DOCUMENTS

| | | | | |
|---|---|---|---|---|
| 5,892,554 A * | 4/1999 | DiCicco | ............... | H04N 5/2723 348/584 |
| 5,903,317 A * | 5/1999 | Sharir | ................... | G01S 3/7864 348/157 |
| 6,711,293 B1 | 3/2004 | Lowe | | |
| 6,912,298 B1 * | 6/2005 | Wilensky | ........... | G06K 9/00604 345/581 |
| 7,570,811 B2 * | 8/2009 | Marquering | ....... | G06K 9/00449 358/448 |
| 7,667,732 B1 * | 2/2010 | Freeman | ............ | G06K 9/00711 348/143 |
| 7,893,963 B2 * | 2/2011 | Gallagher | .......... | H04N 5/23248 348/208.6 |
| 8,207,989 B2 * | 6/2012 | Mei | ...................... | G11B 27/036 345/629 |
| 8,369,686 B2 * | 2/2013 | Mei | .................... | G06Q 30/0243 386/249 |
| 8,730,397 B1 * | 5/2014 | Zhang | .................... | G06F 16/743 348/583 |
| 9,704,261 B2 * | 7/2017 | Ji | ............................ | G06T 7/136 |
| 10,522,186 B2 | 12/2019 | Attorre et al. | | |
| 2002/0136449 A1 * | 9/2002 | Park | ...................... | G06K 9/4652 382/164 |
| 2002/0159636 A1 * | 10/2002 | Lienhart | .................. | G06T 7/194 382/176 |
| 2003/0012409 A1 * | 1/2003 | Overton | .................... | G06T 7/60 382/103 |
| 2004/0105583 A1 * | 6/2004 | Jacobs | ................ | G06K 9/00463 382/173 |
| 2004/0140992 A1 * | 7/2004 | Marquering | ....... | G06K 9/00449 715/700 |
| 2006/0062430 A1 * | 3/2006 | Vallone | ................... | H04N 7/181 382/103 |
| 2007/0204310 A1 * | 8/2007 | Hua | ...................... | H04N 21/812 725/88 |
| 2008/0056563 A1 * | 3/2008 | Schiller | .................. | G06N 20/10 382/159 |
| 2008/0118107 A1 * | 5/2008 | Sharon | .................... | G06T 7/246 382/103 |
| 2009/0037947 A1 * | 2/2009 | Patil | ...................... | H04N 21/812 725/32 |
| 2009/0076882 A1 * | 3/2009 | Mei | ......................... | G06Q 30/02 705/14.41 |
| 2009/0079871 A1 * | 3/2009 | Hua | .................... | H04N 21/4347 348/584 |
| 2009/0150210 A1 * | 6/2009 | Athsani | .............. | G06Q 30/0201 705/7.29 |
| 2009/0171787 A1 * | 7/2009 | Mei | ..................... | G06Q 30/0273 705/14.69 |
| 2009/0238460 A1 | 9/2009 | Funayama et al. | | |
| 2009/0324065 A1 * | 12/2009 | Ishida | ...................... | H04N 1/41 382/164 |
| 2010/0054538 A1 * | 3/2010 | Boon | .................. | G06K 9/00798 382/104 |
| 2011/0030002 A1 * | 2/2011 | Foti | ...................... | G06Q 30/018 725/32 |
| 2011/0038452 A1 * | 2/2011 | Moghe | ..................... | A61B 6/03 378/19 |
| 2011/0075992 A1 * | 3/2011 | Mei | ...................... | H04N 21/458 386/249 |
| 2012/0192226 A1 * | 7/2012 | Zimmerman | .... | H04N 21/23424 725/34 |
| 2013/0039534 A1 * | 2/2013 | Shih-Chia | ................. | G06T 7/20 382/103 |
| 2015/0003707 A1 * | 1/2015 | Amon | ................... | H04N 19/147 382/131 |
| 2015/0078648 A1 * | 3/2015 | Lee | ...................... | G06K 9/0014 382/133 |
| 2015/0131851 A1 * | 5/2015 | Bernal | .................... | G06T 7/194 382/103 |
| 2015/0161773 A1 * | 6/2015 | Takahashi | .............. | H04N 5/272 382/173 |
| 2016/0042251 A1 * | 2/2016 | Cordova-Diba | ..... | G06K 9/4604 382/180 |
| 2016/0232425 A1 * | 8/2016 | Huang | .................. | G06K 9/628 |
| 2016/0286080 A1 * | 9/2016 | Hayashi | .................. | G06T 7/194 |
| 2019/0116200 A1 | 4/2019 | Joy et al. | | |

FOREIGN PATENT DOCUMENTS

| | | |
|---|---|---|
| GB | 2305051 A | 3/1997 |
| WO | WO-2009/017983 A2 | 2/2009 |

OTHER PUBLICATIONS

International Search Report and Written Opinion dated Jun. 6, 2017 in related International Application No. PCT/US2017/023616 filed Mar. 22, 2017, 15 pages.

U.S. Appl. No. 16/049,690, Notice of Allowance dated Aug. 20, 2019, 5 pages.

U.S. Appl. No. 16/049,690, Notice of Allowance dated Apr. 26, 2019, 9 pages.

Canny, A Computational Approach to Edge Detection, IEEE Transactions on Pattern Analysis and Machine Intelligence, vol. 8, No. 6, Nov. 1986, pp. 679-698.

Dalal et al., Histograms of Oriented Gradients for Human Detection, IEEE Computer Society Conference on Computer Vision and Pattern Recognition, Jun. 25, 2005, pp. 1-8.

Deng et al., Principal Curvature-Based Region Detector for Object Recognition, 2007 IEEE Conference on Computer Vision and Pattern Recognition, Jun. 2007, 8 pages.

Deriche, Using Canny's Criteria to Derive a Recursively Implemented Optimal Edge Detector, International Journal of Computer Vision, 1987, pp. 167-187.

(56) References Cited

OTHER PUBLICATIONS

Duda et al., Use of the Hough Transformation to Detect Lines and Curves in Pictures, Graphics and Image Processing, Jan. 1972, pp. 11-15.

Harris et al., A Combined Corner and Edge Detector, Plessey Research, 1988, pp. 147-151.

Knutsson, Representing Local Structure Using Tensors, Scandinavian Conference on Image Analysis, 2011, pp. 1-8.

Lindeberg et al., Segmentation and Classification of Edges Using Minimum Description Length Approximation and Complementary Junction Cues, Computer Vision and Image Understanding, vol. 67, No. 1, 1997, pp. 88-98.

Lindeberg et al., Shape-Adapted Smoothing in Estimation of 3-D Depth Cues from Affine Distortions of Local 2-D Brightness Structure, CV AP Dept of Numerical Analysis and Computing Science, Jan. 1997, 12 pages.

Lindenberg, Image Matching Using Generalized Scale-Space Interest Points, Journal of Mathematical Imaging and Vision, vol. 52, No. 1, May 2015, 34 pages.

Matas et al., Robust Wide Baseline Stereo from Maximally Stable Extremal Regions, Image and Vision Computing, vol. 22, No. 10, Sep. 1, 2004, pp. 761-767.

Meyer et al., Wavelets and Operators, Cambridge Studies in Advanced Mathematics, vol. 37, Cambridge University Press, Jan. 1996, 4 pages.

Mikolajczyk et al., A Comparison of Affine Region Detectors, International Journal of Computer Vision, 2006, 30 pages.

Mikolajczyk et al., A Performance Evaluation of Local Descriptors, IEEE Transactions on Pattern Analysis and Machine Intelligence, vol. 27, No. 10, Oct. 2005, pp. 1615-1630.

Mikolajczyk et al., An Affine Invariant Interest Point Detector, European Conference on Computer Vision (ECCV '02), May 2002, 15 pages.

Panwar et al., Image Segmentation using K-means clustering and Thresholding, International Research Journal of Engineering and Technology (IRJET), vol. 3, No. 5, May 2016, pp. 1787-1793.

International Application No. PCT/US2017/023616, International Preliminary Report on Patentability dated Oct. 4, 2018, 9 pages.

Roberts, Machine Perception of Three-Dimensional Solids, Department of Electrical Engineering, Jul. 23, 1963, 82 pages.

Rosten et al., Machine Learning for High-Speed Corner Detection, European Conference on Computer Vision, 2006, 14 pages.

Rublee et al., ORB: An Efficient Alternative to Sift or Surf, Computer Vision (ICCV), IEEE International Conference on. IEEE, Nov. 2011, pp. 1-8.

Shi et al., Good Features to Track, 1994 Proceedings of IEEE Conference on Computer Vision and Pattern Recognition, 1994, pp. 593-600.

Smith et al., Susan- A New Approach to Low Level Image Processing, International Journal of Computer Vision, vol. 23, No. 1, May 1997, 59 pages.

Viola et al., Rapid Object Detection Using a Boosted Cascade of Simple Features, Proceedings of the 2001 IEEE Computer Society Conference on Computer Vision and Pattern Recognition. CVPR 2001, 2001, pp. 1511-1518.

Wang et al., 6-2 Gray Level Corner Detection, IAPR Workshop on Machine Vision Applications, Nov. 1998, 4 pages.

Zitnick et al., Consistent Segmentation for Optical Flow Estimation, Tenth IEEE International Conference on Computer Vision (ICCV'05), vol. 2, Oct. 2005, 8 pages.

* cited by examiner

APPARATUS, SYSTEMS, AND METHODS FOR INTEGRATING DIGITAL MEDIA CONTENT INTO OTHER DIGITAL MEDIA CONTENT

RELATED APPLICATIONS

This application claims the benefit of an earlier filing date of U.S. Provisional Patent Application No. 62/311,472, titled "METHOD AND SYSTEM FOR SUPERIMPOSING DYNAMICALLY-MATCHED IMAGES AND ADVERTISEMENTS ON VISUAL CONTENT," by Marino et. al., filed on Mar. 22, 2016; U.S. Provisional Patent Application No. 62/354,053, titled "METHOD AND SYSTEM FOR SUPERIMPOSING DYNAMICALLY-MATCHED IMAGES AND ADVERTISEMENTS ON VISUAL CONTENT," by Marino et. al., filed on Jun. 23, 2016; and U.S. Provisional Patent Application No. 62/419,709, titled "METHOD AND SYSTEM FOR PLACING VISUAL DIGITAL CONTENT ON OTHER VISUAL DIGITAL CONTENT," by Marino et. al., filed on Nov. 9, 2016, each of which is herein incorporated by reference in the entirety.

TECHNICAL FIELD

Disclosed apparatus, systems, and computerized methods relate generally to integrating source digital content with target digital content.

SUMMARY

Some embodiments of the disclosed subject matter include an apparatus. The apparatus can include a processor configured to run a computer program stored in memory. The computer program is operable to cause the processor to receive source digital content, receive target digital content and host region defining data associated with the target digital content, wherein the host region defining data specifies a location of a host region within the target digital content for integrating source digital content into the target digital content, and integrate the source digital content into the host region within the target digital content identified by the host region defining data.

Some embodiments of the disclosed subject matter include a computerized method performed by a processor in a computing system. The computerized method includes receiving source digital content, receiving target digital content and host region defining data associated with the target digital content, wherein the host region defining data specifies a location of a host region within the target digital content for integrating source digital content into the target digital content, and integrating the source digital content into the host region within the target digital content identified by the host region defining data.

Some embodiments of the disclosed subject matter include a non-transitory computer readable medium having executable instructions. The executable instructions are operable to cause a processor to receive source digital content, receive target digital content and host region defining data associated with the target digital content, wherein the host region defining data specifies a location of a host region within the target digital content for integrating source digital content into the target digital content, and integrate the source digital content into the host region within the target digital content identified by the host region defining data.

In some embodiments, the host region defining data further comprises a transformation object that specifies a transformation for the source digital content.

In some embodiments, the transformation comprises one or more transformations for replicating a motion, pose, luminance, texture, and/or a level of blur of the host region.

In some embodiments, the computer program in the apparatus and/or the executable instructions in the non-transitory computer readable medium are operable to cause a processor to implement the transformation on the source digital content prior to integrating the source digital content into the host region. In some embodiments, the method further includes implementing the transformation on the source digital content prior to integrating the source digital content into the host region.

In some embodiments, the computer program in the apparatus and/or the executable instructions in the non-transitory computer readable medium are operable to cause a processor to detect the host region from the target digital content. In some embodiments, the method further includes detecting the host region from the target digital content.

In some embodiments, the computer program in the apparatus and/or the executable instructions in the non-transitory computer readable medium are operable to cause a processor to detect the host region from the target digital content based on a texture of the target digital content. In some embodiments, the method further includes detecting the host region from the target digital content based on a texture of the target digital content.

In some embodiments, the computer program in the apparatus and/or the executable instructions in the non-transitory computer readable medium are operable to cause a processor to use a neural network to determine the texture of the target digital content. In some embodiments, the method further includes using a neural network to determine the texture of the target digital content.

In some embodiments, the computer program in the apparatus and/or the executable instructions in the non-transitory computer readable medium are operable to cause a processor to detect the host region from the target digital content based on one or more of: (1) a level of variance in pixel values, (2) a background segmentation indicating that a pixel of the target digital content corresponds to a background of a scene, and/or (3) an object detected in the target digital content. In some embodiments, the method further includes detecting the host region from the target digital content based on one or more of: (1) a level of variance in pixel values, (2) a background segmentation indicating that a pixel of the target digital content corresponds to a background of a scene, (3) an object detected in the target digital content, and/or (4) a neural network machine learning model trained on sample host regions.

In some embodiments, the computer program in the apparatus and/or the executable instructions in the non-transitory computer readable medium are operable to cause a processor to parse the target digital content comprising a plurality of frames into a plurality of scenes, wherein each scene comprises one or more interrelated frames in the target digital content, identify a first host region within a first frame corresponding to the first one of the plurality of scenes, and based on a location of the first host region in the first frame, identify a second host region within a second frame corresponding to the first one of the plurality of scenes. In some embodiments, the method further includes parsing the target digital content comprising a plurality of frames into a plurality of scenes, wherein each scene comprises one or more interrelated frames in the target digital content, identifying a first host region within a first frame corresponding to the first one of the plurality of scenes, and based on a location of the first host region in the first frame, identifying a second host region within a second frame corresponding to the first one of the plurality of scenes.

In some embodiments, the computer program in the apparatus and/or the executable instructions in the non-transitory computer readable medium are operable to cause a processor to group the plurality of scenes into a first set of scenes and a second set of scenes, wherein the first set of scenes comprises scenes whose camera motion includes a translation less than a fixed percentage of a height or a width of a frame, and wherein the second set of scenes comprises scenes whose camera motion includes a translation greater than the fixed percentage of the height or the width of the frame. In some embodiments, the method further includes grouping the plurality of scenes into a first set of scenes and a second set of scenes, wherein the first set of scenes comprises scenes whose camera motion includes a translation less than a fixed percentage of a height or a width of a frame, and wherein the second set of scenes comprises scenes whose camera motion includes a translation greater than the fixed percentage of the height or the width of the frame.

In some embodiments, the computer program in the apparatus and/or the executable instructions in the non-transitory computer readable medium are operable to cause a processor to group the plurality of scenes into a first set of scenes and a second set of scenes, wherein the first set of scenes comprises scenes whose camera motion includes a rotation less than a fixed value of degrees, and wherein the second set of scenes comprises scenes whose camera motion includes a rotation greater than the fixed value of degrees. In some embodiments, the method further includes grouping the plurality of scenes into a first set of scenes and a second set of scenes, wherein the first set of scenes comprises scenes whose camera motion includes a rotation less than a fixed value of degrees, and wherein the second set of scenes comprises scenes whose camera motion includes a rotation greater than the fixed value of degrees.

In some embodiments, the computer program in the apparatus and/or the executable instructions in the non-transitory computer readable medium are operable to cause a processor to detect the host region from the target digital content based on a marker identifying a preselected host region within the target digital content. In some embodiments, the method further includes detecting the host region from the target digital content based on a marker identifying a preselected host region within the target digital content.

In some embodiments, the computer program in the apparatus and/or the executable instructions in the non-transitory computer readable medium are operable to cause a processor to detect the host region by creating a gradient image of a frame of the target digital content and identifying a window within the gradient image in which a summation of the hypotenuse of the gradient pixel values within the window is less than a predetermined threshold. In some embodiments, the method further includes detecting the host region by creating a gradient image of a frame of the target digital content and identifying a window within the gradient image in which a summation of the hypotenuse of the gradient pixel values within the window is less than a predetermined threshold.

In some embodiments, the computer program in the apparatus and/or the executable instructions in the non-transitory computer readable medium are operable to cause a processor to detect the host region by recognizing an object within the target digital content that is predetermined to be a host region. In some embodiments, the method further includes detecting the host region by recognizing an object within the target digital content that is predetermined to be a host region.

In some embodiments, the computer program in the apparatus and/or the executable instructions in the non-transitory computer readable medium are operable to cause a processor to detect occlusion in one or more frames in the target digital content by merging a foreground mask and a luminance mask. In some embodiments, the method further includes detecting occlusion in one or more frames in the target digital content by merging a foreground mask and a luminance mask.

In some embodiments, the computer program in the apparatus and/or the executable instructions in the non-transitory computer readable medium are operable to cause a processor to track the host region detected in a first frame of the target digital content across a plurality of frames in the target digital content using optical flow. In some embodiments, the method further includes tracking the host region detected in a first frame of the target digital content across a plurality of frames in the target digital content using optical flow.

In some embodiments, the computer program in the apparatus and/or the executable instructions in the non-transitory computer readable medium are operable to cause a processor to track the host region detected in a first frame of the target digital content across a plurality of frames in the target digital content by tracking features associated with the host region using optical flow. In some embodiments, the method further includes tracking the host region detected in a first frame of the target digital content across a plurality of frames in the target digital content by tracking features associated with the host region using optical flow.

In some embodiments, the computer program in the apparatus and/or the executable instructions in the non-transitory computer readable medium are operable to cause a processor to maintain a count of occluded pixels in the host region in each frame of the target digital content. In some embodiments, the method further includes maintaining a count of occluded pixels in the host region in each frame of the target digital content.

In some embodiments, the computer program in the apparatus and/or the executable instructions in the non-transitory computer readable medium are operable to cause a processor to integrate the source digital content into the host region in real-time using a web-browser. In some embodiments, the method further includes integrating the source digital content into the host region in real-time using a web-browser.

Some embodiments of the disclosed subject matter include an apparatus. The apparatus includes a processor configured to run a computer program stored in memory. The computer program is operable to cause the processor to receive target digital content comprising a plurality of frames including a first frame and a second frame, wherein the plurality of frames is captured using an imaging device and the plurality of frames captures a surface, identify a relative motion between the imaging device and the surface over a duration of the plurality of frames based on an optical flow between the plurality of frames, determine a transformation to capture the relative motion between the first frame and the second frame, detect a first host region on the surface captured in the first frame based in part on a texture of the surface, identify a second host region in the second frame based in part on a location of the first host region in the first frame and the transformation, and create a host region defining data associated with the target digital content, wherein the host region defining data includes a first location of the first host region in the first frame and a second location of the second host region in the second frame.

Some embodiments of the disclosed subject matter include a computerized method performed by a processor in a computing system. The computerized method includes receiving target digital content comprising a plurality of frames including a first frame and a second frame, wherein the plurality of frames is captured using an imaging device and the plurality of frames captures a surface, identifying a relative motion between the imaging device and the surface over a duration of the plurality of frames based on an optical flow between the plurality of frames, determining a transformation to capture the relative motion between the first frame and the second frame, detecting a first host region on the surface captured in the first frame based in part on a texture of the surface, identifying a second host region in the second frame based in part on a location of the first host region in the first frame and the transformation, and creating a host region defining data associated with the target digital content, wherein the host region defining data includes a first location of the first host region in the first frame and a second location of the second host region in the second frame.

Some embodiments of the disclosed subject matter include a non-transitory computer readable medium having executable instructions. The executable instructions are operable to cause a processor to receive target digital content comprising a plurality of frames including a first frame and a second frame, wherein the plurality of frames is captured using an imaging device and the plurality of frames captures a surface, identify a relative motion between the imaging device and the surface over a duration of the plurality of frames based on an optical flow between the plurality of frames, determine a transformation to capture the relative motion between the first frame and the second frame, detect a first host region on the surface captured in the first frame based in part on a texture of the surface, identify a second host region in the second frame based in part on a location of the first host region in the first frame and the transformation, and create a host region defining data associated with the target digital content, wherein the host region defining data includes a first location of the first host region in the first frame and a second location of the second host region in the second frame.

In some embodiments, the computer program in the apparatus and/or the executable instructions in the non-transitory computer readable medium are operable to cause a processor to determine an occlusion mask corresponding to the second frame, wherein a value of a pixel in the occlusion mask indicates that a corresponding pixel in the second frame is occluded. In some embodiments, the method further includes determining an occlusion mask corresponding to the second frame, wherein a value of a pixel in the occlusion mask indicates that a corresponding pixel in the second frame is occluded.

In some embodiments, the computer program in the apparatus and/or the executable instructions in the non-transitory computer readable medium are operable to cause a processor to retrieve the target digital content and the host region defining data associated with the target digital content, receive source digital content, and integrate the source digital content into the first host region and the second host region within the target digital content identified by the host region defining data. In some embodiments, the method further includes retrieving the target digital content and the host region defining data associated with the target digital content, receiving source digital content, and integrating the source digital content into the first host region and the second host region within the target digital content identified by the host region defining data.

In some embodiments, the computer program in the apparatus and/or the executable instructions in the non-transitory computer readable medium are operable to cause a processor to determine a depth and a surface normal of a surface associated with the host region to determine a pose transformation object for the host region. In some embodiments, the method further includes determining a depth and a surface normal of a surface associated with the host region to determine a pose transformation object for the host region.

In some embodiments, the computer program in the apparatus and/or the executable instructions in the non-transitory computer readable medium are operable to cause a processor to use a neural network to predict the depth and the surface normal of the surface associated with the host region to identify a background region for host region identification. In some embodiments, the method further includes using a neural network to predict the depth and the surface normal of the surface associated with the host region to identify a background region for host region identification.

In some embodiments, the computer program in the apparatus and/or the executable instructions in the non-transitory computer readable medium are operable to cause a processor to use a neural network to predict the depth and the surface normal of the surface associated with the host region to group scenes based on a camera positioning. In some embodiments, the method further includes using a neural network to predict the depth and the surface normal of the surface associated with the host region to group scenes based on a camera positioning.

In some embodiments, the computer program in the apparatus and/or the executable instructions in the non-transitory computer readable medium are operable to cause a processor to determine a motion category for the target digital content and integrate the source digital content into the target digital content based on a process exclusively tailored to the motion category.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
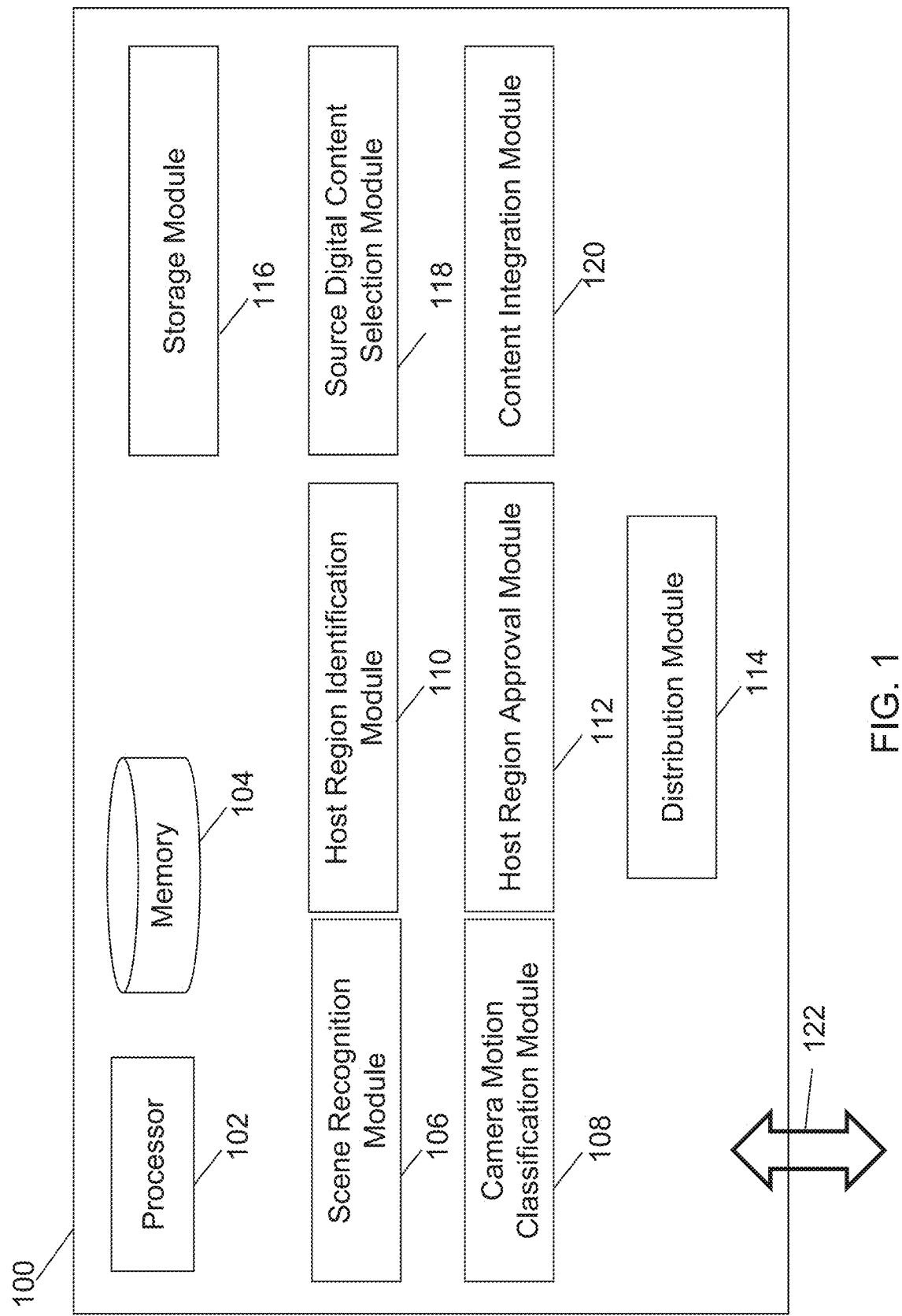
FIG. 1 illustrates a content integration system in accordance with some embodiments.

In the following description, numerous specific details are set forth regarding the systems and methods of the disclosed subject matter and the environment in which such systems and methods may operate, etc., in order to provide a thorough understanding of the disclosed subject matter. It can be apparent to one skilled in the art, however, that the disclosed subject matter may be practiced without such specific details, and that certain features, which are well known in the art, are not described in detail in order to avoid complication of the disclosed subject matter. In addition, it can be understood that the examples provided below are exemplary, and that it is contemplated that there are other systems and methods that are within the scope of the disclosed subject matter.

The following introduces exemplary explanations of terms, according to one or more embodiments, that are used throughout the specification. These explanations are not intended to be limiting.

Some embodiments of the present disclosure provide a content integration system. The content integration system is configured to retrieve a source digital content, retrieve a target digital content, identify a region within the target digital content for integrating the source digital content, and integrate the source digital content onto the identified region of the target digital content.

For example, the content integration system can retrieve an advertisement, retrieve one or more frames from a video, identify a region within one or more of those frames for integrating the advertisement, and integrate the advertisement onto the identified region. The content integration system can be configured to place the source digital content into the target digital content in an aesthetically-pleasing, unobtrusive, engaging, and/or otherwise favorable manner. The content integration system can be particularly useful for advertising or enhanced expression, entertainment, information, or communication.

In some embodiments, the source digital content and/or the target digital content include digital content designed for visual display. For example, the source digital content and/or the target digital content include digital photographs, illustrations, one or more frames in a video (whether streaming or file and whether two dimensional, 360 degrees, or spherical), animations, video games, graphics displays, augmented reality, mixed reality, and/or virtual reality experiences.

In some embodiments, the content integration system can be configured to identify one or more regions—e.g., sets of one or more contiguous pixels—in or around the target digital content where source digital content can be placed ("host regions"). The host region includes one or more contiguous pixels that satisfy predetermined criteria. The predetermined criteria can be determined such that placing source digital content upon the corresponding contiguous pixels enhances, rather than detracts from, the viewer experience. The predetermined criteria can include, for example, a lack of variation in pixel values, an absence of edges or texture, an indication that these pixels are for the background rather than the foreground of the scene inside the target digital content, an indication that these pixels occupy an area of low visual saliency, or an indication, by a machine learning model trained on past examples of preferable regions, that the pixels represent a preferable host region.

In some embodiments, the content integration system can include a host region identification module that is configured to identify a host region based on one or more predetermined criteria. For example, the host region identification module can be configured to identify, as host regions, (1) regions having a predetermined level of uniformity, (2) regions that represent the background (as opposed to the foreground), (3) regions that represent particular objects, textures, materials, shapes, places, spaces, or areas, or (4) regions that a machine learning model, trained on example host regions, classifies as host regions.

In some embodiments, the host region identification module is configured to identify a host region in target digital content by detecting a predetermined marker. The predetermined marker can be a graphical representation indicative of a preselected host region. The predetermined marker can be inserted into the target digital content by, for example, a user.

In some embodiments, the host region identification module can be configured to enable a user to select a host region within a target digital content. For example, the host region identification module can be configured to receive a selection of a sub-section of a target digital content identified by a graphics tool. In some cases, the host region identification module can be configured to assist the selection of a host region within a target digital content. For example, the content integration system can provide host region candidates from which a host region can be selected.

In some embodiments, the content integration system is configured to (1) parse a digital content, such as a video, into scenes, (2) classify each scene based on the type and/or level of a camera motion corresponding to the scenes, and (3) find the host regions using different approaches based on the type of camera motion in each scene.

In some embodiments, the content integration system includes a scene recognition module that is configured to automatically parse a target digital content into scenes so that host region identification can be performed for each of these scenes. A scene can include, for example, a series of interrelated and/or consecutive frames, a continuous action in time, and/or a contiguous physical space.

In some embodiments, the scene recognition module can be configured to automatically classify one or more scenes that compose the target digital content according to their type or level of camera motion. For example, the scene recognition module can classify scenes lacking camera motion, scenes whose camera motion involves translation of no more than 20% of the height or width of the frame and rotation of no more than 5° ("minimal camera motion"), or scenes with camera motion involving either translation of more than 20% of the height or width of the frame or rotation of more than 5° ("maximal camera motion"). Subsequently, the scene recognition module can provide the classification information to the host region identification module so that the host region identification module can detect one or more host regions based on the classification information.

In some embodiments, the host region identification module can include sub-modules that are specialized for different types or levels of camera motion. In that case, the scene recognition module can provide scene classification information corresponding to a particular scene to a particular sub-module associated with the particular scene. For example, the scene recognition module provides scene classification information corresponding to scenes without camera motion to a host region identification sub-module whose process is tailored for that type of camera motion. As another example, the scene recognition module provides scene classification information corresponding to scenes with maximal camera motion to a sub-module whose process is tailored for scenes with that type of motion.

In some embodiments, the scene recognition module is configured to use a machine learning model, trained on samples of digital content labelled according to their type and/or level of camera motion scenes, in order to perform the classification of the type or level of camera motion in a given scene of the target digital content.

In some embodiments, a host region identification module in the content integration system can be configured to search for one or more host regions in part based on texture of a region. The texture of a region can be measured, in part, based on a uniformity of pixel values (e.g., the absence of edges) in that region for one or more frames of the target digital content.

In some embodiments, the host region identification module is configured to identify host regions through the use of a machine learning system. The host region identification module can include, for example, one or more machine learning-based classifiers, such as a convolutional neural network, support vector machine, or random forest classifier, that are configured to determine whether a texture of a region in a target digital content is sufficiently bland and/or uniform so that the region could be classified as a host region.

In some embodiments, the machine learning system can be trained using a training set of samples of digital content reflecting textures which are deemed as suitable for hosting a source digital content. Such samples of digital content can include samples of digital content reflecting brick walls, painted walls, and/or sky textures. This dataset can be collected by manually collecting samples of digital content that feature these textures and then manually demarcating the location of the texture in the content (either by cropping the digital content to those regions or capturing the location—e.g., to yield the best result, with the coordinates of a polygon bounding the location—as a feature).

In some embodiments, the texture of a region can be modeled in part based on a gradient distribution within a region. In particular, the host region identification module can be configured to search for a region, within a target digital content, with a similar gradient distribution. For example, the host region identification module can be configured to search for a maximal contiguous region within which the gradient distribution is uniform. As another example, the host region identification module can be configured to search for a maximal contiguous region within which none of the pixels has a gradient magnitude greater than a predetermined threshold. In some cases, the host region identification module is configured to use a seed-growing or a region-growing image segmentation technique to identify a region with similar gradient characteristics. In some embodiments, the gradient at a pixel can be computed by convolving a gradient filter with the pixel (and its neighboring pixels, based on the size of the filter).

For example, the host region identification module can be configured to search for one or more host regions in part by (1) creating a gradient image of one or more frames of the target digital content and (2) finding a window within that image whose diagonal pixel values (i.e., those along the hypotenuse), once summed, fall below a predetermined threshold. A sum of diagonal values that falls below a predetermined threshold suggests that the window lacks edges (and thus exhibits uniformity of pixel values).

In some embodiments, the host region identification module can be configured to identify host regions by searching digital content such as an image for one or more background regions (e.g., sets of one or more pixels representing the background, rather than the foreground, of the scene depicted by the content). This is based on an empirical observation that background regions are commonly of less interest to viewers than foreground regions and thus represent a preferred region for hosting source digital content. In some cases, the host region identification module can maintain a machine learning system that is configured to determine whether a region corresponds to a background or not.

In some embodiments, the content integration system is configured to represent a host region using a predetermined data structure or an object. For example, the content integration system is configured to represent a host region using a data structure including a predetermined dimension (e.g., a height dimension, a width dimension). When the content integration system has identified a host region, the content integration system associates the identified host region with the predetermined data structure that represents the identified host region.

In some embodiments, the content integration system is configured to determine a surface orientation (e.g., a normal vector of a surface) of the host region in the target digital content. Subsequently, the content integration system can use the surface orientation information to transform (e.g., morph) the source digital content to have the same surface orientation. Then the content integration system can integrate the transformed source digital content into the target digital content to reduce visual artifacts.

In some embodiments, the content integration system is configured to recognize one or more objects in target digital content and save the recognition result as a host region defining data. The host region defining data can indicate, for example, that a particular type of object has been recognized in the target digital content and, optionally, the location (e.g., coordinate) of the recognized object in the target digital content. In some embodiments, the content integration system can also maintain an association between the host region defining data and source digital content that can be placed upon the object associated with the host region defining data. For example, the host region defining data corresponding to a wall can be associated with source digital content corresponding to a company logo. In some cases, the content integration system is configured to maintain the association using a table and/or a database.

In some embodiments, the content integration system includes a source digital content selection module that is configured to select the source digital content. In some embodiments, the content integration system also includes a content integration module that is configured to integrate the source digital content into the target digital content. In one example, the content integration module is configured to integrate the source digital content into the target digital content by placing the source digital content in a host region of the target digital content. In another example, the content integration module is configured to integrate the source digital content into the target digital content by overlaying the source digital content over a host region of the target digital content. In another example, the content integration module is configured to integrate the source digital content into the target digital content by blending the source digital content into a host region of the target digital content.

In some embodiments, the source digital content selection module and the content integration module can operate in real time. For example, the source digital content selection module is configured to select the source digital content and provide it to a content integration module including a web browser so that the browser can integrate the source digital content into the target digital content in real time, while it is being viewed.

In some embodiments, the content integration module is configured to detect occlusion in the target digital content. To this end, the content integration module is configured to create a foreground mask that is enhanced by a luminance mask. For example, the content integration module is configured to (1) choose, as a background and luminance model, a cropped instance of the host region from one frame (e.g. the first frame) of the target digital content, (2) apply a bilateral filter to the pixel values of this model to remove noise from that region, and (3) convert the model into both RGB and Lab color spaces. Next, the content integration module is configured to create background and luminance masks for cropped instances of the host region. For example, the content integration module is configured to (1) apply a bilateral filter to the pixel values to remove noise, (2) convert the values into both RGB and Lab color spaces, (3) compute the absolute value of the difference of the resulting values and the corresponding values of the model and, (4) where this absolute value exceeds a predetermined threshold that has been set for each mask, add the value indicating either occlusion or a luminance change to the respective mask. Then, the content integration module is configured to combine these two masks (e.g., using an AND operator), creating a merged mask that captures occluding objects but not mere luminance changes.

In some embodiments, the content integration system is configured to use a modified version of the flood fill process to improve foreground mask or combined foreground and luminance mask transformation objects.

In some embodiments, the content integration system is configured to recreate the luminance (and thus the texture and luminance changes) of the target digital content in the source digital content or its placement by converting the pixel values of the host region in each frame of the target digital content to Lab, subtracting each of these values from 255, and then adding the resulting number to each corresponding frame of the source digital content.

The disclosed content integration system can provide a scalable computational mechanism to automatically and artfully enhance creativity, expression, or utility in target digital content. The content integration system can also be useful in advertising related applications. For example, the content integration system can provide a computational mechanism to place advertisements into a target digital content in an unobtrusive, seamless manner. This is a way to advertise on target digital content that is impervious to avoidance via time-shifting and/or, depending on the implementation of the placement, avoidance via ad-blocking technology. On top of that, this method creates entirely new advertising space inside new or vintage digital content at a time when such advertising space is in high demand and, further, makes that space available, when so desired, for the targeted and programmatic serving of ads at high scale, even in real time.

The benefit of the disclosed content integration system is the seamless integration of digital contents, such as advertisements, text, or other augmentation, into unobtrusive regions inside a target digital content in an automated or semi-automated fashion and, potentially, in a standardized fashion. There is a great demand for less obtrusive ways to advertise, serve text, and otherwise augment digital content (especially video), especially when they can be done at a large scale or programmatically. This system satisfies that demand by providing a method for integrating source digital content into target digital content in an unobtrusive way. Further, by removing most or all human involvement from the process and by standardizing the resulting advertisements or augmentations, this method allows for their placement at high scale and programmatically.

Content Integration System

FIG. 1 illustrates a content integration system 100 in accordance with some embodiments. The content integration system 100 can include one or more processors 102, a memory device 104, a scene recognition module 106, a camera motion classification module 108, a host region identification module 110, a host region approval module 112, a distribution module 114, a storage module 116, a source digital content selection module 118, a content integration module 120, and an interface 122.

In some embodiments, the one or more processors 102 can execute machine executable instructions. The one or more processors 102 can be implemented in hardware using an application specific integrated circuit (ASIC), programmable logic array (PLA), digital signal processor (DSP), field programmable gate array (FPGA), or any other integrated circuit. The processors 102 suitable for the execution of a computer program include, by way of example, both general and special purpose microprocessors, digital signal processors, and any one or more processors of any kind of digital computer. Generally, the one or more processors 102 receive instructions and data from a read-only memory or a random access memory or both.

In some embodiments, the memory device 104, including one or more memory modules, can store instructions and/or data. The one or more memory modules in the memory device 104 can be a non-transitory computer readable medium, such as a dynamic random access memory (DRAM), a static random access memory (SRAM), flash memory, a magnetic disk drive, an optical drive, a programmable read-only memory (PROM), a read-only memory (ROM), and/or any other memory or combination of memories. The memory device 104 can be used to temporarily store data. The memory device 104 can also be used for long-term data storage. The one or more processors 102 and the memory device 104 can be supplemented by and/or incorporated into special purpose logic circuitry.

In some embodiments, the scene recognition module 106 is configured to identify, in an automated fashion, the scenes that compose a digital content. For example, the scene recognition module 106 is configured to accept as input the target digital content. Then, using various methods, the scene recognition module 106 is configured to automatically identify one or more scenes inside that input content as well as those scenes that reflect the same physical space and/or camera positioning. The scene recognition module 106 is configured to output a list of frames composing the scenes that, in turn, compose the target digital content, possibly grouped by those that reflect the same physical space and/or camera positioning (e.g., the physical space depicted by the scene—though not necessarily the objects and people inside that physical space—as well as the positioning of the camera or point of view inside that space are identical across the scenes).

In some embodiments, the host region identification module 110 is configured to detect a host region from input digital content, such as the target digital content. For example, the host region identification module 110 is configured to accept as input the target digital content. Next, using a number of different computerized approaches, including but not limited to a computerized search for regions that reflect some level of uniformity (e.g., a smooth region), a computerized search for regions that represent the background (as opposed to the foreground), a computerized search for regions that represent particular objects, textures, materials, shapes, places, spaces, or areas, or the prediction of host regions through use of machine learning models trained on a training set, the host region identification module 110 is configured to identify, in the target digital content, host regions for source digital content.

In some embodiments, the host region identification module 110 includes a plurality of host region identification sub-modules. Each sub-module can be dedicated towards identifying host regions in scenes with different types of camera motion (e.g., submodules for no, minimal, and maximal camera motion, or associated with a particular type of host region identification criteria. For example, a host region identification sub-module can be configured to detect only host regions with a smooth surface. As another example, a host region identification sub-module can be configured to detect only host regions with highly-textured surface. In this way, the search for host regions can be distributed and parallelized among specialized sub-modules.

In some embodiments, the host region identification module 110 can be configured to provide host region defining data that defines the dimension and/or location of a host region in the target digital content, and/or transformation objects that define the transformations that can take place for the source digital content to seamlessly integrate with the host region in the target digital content. In some embodiments, the transformations can include a geometric transformation that morphs the source digital content appropriately onto a surface in the target digital content. The transformation can take into account a relationship between the surface normal of the source digital content and the surface normal of the host region within the target digital content.

In some embodiments, the host region identification module 110 can track the host region across the duration of the source digital content (e.g., video frames across a video stream), create one or more transformation objects associated with the host region, including but not limited to one or more transformations that enables the eventual content integration to reflect the location, motion, pose, occlusion, lighting change, texture, and blur that affect the host region in the target digital content. The transformation objects can include, for example, masks, filters, kernels, homography or other matrices, images, arrays, lists of coordinates or other objects or data structures that enable a placement of the source digital content to emulate the location, motion, pose, luminance, texture, and/or level of blur of the surface, texture, material, plane, object, place, space, location, or area which is associated the host region and, thus, to appear more immersed in the target digital content, improving viewer experience.

In some embodiments, the camera motion classification module 108 is configured to classify, in an automated fashion, the scenes that compose the target digital content according to their level of camera motion. For example, the camera motion classification module 108 is configured to accept as input the frames representing one or more of the scenes of the target digital content that have been identified by the scene recognition module 106. The camera motion classification module 108 is configured to use a machine learning model, trained on samples of content with different types and levels of camera motion in digital content, to predict the type or level of camera motion in a given scene of the target digital content. The camera motion classification module 108 can use the classification information to distribute the host region identification operation to two or more host region identification sub-modules that are specifically designed to handle target digital content or scenes corresponding to a particular type or level of camera motion (e.g., scenes without camera motion are distributed to a host region identification sub-module tailored for that level of motion, while scenes with maximal camera motion are delivered to a sub-module tailored for that level of motion, and so on).

In some embodiments, the distribution module 114 is configured to accept the source digital content as an input and, from thereon, to coordinate the communication of some or all of various modules in the content integration system. For example, the distribution module 114 is configured to accept as input the target digital content and coordinate the communication between the scene recognition module 106, the camera motion classification module 108, the host region identification module 110, the storage module 116, and/or the content integration module 120.

For example, the distribution module 114 is configured to relay the target digital content to the scene recognition module 106. After optionally coordinating the communications between the scene recognition module 106, the camera motion classification module 108, and the host region identification module 110, the distribution module 114 can coordinate the storage of the resulting host region defining data, host region objects (e.g., one or more data structures or object specific to the host region), the target digital content, and/or metadata attached to the target digital content (including, for example, the duration of the target digital content, pixel value histogram, mean or average pixel values, audio transcription and/or text, optical character recognition-derived text, creator/publisher (e.g., name, audience size, history of source digital content placements, past target digital content subject matter, and preferred advertisers), display channel, platform, or device (e.g., name, audience size, display size), current or predicted number of views (or other indications of popularity), subject matter, setting, and/or the objects, people, textures, materials, shapes, locations, and activities that it depicts) until such time that source digital content will be selected for placement on the host region. Such storage may be local to itself and, in the case where the content integration module 120 is co-located with or belongs to a digital media or video hosting website or social network, may be in the source code for digital content and/or web pages that the distribution module 114 delivers to users who request the target digital content and/or web pages.

In some embodiments, the storage module 116 is configured to store the host region defining data, transformation objects, host region object, the target digital content, and/or metadata about the target digital content until such time that source digital content—to be placed upon the host region in the target digital content—is selected. The storage module 116 is configured to receive the host region defining data, transformation objects, host region object, the target digital content, and/or metadata about the target digital content from the distribution module 114 and/or the host region identification module 110 and store it until such time that a request for the target digital content to be viewed is made. In response to such a request, the storage module 116 is configured to transmit, to a content integration module 120, a message that includes the host region defining data, transformation objects, host region object, the target digital content, and/or metadata about the target digital content.

In some embodiments, the source digital content selection module 118 is configured to select the source digital content or receive the selection of the source digital content to be placed upon the host region in the target digital content.

In some embodiments, the source digital content selection module 118 is configured to select or enable the selection of source digital content to place upon the host region in the target digital content relying on methods including but not limited to receiving a selection message from a user, selection via buying, ordering, or bidding in a marketplace, and computerized or programmatic selection based on the host region defining data, host region object, the target digital content, and/or metadata about the target digital content. After the selection is made, source digital content selection module 118 is configured to deliver a message containing the source digital content that it has selected, data about the source digital content, or some other indication of the source digital content selection that has been made to either the distribution module 114 or the content integration module 120.

In some embodiments, the content integration module 120 is configured to integrate a source digital content into a host region in the target digital content. The content integration module 120 is configured to accept as input the target digital content, the source digital content, host region-defining data that defines the dimension and location of the host region in the target digital content, and/or transformation objects that define the transformations that can take place for the source digital content to seamlessly integrate with the host region in the target digital content. Subsequently, the content integration module 120 is configured to integrate the source digital content into the target digital content. The content integration module 120 is configured to integrate the source digital content into the target digital content using one or more assorted methods. For example, the content integration module 120 can be configured to create a new version of the target digital content. Alternatively, the content integration module 120 can be configured to overlay the source digital content over the target digital content during the display of the target digital content to a viewer, doing so by relying on the guidance provided by the host region-defining data that defines the dimension and location of host region in the target digital content, and/or transformation objects that define the transformations for the target digital content to seamlessly integrate with the host region in the target digital content.

In some embodiments, the scene recognition module 106, the camera motion classification module 108, the host region identification module 110, the host region approval module 112, the distribution module 114, the storage module 116, the source digital content selection module 118, and/or the content integration module 120 can be implemented in software. The software can run on a processor 102 capable of executing computer instructions or computer code.

In other embodiments, the scene recognition module 106, the camera motion classification module 108, the host region identification module 110, the host region approval module 112, the distribution module 114, the storage module 116, the source digital content selection module 118, and/or the content integration module 120 can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

In some embodiments, two or more modules 106-120 can be implemented on the same integrated circuit, such as ASIC, PLA, DSP, or FPGA, thereby forming a system on chip. Subroutines can refer to portions of the computer program and/or the processor/special circuitry that implement one or more functions.

In some embodiments, the interface 122 is configured to provide communication between the content integration system 100 and other computing devices in a communications network. The interface 122 can be implemented in hardware to send and receive signals in a variety of mediums, such as optical, copper, and/or wireless interfaces, and in a number of different protocols, some of which may be non-transient.

The content integration system 100 can be operatively coupled to external equipment or to a communications network in order to receive instructions and/or data from the equipment or network and/or to transfer instructions and/or data to the equipment or network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks.

In some embodiments, the content integration system 100 can include user equipment. The user equipment can communicate with one or more radio access networks and with wired communication networks. The user equipment can be a cellular phone. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

In some embodiments, the content integration system 100 can include a server. The server can operate using operating system (OS) software. In some embodiments, the OS software is based on a Linux software kernel and runs specific applications in the server such as monitoring tasks and providing protocol stacks. The OS software allows server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

High Level Operation of Content Integration System

Figure 2:
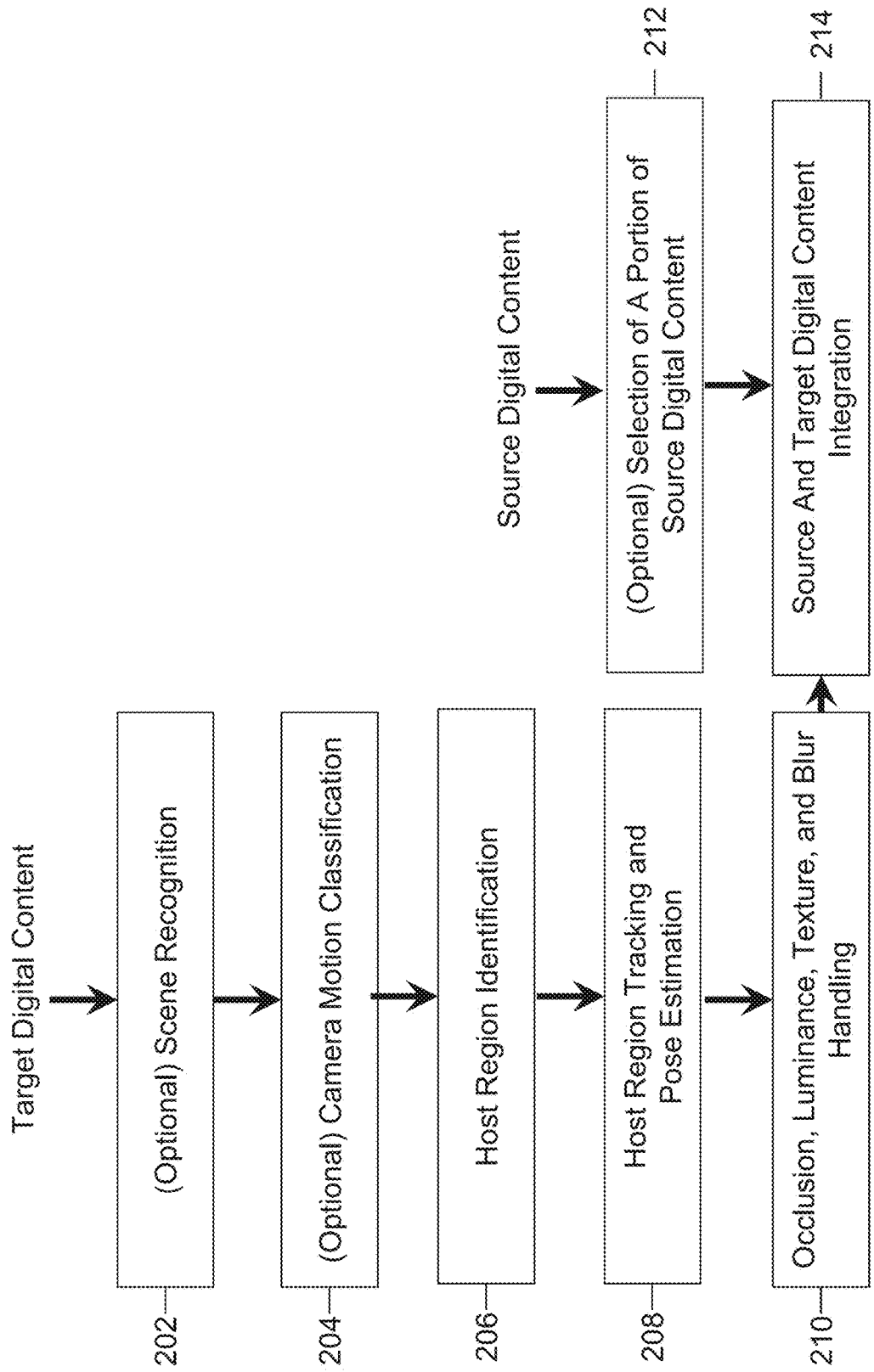
FIG. 2 illustrates an operation of a content integration system in accordance with some embodiments.

FIG. 2 illustrates an operation of a content integration system 100 in accordance with some embodiments. In step 202, the content integration system 100 can receive the target digital content and optionally use the scene recognition module 106 to recognize one or more scenes in the target digital content. In step 204, the content integration system 100 can optionally use a camera motion classification module 108 to classify the scene(s) detected In step 202 into one of a plurality of scene categories.

In step 206, the content integration system 100 can use a host region identification module 110 to identify a host region within the target digital content. As described above, the host region identification module 110 can use a variety of features to identify a host region, including, for example, the texture information. In some cases, the host region identification module 110 can include a plurality of host region identification sub-modules, each of which is dedicated to detecting a host region within a particular type of scene.

In step 208, when the target digital content includes multiple frames, the host region identification module 110 can be configured to track the host region, detected in one of the frames, across multiple frames. For example, when the host region identification module 110 detects a first host region in a first frame, the host region identification module 110 can be configured to track the first host region across frames to detect a second host region in a second frame. Also, optionally, the host region identification module 110 can be configured to estimate a pose (e.g., a surface normal) of the detected host region. In step 210, the host region identification module 110 can handle the occlusion, luminance, texture, and/or the blur within the target digital content.

In step 212, the content integration system 100 can receive a source digital content, and, optionally, select a portion of the received source digital content for integration into the target digital content. In step 214, the content integration system 100 can use a content integration module 120 to integrate the source digital content (or a portion thereof) into the target digital content. For example, the content integration module 120 can overlay or place the source digital content onto the detected host region of the target digital content.

Figure 3A:
FIGS. 3A-3U illustrate exemplary source digital content, target digital content, and integrated digital content integrated using the content integration system in accordance with some embodiments.
Figure 3B:
Figure 3C:
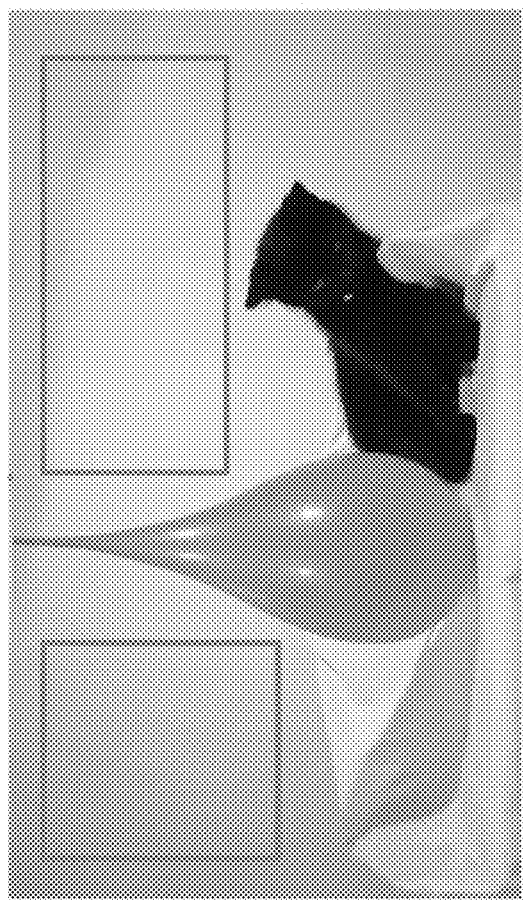
Figure 3D:
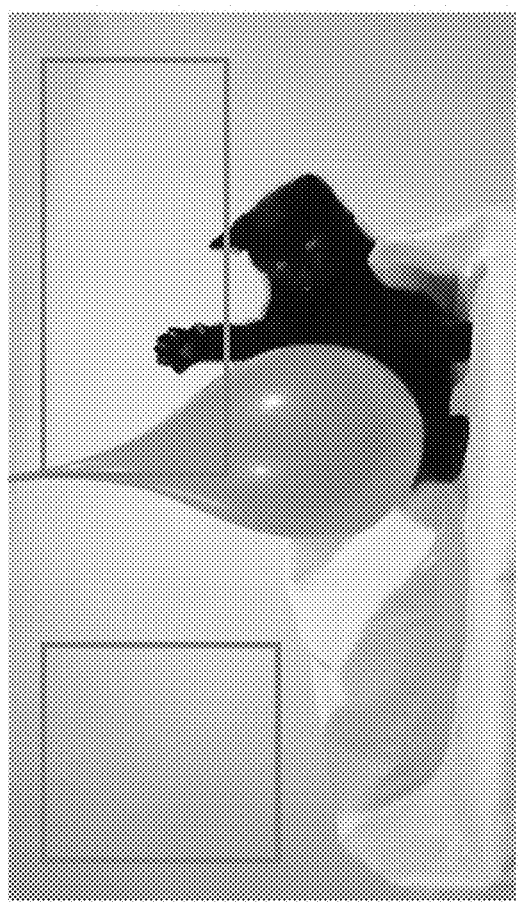
Figure 3E:
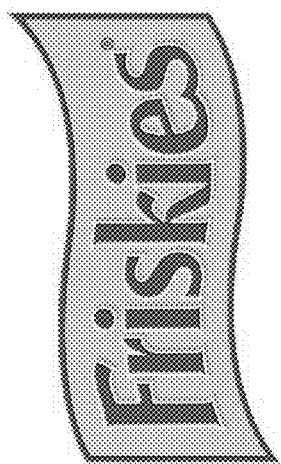
Figure 3F:
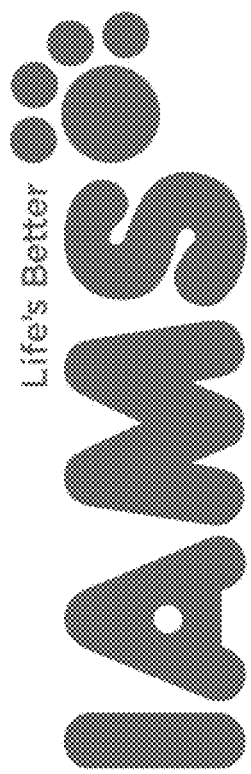
Figure 3G:
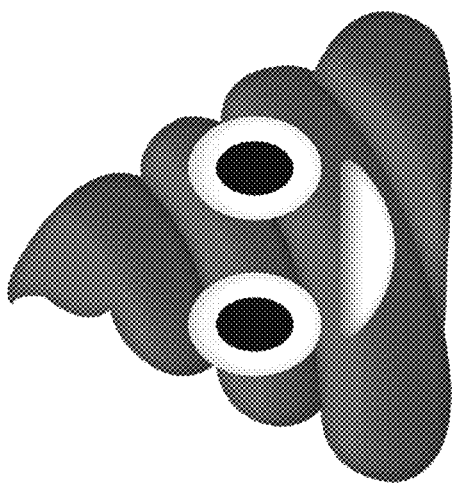
Figure 3H:
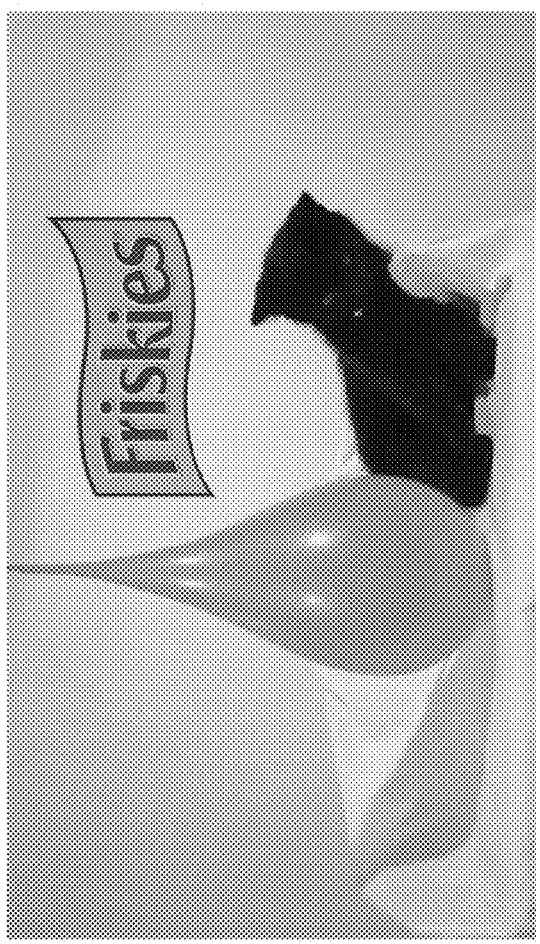
Figure 31:
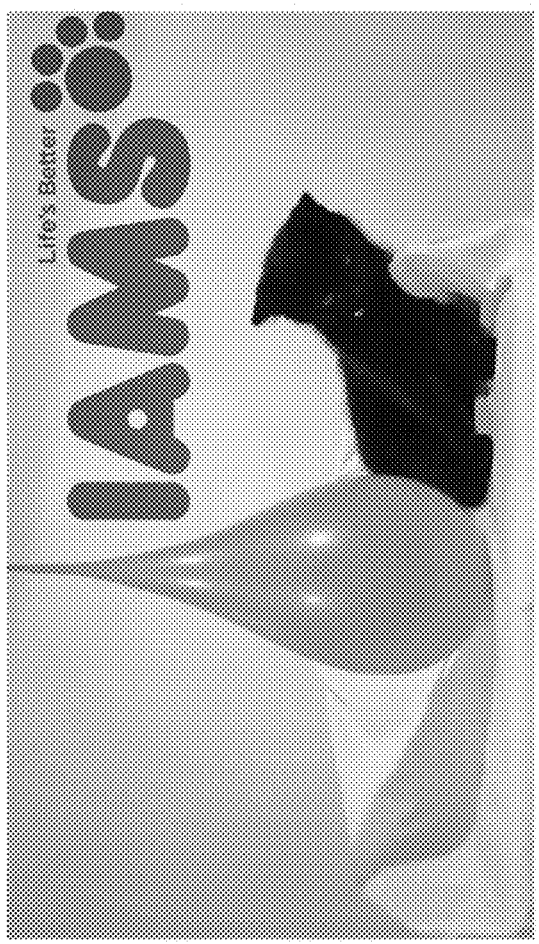
Figure 3J:
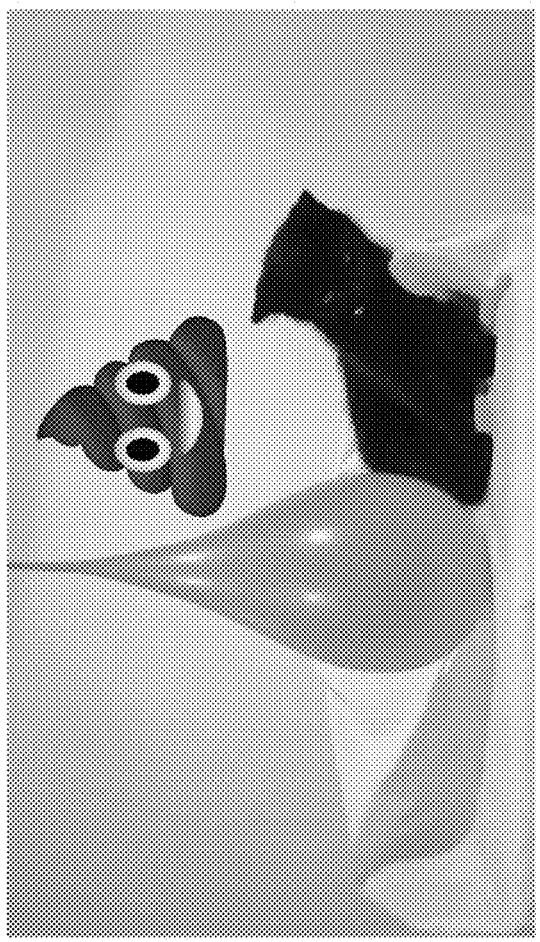
Figure 3K:
Figure 3L:
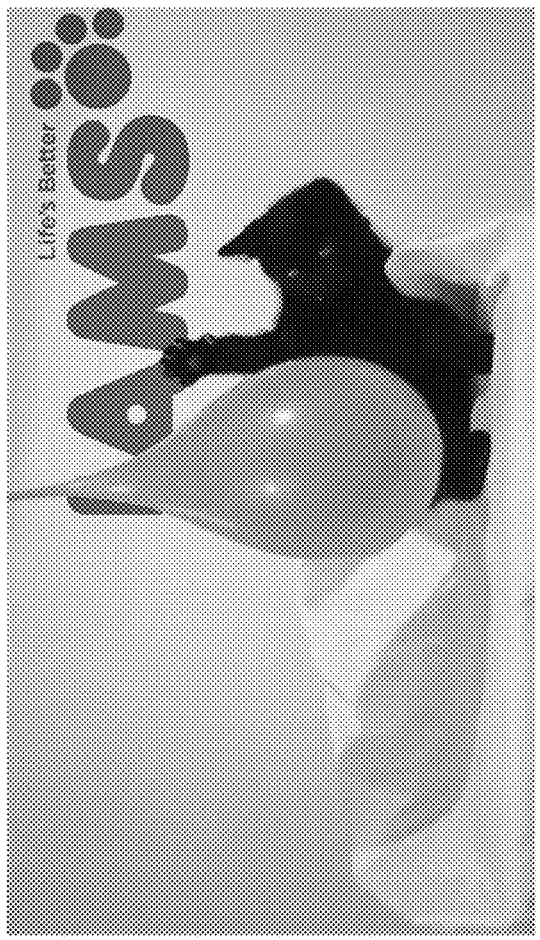
Figure 3M:
Figure 3N:
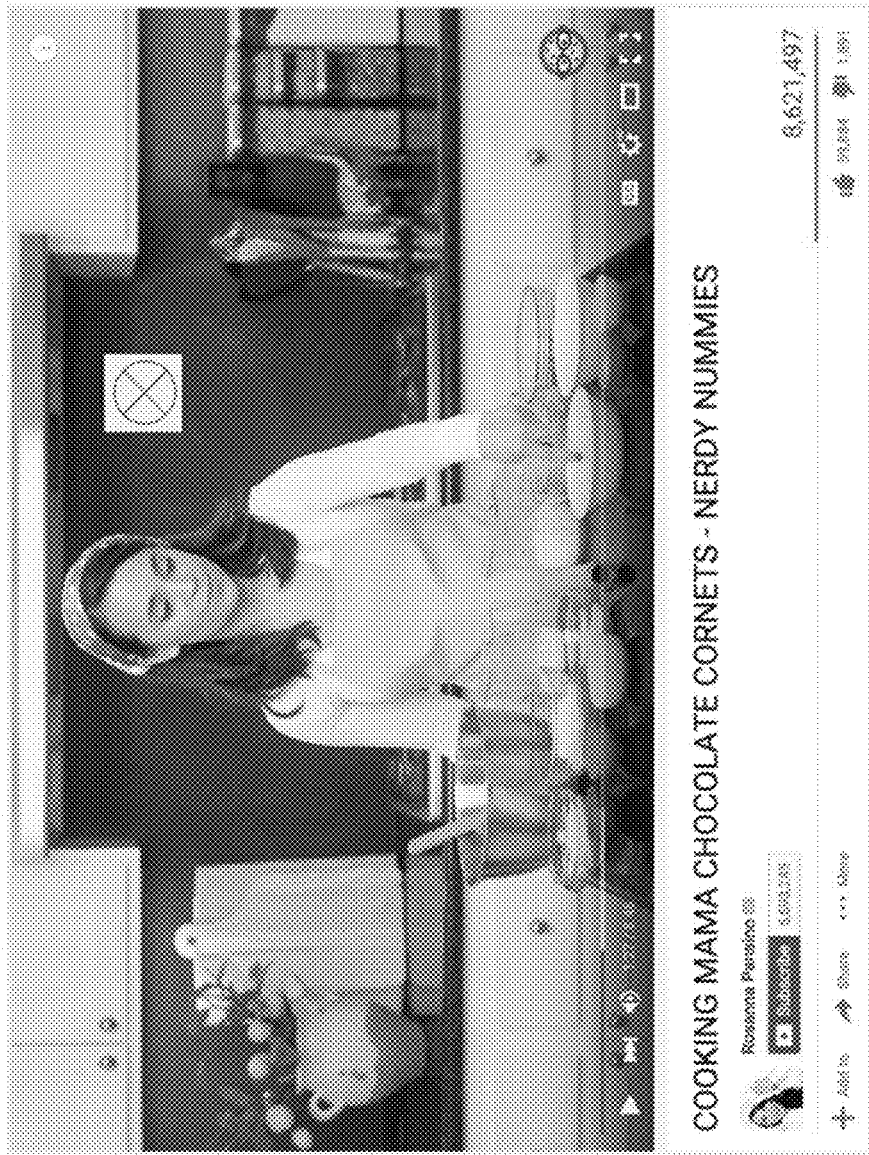
Figure 3O:
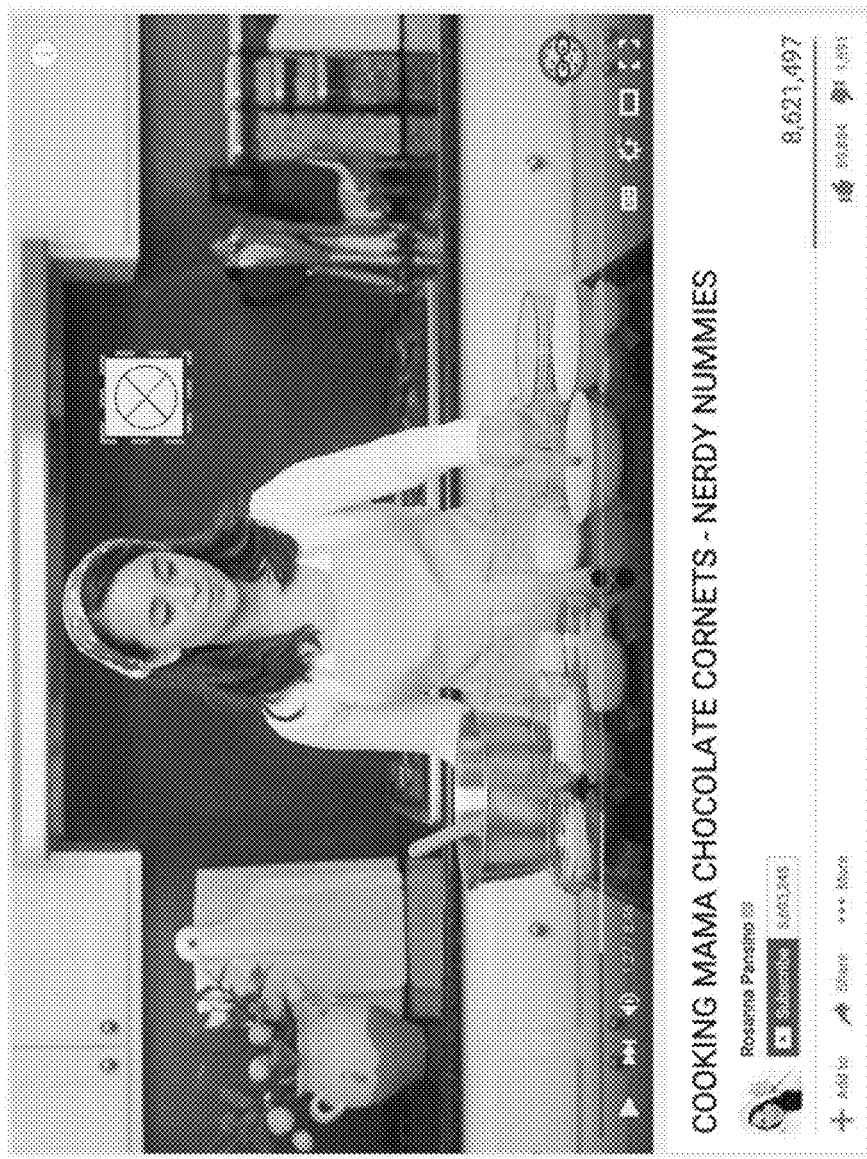
Figure 3P:
Figure 3Q:
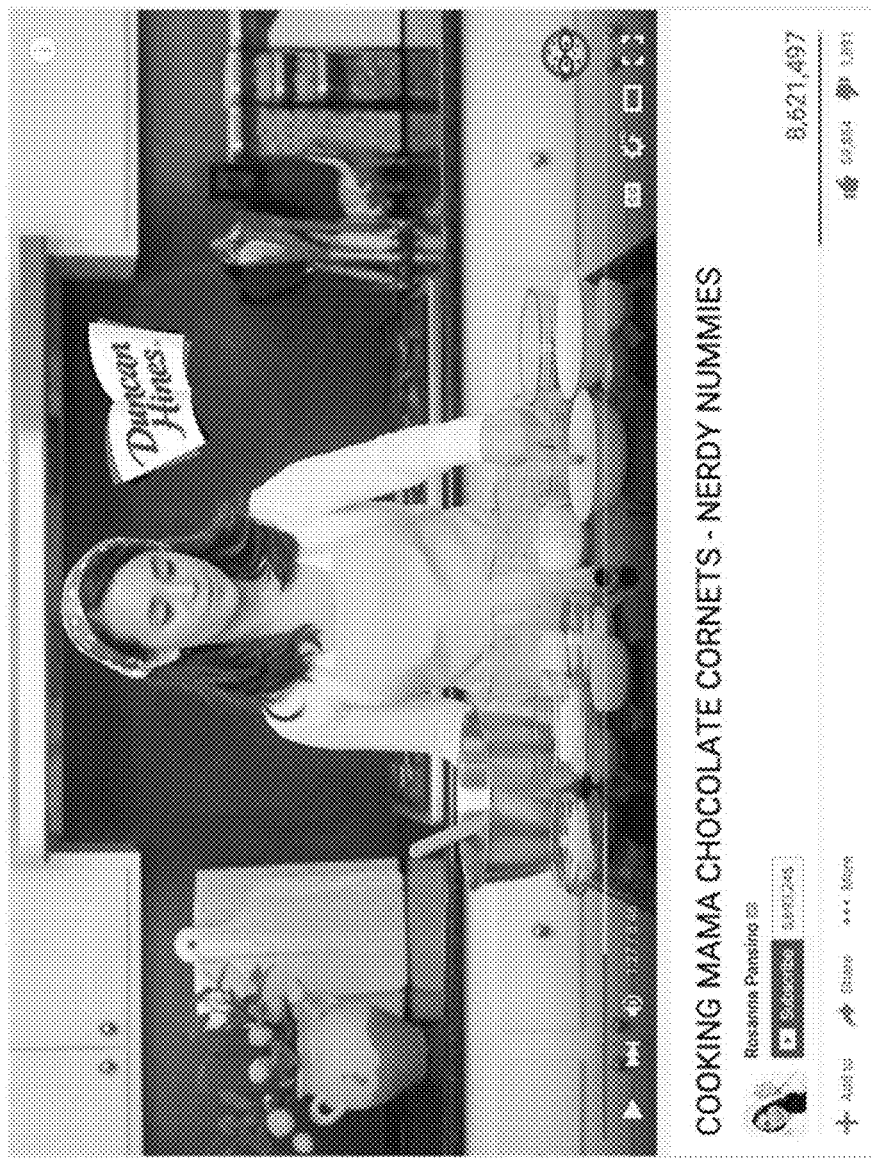
Figure 3R:
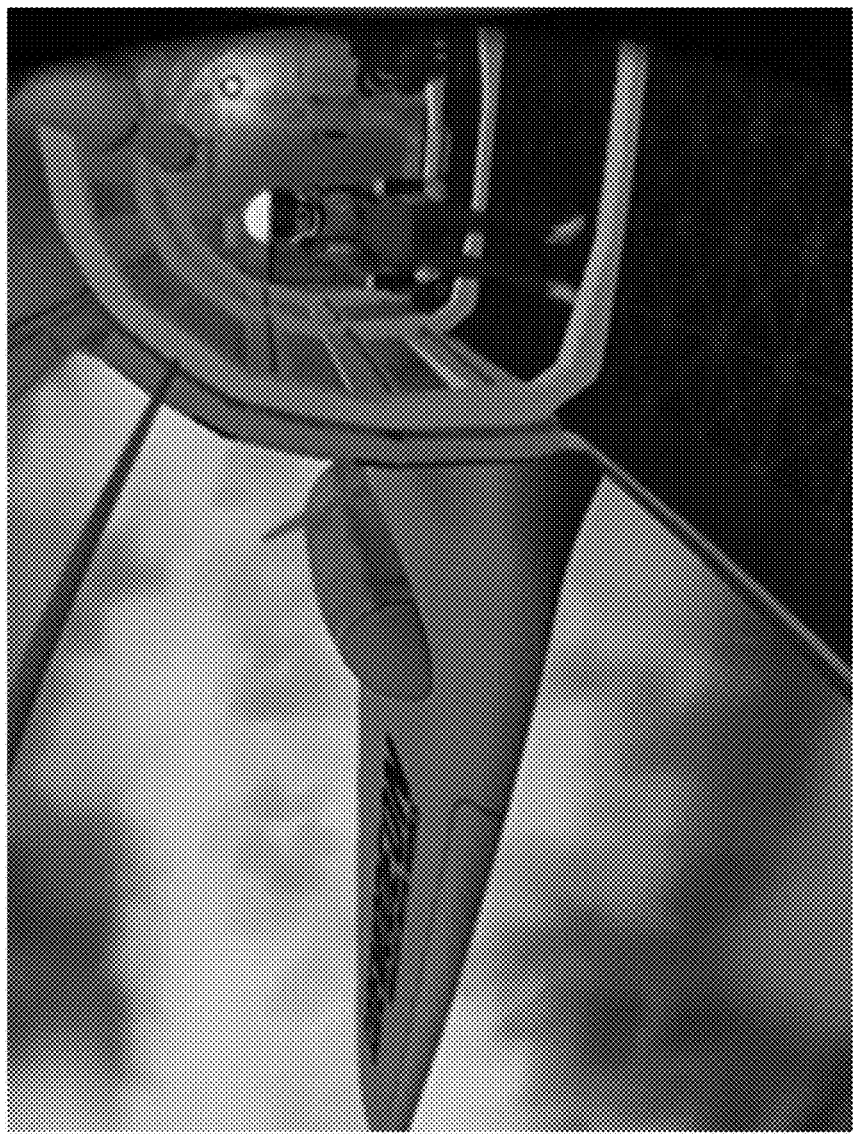
Figure 3S:
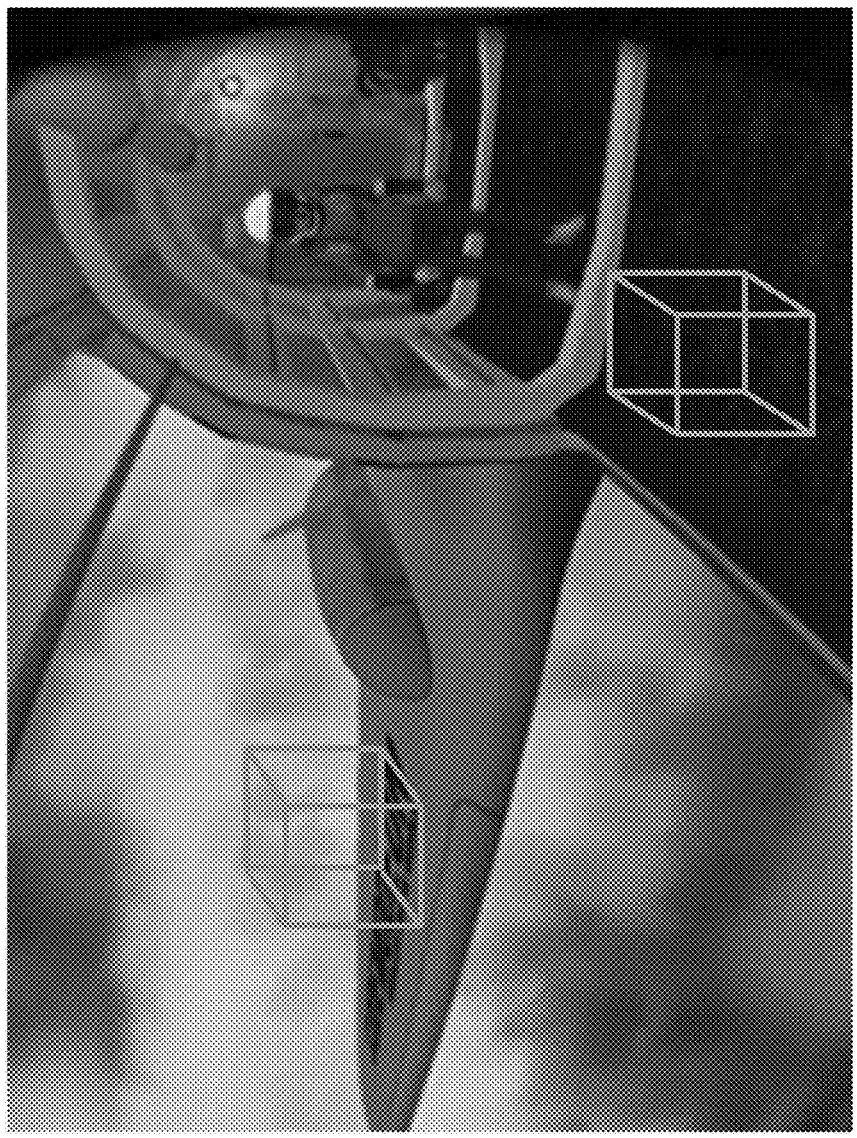
Figure 3T:
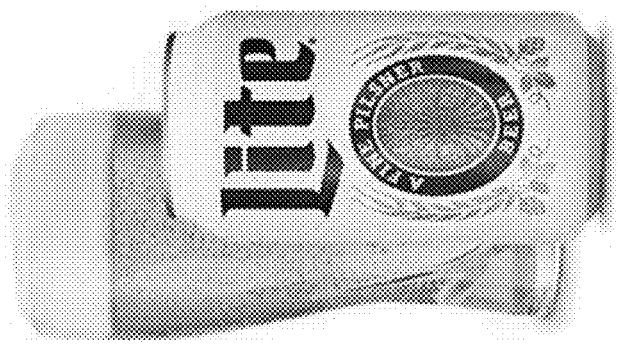
Figure 3U:
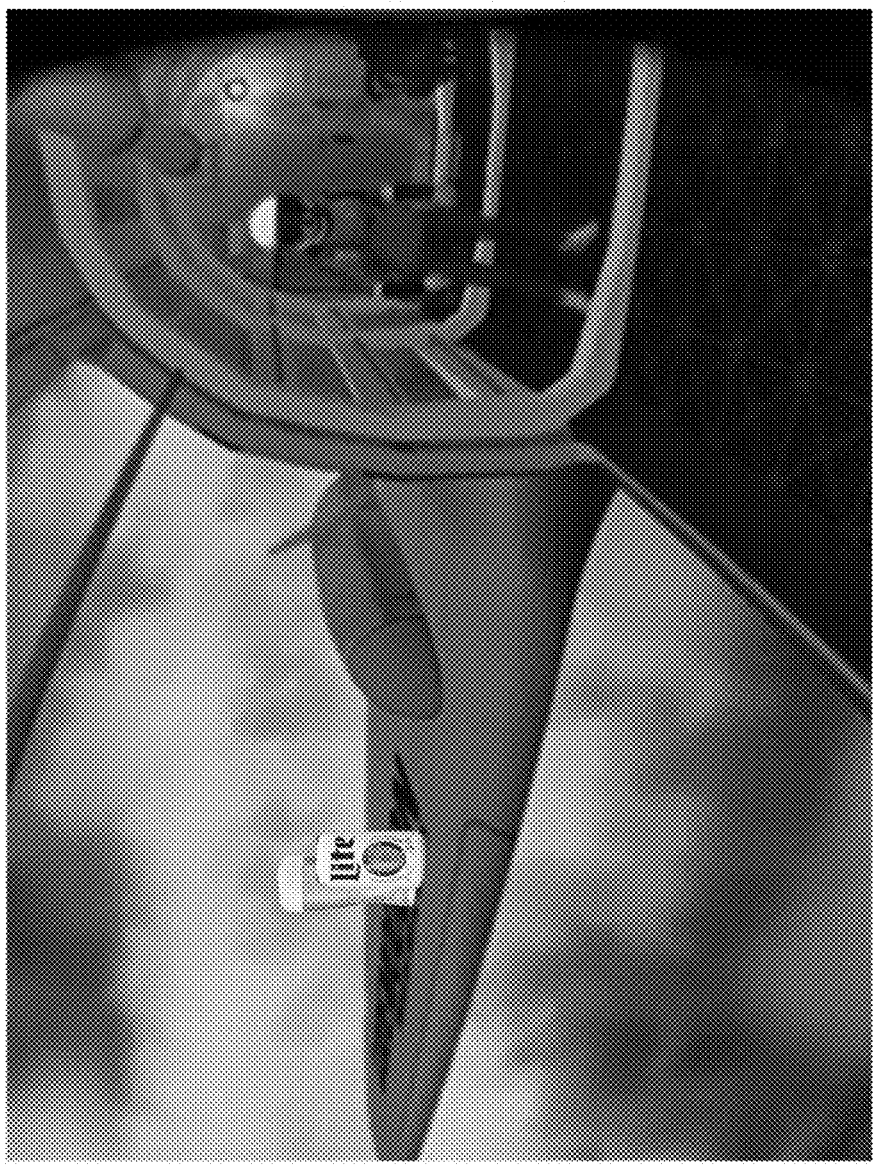

FIGS. 3A-3U illustrate exemplary source digital content, target digital content, and integrated digital content integrated using the content integration system in accordance with some embodiments. FIG. 3A illustrates a first frame of target digital content including a video. FIG. 3B illustrates a second frame of the target digital content, this one occurring sometime after the first frame illustrated in FIG. 3A in the sequence of frames comprising the video. FIG. 3C illustrates two host regions, demarcated by rectilinear bounding boxes, as identified in the first frame. FIG. 3D illustrates two host regions, defined and demarcated by rectilinear bounding boxes, as identified in the second frame.

FIGS. 3E-3G illustrate single frames of source digital content including Portable Network Graphics (PNG) raster graphics files, with 3E and 3F depicting advertisement images and 3G depicting a non-advertising image. FIG. 3H-3J illustrate the placement of each instance of the source digital content upon one of the two host regions in the first frame, after the source digital content has been transformed so as to a reflect the motion, positioning, pose, occlusion, luminance, texture, and blur of the host regions as they existed in the target digital content. FIGS. 3K-3M illustrate the placement of each instance of the source digital content upon one of the two host regions in the second frame, after the source digital content has been transformed so as to reflect the occlusion, luminance, texture, and blur of the host regions as they existed in the target digital content.

FIG. 3N illustrates a single frame of target digital content including a video in which a graphical marker has been placed. FIG. 3O illustrates a host region, defined and demarcated by a rectilinear bounding box, that have been identified in the first frame by detecting the marker. FIG. 3P illustrates source digital content including Portable Network Graphics (PNG) raster graphics files depicting an advertisement image. FIG. 3Q illustrates the placement of the source digital content upon one of the two host regions in the first frame, after the source digital content has been transformed so as to reflect the occlusion, luminance, texture, and blur of the host regions as they existed in the target digital content.

FIG. 3R illustrates a first frame of target digital content including three-dimensional virtual reality content. FIG. 3S illustrates two host regions, defined and demarcated by 3D bounding boxes, at have been identified in that first frame using non-marker-based methods. FIG. 3T illustrates a single frame of source digital content including a 3D illustration of a product. FIG. 3U illustrates the placement of the source digital content upon one of the two host regions in the target digital content, after the source digital content has been transformed so as to reflect the occlusion, luminance, texture, and blur of the host regions as they existed in the target digital content.

Target Digital Content

The present disclosed subject matter is exemplified in or may be practiced by any digital content intended for visual display, including but not limited to digital photographs, illustrations, videos (whether streaming or file and whether two dimensional, 360 degrees, or spherical), animations, video games, graphics displays, augmented reality, mixed reality, and virtual reality experiences (the "target digital content").

The original digital content will exist as a file, data, or some other discrete or continuous and streaming entity ("file"), itself composed of one or more frames (e.g., still images, to be displayed in succession) or other states to be displayed at given points in time (collectively, "frames"). Each of its frames can further be composed of individual pixels, dots, image points, or other smallest addressable elements (collectively, "pixels").

From either the file, the frames composing that file, or any components or subdivisions of those frames such as pixels, windows, or localities (collectively, "the file or any of its components") the content integration system can be configured to extract certain features or attributes. These features or attributes, collectively referred to as available features, can include, but are not limited to, the following examples: (A) pixel values including but not limited to color, brightness, luminance, hue, radiance, lightness, colorfulness, chroma, intensity, saturation, or depth, as well as localized histograms or other aggregations of the same (collectively, "pixel values"); (B) values derived from said pixel values, including but not limited to approximations of the magnitude of the gradients of the image intensity function ("gradient") as extracted through the convolution of the image using a kernel, including but not limited to the Sobel operator, as described in Sobel & Feldman, *Isotropic 3×3 Image Gradient Operator*, SAIL (1968), herein incorporated by reference in the entirety, or the Prewitt operator, as described in Prewitt, *Object Enhancement and Extraction, in Picture Processing and Psychopictorics*, Academic Press (1970), herein incorporated by reference in the entirety, as well as localized histograms or other aggregations of the same (collectively, "pixel-derived values"); (C) features derived from localized wavelet transforms, including but not limited to the method described in Meyer, *Wavelets and Operators*, Cambridge Univ. Press (1992), herein incorporated by reference in the entirety; (D) Haar-like features, including but not limited to those derived using the method described in Viola & Jones, *Rapid Object Detection Using a Boosted Cascade of Simple Features*, CVPR (2001), herein incorporated by reference in the entirety; (E) local keypoint features extracted through methods such as SIFT, described in U.S. Pat. No. 6,711,293, herein incorporated by reference in the entirety, SURF, described in U.S. Patent application 2009238460, herein incorporated by reference in the entirety, GLOH, including but not limited to the method described in Mikolajczyk & Schmid, *A Performance Evaluation of Local Descriptors*, TPAMI (2005), herein incorporated by reference in the entirety, HOG, including but not limited to the method described in Dalal & Triggs, *Histograms of Oriented Gradients for Human Detection*, CVPR (2005), herein incorporated by reference in the entirety, or ORB, including but not limited to the method described in Rublee et al., *Orb: An Efficient Alternative to SIFT or SURF*, ICCV (2011), herein incorporated by reference in the entirety; (F) edge features derived through: (i) Canny Edge Detection as described in Canny, *A Computational Approach To Edge Detection*, TPAMI (1986), herein incorporated by reference in the entirety; (ii) Deriche edge detection as described in Deriche, *Using Canny's Criteria to Derive a Recursively Implemented Optimal Edge Detector*, IJCV 1 (1987), herein incorporated by reference in the entirety; (iii) Roberts cross edge detection as described in Roberts, *Machine Perception of Three-Dimensional Solids*, Technical Report 315, MIT (1963), herein incorporated by reference in the entirety; (G) corner features derived through: (i) Harris corner extraction as described in Harris & Stephens, *A Combined Corner and Edge Detector*, AVC (1988), herein incorporated by reference in the entirety; (ii) Shi-Tomasi corner extraction as described in Shi & Tomasi, *Good Features to Track*, CVPR (1994), herein incorporated by reference in the entirety; (iii) the level curve curvature method as described in Kitchen & Rosenfeld, *Gray-level Corner Detection*, Pattern Recognition Letters 1 (1982), herein incorporated by reference in the entirety; (iv) the Hessian feature strength method as described in Lindeberg & Garding, *Shape-adapted Smoothing in Estimation of 3-D Depth Cues from Affine Distortions of Local 2-D Structure*, IVC 15 (1997), herein incorporated by reference in the entirety; (v) SUSAN, as described in Smith & Brady, *SUSAN—a New Approach to Low Level Image Processing*, IJCV 23 (1997), herein incorporated by reference in the entirety; (vi) FAST, including but not limited to the method described in Rosten & Drummond, *Machine Learning for High-speed Corner Detection*, ECCV (2006), herein incorporated by reference in the entirety; (H) blob features extracted through the use of: (i) the Laplacian of Gaussian (LoG), including but not limited to the method described in Kong et al., *A Generalized Laplacian of Gaussian Filter for Blob Detection and Its Applications*, IEEE Trans. Cybern. 6 (2013), herein incorporated by reference in the entirety; (ii) Difference of Gaussians (DoG) or Determinant of Hessian (DoH), as described in Lindeberg, *Image Matching Using Generalized Scale-space Interest Points*, JMIV 52 (2015), herein incorporated by reference in the entirety; (iii) MSER, including but not limited to the method described in Matas et al., *Robust Wide Baseline Stereo from Maximally Stable Extremal Regions*, BMVC (2002), herein incorporated by reference in the entirety; (iv) PCBR, including but not limited to the method described in Deng et al. (2007), *Principal Curvature-based Region Detector for Object Recognition*, IEEE (2007), herein incorporated by reference in the entirety; (I) features extracted from a Hough transform, including but not limited to the method described in Duda & Hart, *Use of the Hough Transformation to Detect Lines and Curves in Pictures*, CACM (1972), herein incorporated by reference in the entirety; (J) structure tensor features, derived from methods including but not limited to the one described in Knutsson, *Representing Local Structure Using Tensors*, SCIA (1989), herein incorporated by reference in the entirety; (K) affine invariant features derived from affine shape adaptation, including but not limited to: (i) the method described in Lindeberg & Garding, *Shape-adapted Smoothing in Estimation of 3-D Depth Cues from Affine Distortions of Local 2-D Structure*, IVC 15 (1997), herein incorporated by reference in the entirety; (ii) Harris affine feature detection, including but not limited to the method described in Mikolajczyk et al., *A Comparison of Affine Region Detectors*, IJCV (2005), herein incorporated by reference in the entirety; (iii) Hessian affine methods of affine invariant feature detection, including but not limited to the method described in Mikolajczyk & Schmid, *An Affine Invariant Interest Point Detector*, ICCV (2002), herein incorporated by reference in the entirety; or (L) segment features derived from methods including but limited to: (i) optical flow segmentation, including but not limited to the method described in Zitnick et al., *Consistent Segmentation for Optical Flow Estimation*, ICCV (2005), herein incorporated by reference in the entirety; (ii) edge detection segmentation, including but not limited to the method described in Lindeberg & Li, *Segmentation and Classification of Edges Using Minimum Description Length Approximation and Complementary Junction Cues*, CVIU 67 (1997), herein incorporated by reference in the entirety; (iii) thresholding segmentation using k-means including but not limited to the method described in Beigh et al., *Image Segmentation using K-means Clustering and Thresholding*, IRJET (2016); (iv) graph-based image segmentation, including but not limited to the method described in Felzenszwalb & Huttenlocher, *Efficient Graph-based Image Segmentation*, IJCV (2004), herein incorporated by reference in the entirety; (v) mean shift clustering segmentation, including but not limited to the method described in Comaniciu & Meer, *Mean Shift: A Robust Approach toward Feature Space Analysis*, PAMI (2002), herein incorporated by reference in the entirety; (vi) blob-based segmentation methods, including but not limited to MSER; (vii) SLIC super pixel segmentation, including but not limited to the method described in Achanta et al., *SLIC Superpixels Compared to State-of-the-art Superpixel Methods*, TPAMI (2012); (viii) watershed super pixel segmentation, including but not limited to the method described in Khiyal et al., *Modified Watershed Algorithm for Segmentation of 2D Images*, IISIT (2009), herein incorporated by reference in the entirety; (ix) quick shift super pixel segmentation, including but not limited to the method described in Fulkerson & Soatto, *Really Quick Shift: Image Segmentation on a GPU*, CVGPU (2010), herein incorporated by reference in the entirety; (x) neural net-based segmentation including but not limited to the method described in Ozkan et al., *Neural-network Based Segmentation of Multi-modal Medical Images: A Comparative and Prospective Study*, IEEE Trans Med Imag. 12 (1993); (M) contour feature data, extracted by methods including but not limited to the method described in Deguchi, *Multi-scale Curvatures for Contour Feature Extraction*, ICPR (1988); (N) line feature data, extracted by methods including but not limited to the method described in Heij den, *Edge and Line Feature Extraction Based on Covariance Models*, IEEE Trans. Pattern Anal. Mach. Intell. (1995); (O) any combinations of these or other available features.

In some embodiments, the target digital content can be created at a target digital content source, and can be found in the procedure, function, thread, process, application, memory, cache, disk or other storage, database, computer, device, or network on which it was created, recorded, edited, handled, or stored.

In some embodiments, at any time during or after its creation or origination, the target digital content or its components are transferred, over the internet or any other network, from the target digital content source to the content integration system.

In some embodiments, the content integration system can maintain the target digital content in a memory device 104. For example, the content integration system can receive the target digital content over the interface from the target digital content source, and store the target digital content in the memory device 104.

In some embodiments, the content integration system 100 can maintain the target digital content in a distribution module 114 dedicated to hosting or serving digital content and including but not limited to digital content distribution websites or applications or social media networks.

Scene Recognition

In some embodiments, as an optional, preliminary step in the host region identification operation, the content integration system 100 is configured to receive or retrieve the target digital content and to use the scene recognition module 106 to parse the target digital content into scenes, shots, or cuts ("scenes"), where each scene represents a series of interrelated and/or consecutive frames, a continuous action in time, or a contiguous physical space. The scene recognition module 106 can include open source software such as PySceneDetect.

In some embodiments, the scene recognition module 106 is co-located with the target digital content source. This allows for scene recognition to occur up-front, such that later steps in the content integration process can be distributed or parallelized according to scene.

In some embodiments, the scene recognition module 106 is not co-located with the source of the target digital content, but is the first point of contact for this source, meaning that the target digital content is transmitted directly from the target digital content source to the scene recognition module 106, without intermediary modules. This allows for scene recognition to occur relatively up-front, such that later steps in the content integration process can be distributed or parallelized according to the scene, yet allows for scene recognition to occur on specialized resources that are impractical to contain on target digital content sources.

In some embodiments, where the scene recognition module 106 is not co-located with the target digital content source, the distribution module 114 (which is configured to accept the source digital content as an input and, from thereon, coordinate the communication of some or all of the various modules in the content integration system) controls the messages and transmission of data between the two.

In some embodiments, as a preliminary step in host region identification, the host region identification module 110 can be configured to identify and group those scenes that, while not sequential in the target digital content, nonetheless represent the same physical space and same camera positioning ("duplicate space and camera position recognition"). This allows these scenes to be treated the same during the host region identifications process—e.g., host regions identified in one scene can be assumed to be present in the others, barring their occlusion by objects which, inside the scene depicted by the target digital content, pass between the camera or viewer perspective and the surface, texture, material, plane, object, place, space, location, or area which is associated the host region to occlude the host region. This allows the host region identification module 110 to efficiently identify host regions across multiple frames by assuming that host regions which appear in one scene appear in other scenes with duplicate space and camera position recognition. Thus the host region defining data for a host region identified in one scene should carry over to the other scenes with duplicate space and camera position recognition.

In some embodiments, the host region identification module 110 is configured to perform the duplicate space and camera position recognition by finding the relative distance between pixels in frames corresponding to the scenes.

Figure 4:
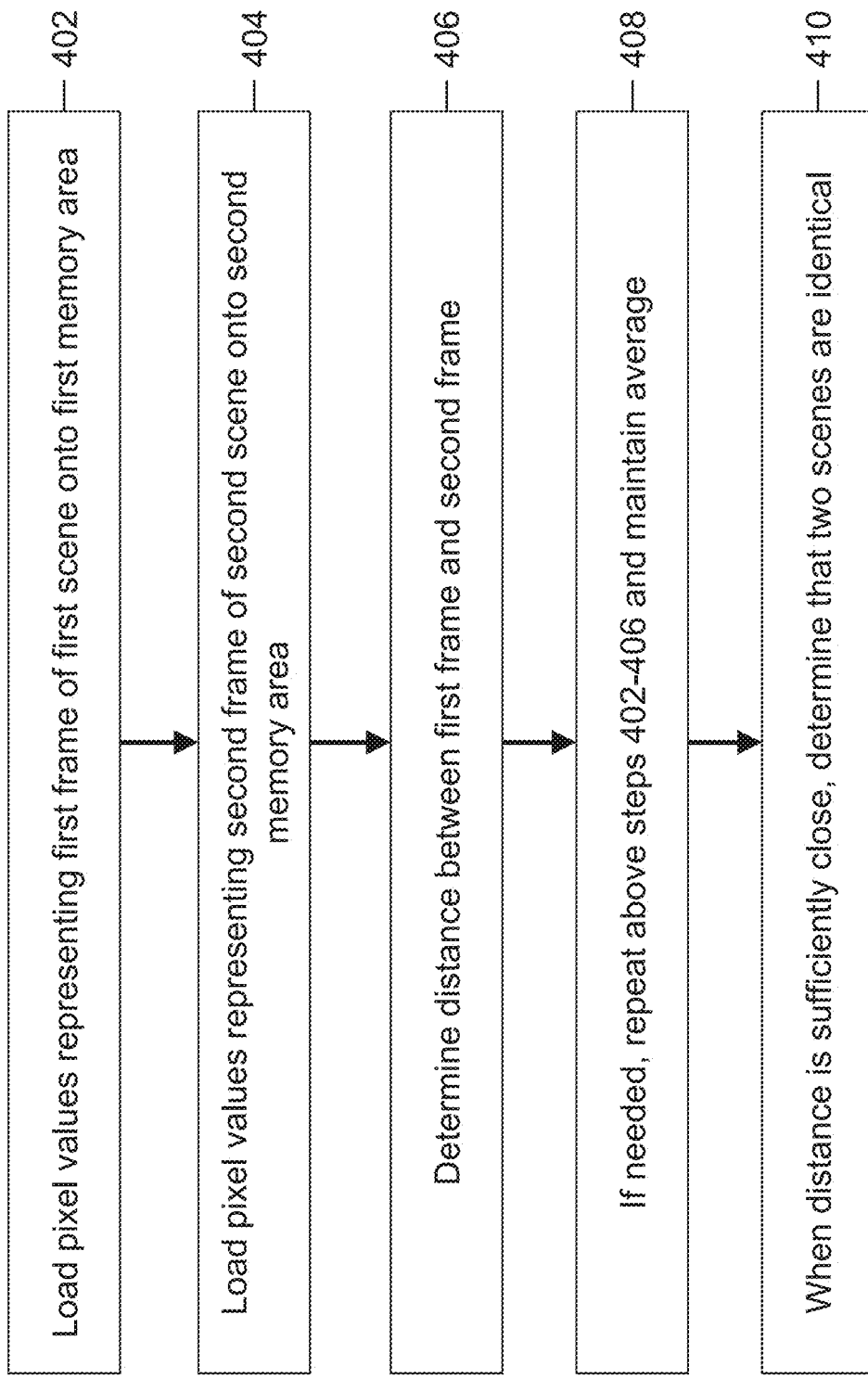
FIG. 4 illustrates duplicate space and camera position recognition as performed by a host region identification module in accordance with some embodiments.

FIG. 4 illustrates the duplicate space and camera position recognition as performed by the host region identification module 110 in accordance with some embodiments.

In step 402, the host region identification module 110 is configured to load the pixel values representing the first frame of a first scene onto a first frame buffer or a first memory region. In step 404, the host region identification module 110 is configured to load the pixel values representing the second frame of a second scene onto a second frame buffer or a second memory region. In step 406, the host region identification module 110 is configured to perform memory operations to subtract, find the Euclidian distance, or otherwise find the distance between the values of the first and second frames' pixels. In step 408, optionally, when multiple frames are grouped together for the first scene and the second scene, the host region identification module 110 is configured to repeat steps 402-406 to compute the distance between corresponding frames from the first scene and the second scene, and maintain an average distance between the corresponding frames from the first scene and the second scene. In step 410, when the (average) distance between the corresponding frames from the first scene and the second scene is less than a predetermined threshold, the host region identification module 110 is configured to determine that the first scene and the second scene correspond to the same space and camera position.

In some embodiments, the host region identification module 110 is configured to perform the duplicate space and camera position recognition by performing background modeling ("background modeling") to determine which pixels include the background of each frame of the target digital content. Once the background pixels are identified in one or more frames of identified scenes of the target digital content, the values of those pixels may be compared in order to predict whether or not the scenes reflect the same physical space and the same camera positioning.

Such background modeling can be achieved by: (A) basic background modeling, where a model of the background is derived by taking: (i) the average, across the frames of the digital content, of all pixel values at each location, as described in Lee & Hedley, *Background Estimation for Video Surveillance*, IVCNZ (2002), herein incorporated by reference in the entirety; (ii) the median, across the frames of the digital content, of all pixel values at each location, as described in McFarlane & Schofield, *Segmentation and Tracking of Piglets in Images*, BMVA (1995), herein incorporated by reference in the entirety; or the (iii) finding the mode of the histogram of the pixel value series over time, including but not limited to the method described in Zheng et al., *Extracting Roadway Background Image: A Mode Based Approach*, Journal of Transportation Research Report, 1944 (2006), herein incorporated by reference in the entirety; (B) statistical background modeling, where pixels are classified as foreground or background based on statistical variables including: (i) single Gaussian, as described in Wren et al., *Real-Time Tracking of the Human Body*, TPAMI, (1997), herein incorporated by reference in the entirety; (ii) Mixture of Gaussians, as described in Stauffer & Grimson, *Adaptive Background Mixture Models for Real-time Tracking*, CVPR (1999), herein incorporated by reference in the entirety; (iii) Kernel Density Estimation, as described in Elgammal et al., *Non-parametric Model for Background Subtraction*, ECCV (2000), herein incorporated by reference in the entirety; (C) fuzzy background modeling, where the background is modeled using: (i) a fuzzy running average, as described in Sigari et al., *Fuzzy Running Average and Fuzzy Background Subtraction: Concepts and Application*, Int'l J. of Computer Science and Network Security 8 (2008), herein incorporated by reference in the entirety; (ii) Type-2 fuzzy mixture of Gaussians, as described in El Baf et al., *Type-2 Fuzzy Mixture of Gaussians Model: Application to Background Modeling*, ISVC (2008), herein incorporated by reference in the entirety; (D) background clustering, where the background model supposes that each pixel in the frame can be represented temporally by clusters and where inputted pixels are matched against the corresponding cluster group and are classified according to whether the matching cluster is considered part of the background, using either the K-mean algorithm, as described in Butler & Sridharan, *Real-Time Adaptive Background Segmentation*, ICAS SP (2003), herein incorporated by reference in the entirety, or using Codebook as described in Kim et al., Real-time *Foreground-Background Segmentation using Codebook Model*, Real-Time Imaging (2005), herein incorporated by reference in the entirety; (E) neural network background modeling where the background is represented by the mean of the weights of a neural network suitably trained on N clean frames, and where network learns how to classify each pixel as background or foreground, as described in Culbrik et al., *Neural Network Approach to Background Modeling for Video Object Segmentation*, IEEE NN (2007), herein incorporated by reference in the entirety, or Maddalena & Petrosino, *A Self Organizing Approach to Background Subtraction for Visual Surveillance Applications*, IEEE IP (2008), herein incorporated by reference in the entirety; (F) wavelet background modeling where background model is defined in the temporal domain, utilizing the coefficients of discrete wavelet transform (DWT), as described in Biswas et al., *Background Modeling and Implementation Using Discrete Wavelet Transform: a Review*, JICGST-GVIP 11 (2011), herein incorporated by reference in the entirety; (G) background estimation where the background is estimated using a filter and any pixel of the current image that deviates significantly from its predicted value is declared foreground, including approaches using: (i) a Wiener filter, as described in Toyama et al., *Principles and Practice of Background Maintenance*, ICCV (1999), herein incorporated by reference in the entirety; (ii) a Kalman filter, as described in Messelodi et al., *A Kalman Filter Based Background Updating Algorithm Robust to Sharp Illumination Changes*, ICIAP (2005), herein incorporated by reference in the entirety; or (iii) a Tchebychev filter, as described in Chang et al., *Vision Modules for a Multi Sensory Bridge Monitoring Approach*, ITSC (2004), herein incorporated by reference in the entirety; (H) texture-based background detection, whereby regions in the digital content or its components are deemed background because, after an analysis of their texture they are identified or classified as possessing a texture commonly associated with the background of images (including but not limited to brick, wood paneling, trees, sea, or sky textures), as determined by comparing the target digital contents or its components to a: (i) a template or (ii) machine learning-derived model including but not limited to a convolutional neural network that has been trained on labelled examples of background textures; (I) background modeling based on depth information or other information about the 3D geometry of the scene that is depicted by the target digital content ("depth information") where the target digital content or its components are determined to be background based on whether or not their predicted depth information or positioning in a scene is greater than or equal to some value or positioning that is set as the background threshold, the depth information being either intrinsic to the target digital content (e.g., the D channel in an RGB-D video) or being captured or generated through the use of: (i) range imaging devices including but not limited to laser range finders, LIDAR, time of flight, laser dynamic range imagers, and intensified charge coupled device cameras; (ii) light field cameras, including but not limited to the method described in Tao et al., *Depth from Combining Defocus and Correspondence Using light-Field Cameras*, ICCV (2013), herein incorporated by reference in the entirety; (iii) structured light, including but not limited to the method described in Scharstein & Szeliski, *High-accuracy Stereo Depth Maps Using Structured Light*, CVPR, 1(2003), herein incorporated by reference in the entirety; (iv) interferometry, including but not limited to the method described in Schutz et al., *Large Scale 3D Image Reconstruction in Optical Interferometry*, EUSIPCO (2015), herein incorporated by reference in the entirety; (v) coded aperture cameras, including but not limited to the method described in Levin et al., *Image and Depth from a Conventional Camera with a Coded Aperture*, SIGGRAPH (2007), herein incorporated by reference in the entirety; (vi) structure from motion-based, including but not limited to the method described in Westoby et al., '*Structure-from-Motion' Photogrammetry: A Low-cost, Effective Tool for Geoscience Applications*, Geomorphology 179 (2012), herein incorporated by reference in the entirety; (vii) the method described in U.S. Ser. No. 13/913,454, herein incorporated by reference in the entirety, or other methods pairing a constant, predetermined pattern of infrared dots and a monochrome complementary metal-oxide semiconductor sensor placed at an offset relative to the infrared transmitter, using the difference between the observed and expected infrared dot positions to calculate the depth; (viii) monocular clues-based methods, including but not limited to (1) Markov Random Field-based methods, including but not limited to the method described in Saxena et al., *Learning 3-D Scene Structure from a Single Still Image*, ICCV (2007), herein incorporated by reference in the entirety; (2) shape from shading, including but not limited to the method described in Horn, *Shape from Shading: A Method for Obtaining the Shape of a Smooth Opaque Object from One View*, PhD thesis, MIT (1970), herein incorporated by reference in the entirety; (3) layer-based optical flow, including but not limited to the method described in Sun et al., *Layered Segmentation and Optical Flow Estimation over Time Computer Vision and Pattern Recognition*, CVPR (2012), herein incorporated by reference in the entirety, (4) photometric stereo, including but not limited to the method described in Woodham, *Photometric Method for Determining Surface Orientation from Multiple Images*, Opt. Eng. 19.1 (1980), herein incorporated by reference in the entirety; (5) shape from texture methods, including but not limited to the method described in Witkin, *Recovering Surface Shape and/orientation from Texture*, AI 17.1 (1981), herein incorporated by reference in the entirety; (ix) binocular stereo vision methods, including but not limited to (1) active contours model-based methods, including but not limited to the method described in Kass et al., *Snakes: Active Contour Models*, IJCV 1.4 (1988), herein incorporated by reference in the entirety; (1) stereo triangulation, including but not limited to the method described in Hartley, *Triangulation*, CVIU 68 (1997), herein incorporated by reference in the entirety; (x) depth information generated in conjunction with the creation of the content such as, for example, depth information generated in conjunction with creating a video game environment or virtual reality experience; (xi) depth information generated from location information captured along with content by cameras with geolocation functionality; (xii) depth information generated by assigning known dimensions (such as the length of a certain make of an automobile or standardized heights of walls in houses) or three dimensional models to two or three dimensional representations of objects, textures, materials, shapes, places, spaces, or areas present in the scene depicted by the target digital content and that recognized using template or neural network-based methods of recognizing objects and detecting their location in a scene (collectively, "object recognition"); (xiii) Machine learning-based single frame depth estimation based such as the method outline in Saxena et al., *Learning Depth from Single Monocular Images*, NIPS (2005), herein incorporated by reference in the entirety, which uses an application of MRF (Markov Random Fields) in order to predict these depth map based on annotated training data by extracting certain key features in certain regions; (xiv) depth map estimation gathered through a neural network-based classifier that has been trained on examples of target digital content or its components that are labelled by their depth including but not limited to convolutional neural network-based approaches, including but not limited to the method described in Liu et al., *Deep Convolutional Neural Fields for Depth Estimation from a Single Image*, CVPR (2015), herein incorporated by reference in the entirety, or multi-scale neural network-based approaches, including but not limited to the method described in Eigen, Puhrsch, & Fergus, *Depth Map Prediction from a Single Image Using a Multi-scale Deep Network*, NIPS (2014), herein incorporated by reference in the entirety; (xv) depth information gained from some combination of these methods described above; (xvi) a message received from a user which contains an indication of which parts of the target digital content or its components are background and/or which are foreground.

Figure 5:
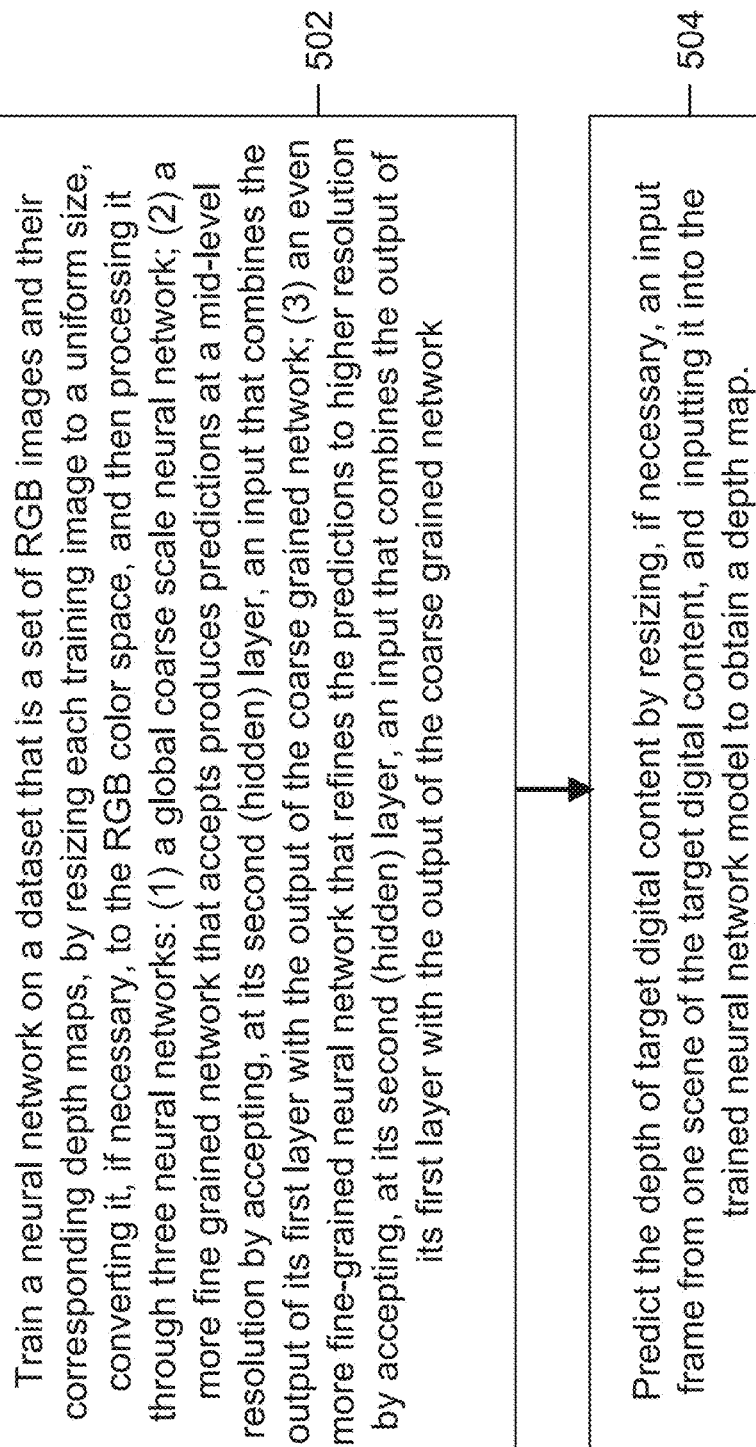
FIG. 5 illustrates estimation of depth using a neural network in a scene recognition module in accordance with some embodiments.

FIG. 5 illustrates the estimation of a depth and a normal of a surface by the scene recognition module 106 using a neural network in accordance with some embodiments. In step 502, a neural network in the scene recognition module 106 is trained on a depth map dataset. The depth map dataset includes a set of RGB images and their corresponding depth maps. The neural network is trained using a loss function that compares the predicted log depth map D to the ground-truth log depth map $D^*$. For example, when $d=D-D^*$ (e.g., the difference of the depth maps); the index i refers to a valid pixel; n is the number of valid pixels (pixels whose ground truth is missing being masked out); $\nabla_x d_i$ and $\nabla_y d_i$ are the horizontal and vertical image gradients of the differences), then the loss function can be defined as follows:

$$L_{depth}(D, D^*) = \frac{1}{n}\sum_i d_i^2 - \frac{1}{2n^2}\left(\sum_i d_i\right)^2 + \frac{1}{n}\sum_i [(\nabla_x d_i)^2 + (\nabla_y d_i)^2]$$

In an exemplary sub-routine to train the neural network, a training image is processed through the neural network by:
1) Resizing the image to a uniform size and, if necessary, converting it to the RGB color space.
2) Processing the resized image using the global coarse scale neural network by:
   a) Inputting the resized image into the first input layer of the neural net, a 11×11 convolutional layer with a rectified linear unit ("ReLU") activation function, a learning rate of 0.001, and a 2×2 pooling filter with a stride of 4 and max pooling, where the number of channels in the output is 96.
   b) Inputting the output of the previous layer through the second (hidden) layer of the neural net, a 5×5 convolutional layer with a ReLU activation function, a learning rate of 0.001, and a 2×2 pooling filter with a stride of 2 and max pooling, where the number of channels in the output is 256.
   c) Inputting the output of the previous layer into the third (hidden) layer of the neural net, a 3×3 convolutional layer with a ReLU activation function, a learning rate of 0.001, and a 2×2 pooling filter with max pooling, where the number of channels in the output is 384.
   d) Inputting the output of the previous layer into the fourth (hidden) layer of the neural net, a 3×3 convolutional layer with a ReLU activation function, a learning rate of 0.001, and a 2×2 pooling filter with max pooling, where the number of channels in the output is 384.
   e) Inputting the output of the previous layer into the fifth hidden layer of the neural net, a 3×3 convolutional layer with a ReLU activation function, a learning rate of 0.001, and a 2×2 pooling filter with max pooling, where the number of channels in the output is 256.
   f) Inputting the output of the previous layer into a fully connected layer a ReLU activation function and a learning rate of 0.001, where the number of channels in the output is 4096.
   g) Inputting the output of the previous layer into a fully connected layer with a linear activation function, where the number of channels in the output is 64.
   h) Upsampling the output of the last layer by 4.
3) Inputting the output of the coarse scale network into a finer grained network that produces predictions at a mid-level resolution by:
   a) Resizing, if necessary, a frame of the target digital content to the same size image that the neural network has been trained on;
   b) Inputting this resized image into the first input layer of the neural net, a 9×9 convolutional layer with a ReLU activation function, a learning rate of 0.001, and a 2×2 pooling filter with a stride of 2 and max pooling, where the number of channels in the output is 96.
   c) Combining the output of the previous layer with the output of the coarse grained network by combining the channels of both outputs, resulting in a feature vector of dimensions with 160 channels.
   d) Inputting the combined feature vector into the second (hidden) layer of the neural net, a 5×5 convolutional layer with a ReLU activation function and a learning rate of 0.01. The number of channels in the output is 64.
   e) Inputting the previous input into the third (hidden) layer of the neural net, a 5×5 convolutional layer with a ReLU activation function and a learning rate of 0.01. The number of channels in the output is 64.
   f) Inputting the previous input into the fourth (hidden) layer of the neural net, a 5×5 convolutional layer with a ReLU activation function and a learning rate of 0.01. The number of channels in the output is 64.
   g) Inputting the previous output through the final (hidden) layer, a 5×5 convolutional layer with a ReLU activation function and a learning rate of 0.001, where the number of channels in the output is 2 (depth map+normal prediction);
   h) Upsampling the previous output is then upsampled to the ratio of ½ the size of the original input image.
4) Inputting the previous output into an even more fine-grained neural network that refines the predictions to higher resolution, by:
   a) Resizing, if necessary, the previous output to the same size image that the neural network has been trained on;
   b) Inputting this resized image into the first input layer of the neural net, a 9-pixel×9-pixel convolutional layer with a ReLU activation function, a learning rate of 0.001, and a 2×2 pooling filter with a stride of 2 and max pooling, where the number of channels in the output is 96.
   c) Combining the output of the previous network with the output of the fine grained network by combining the channels of both outputs, resulting in a feature vector of dimensions 97 channels (where one channel is the depth map outputted from the coarse grained network)
   d) Inputting the combined feature vector into the second (hidden) layer, a 5×5 convolutional layer with a ReLU activation function and a learning rate of 0.01, where the number of channels in the output is 64.
   e) Inputting the previous output into the third (hidden) layer, a 5×5 convolutional layer with a ReLU activation function and a learning rate of 0.01. The number of channels in the output is 64.
   f) Inputting the previous output into the final hidden layer, a 5×5 convolutional layer with a ReLU activation function and a learning rate of 0.001, where the number of channels in the output is 2 (depth map+normal).

In step 504, the trained neural network model in the scene recognition module 106 is configured to predict the depth of target digital content by resizing, if necessary, an input frame from one scene of the target digital content, and inputting it into the trained neural network model to obtain the depth map and normals.

Figure 6:
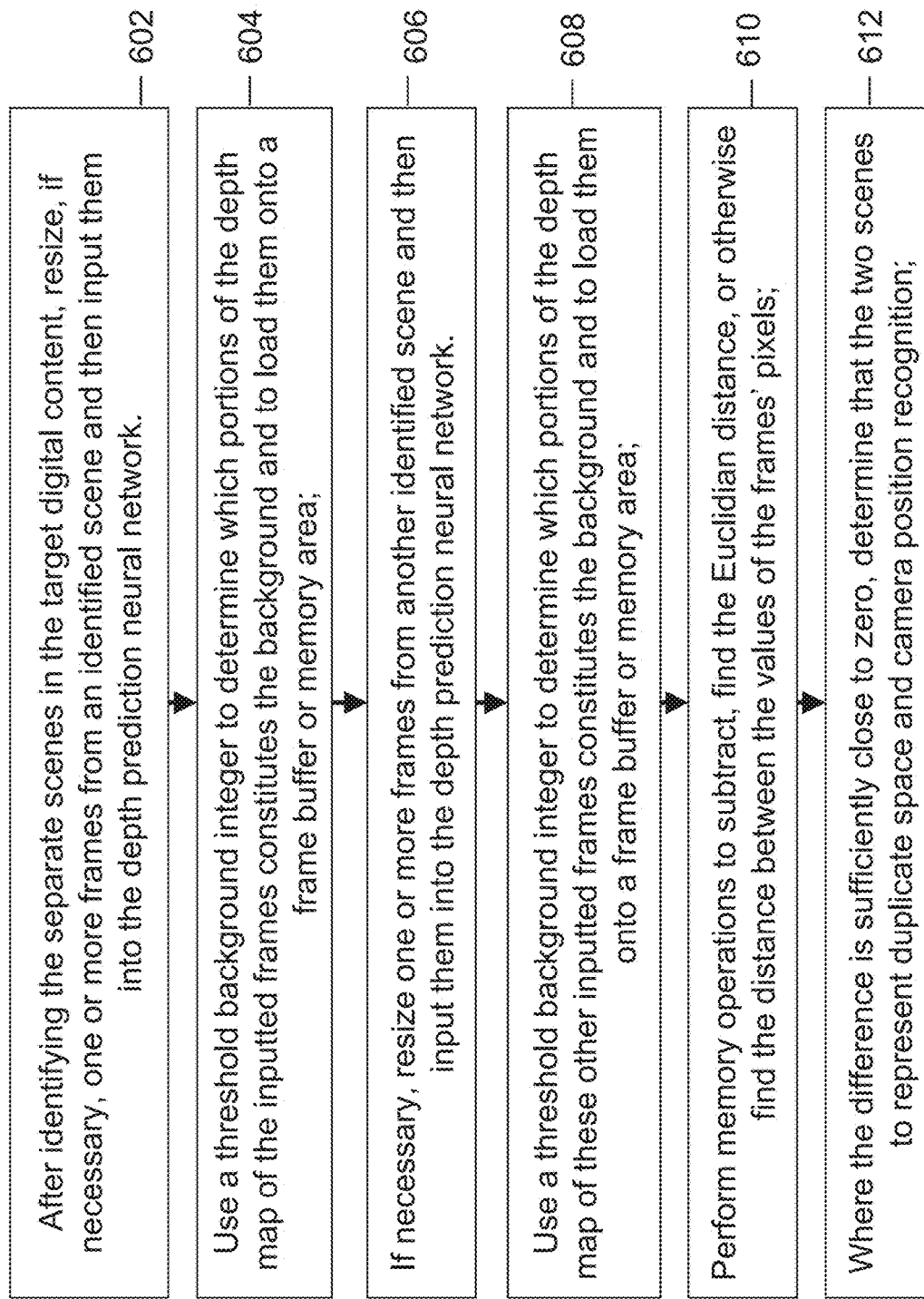
FIG. 6 illustrates use of a neural network model to predict the depth of pixels of one or more frames in accordance with some embodiments.

FIG. 6 illustrates the use, in accordance with FIG. 5, of a neural network model to predict the depth of pixels of one or more frames in accordance with some embodiments. The neural network model in the scene recognition module 106 is used to predict the depth of pixels of one or more frames from different scenes of target digital content in order to model and compare the background of those scenes for the purpose of determining if they represent duplicate space and camera position recognition. For example:

1) In step 602, the neural network model in the scene recognition module 106 is configured to identify the separate scenes in the target digital content, scene recognition module 106 is configured to, if necessary, resize one or more frames from an identified scene and then input them into the depth prediction neural network.

2) In step 604, the neural network model in the scene recognition module 106 is configured to use a threshold background integer to determine which portions of the depth map of the inputted frames constitutes the background and to load them onto a frame buffer or memory area.

3) In step 606, if necessary, the neural network model in the scene recognition module 106 is configured to resize one or more frames from another identified scene and then input them into the depth prediction neural network.

4) In step 608, the neural network model in the scene recognition module 106 is configured to use a threshold background integer to determine which portions of the depth map of these other inputted frames constitutes the background and to load them onto a frame buffer or memory area.

5) In step 610, the neural network model in the scene recognition module 106 is configured to perform memory operations to find the distance (e.g., the Euclidian distance) between the values of the frames' pixels.

6) In step 612, when the difference is sufficiently close to zero, the neural network model in the scene recognition module 106 is configured to deem the two scenes to represent duplicate space and camera position recognition.

Figure 7:
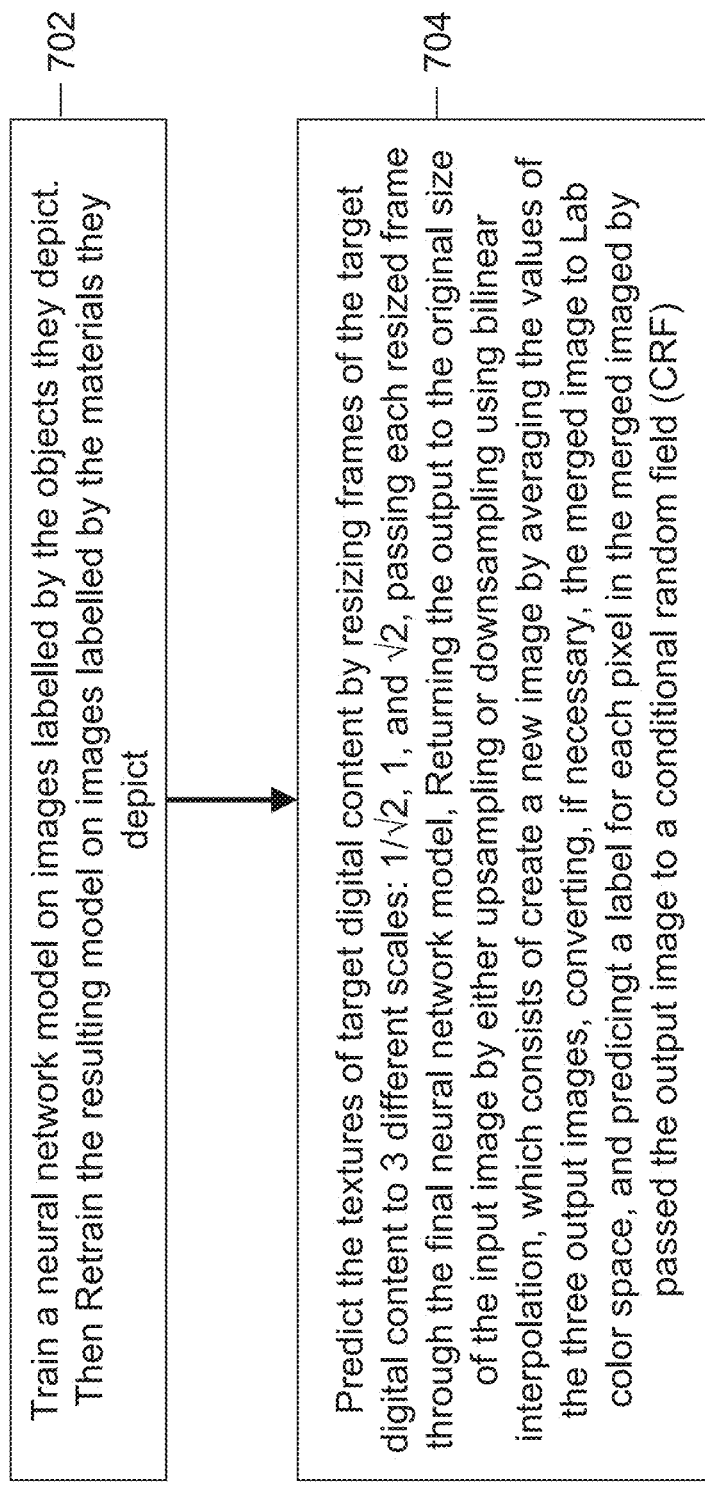
FIG. 7 illustrates identification of texture using a neural network in accordance with some embodiments.

FIG. 7 illustrates the identification of texture using a neural network in accordance with some embodiments. Step 702 illustrates the training of a neural network on a dataset. The texture dataset includes is a set of images labelled by the objects they depict. The neural network is trained by using, as an overall training architecture, stochastic gradient descent with Softmax as a loss function, a batchsize of 128, a dropout rate of 0.5, a momentum of 0.9, and a base learning rate of $10^{-3}$. For example, for each test image in the training set, the training of the neural network proceeds as follows:

Inputting each image into the first input layer of the neural net, such as a 11×11 convolutional layer with a ReLU activation function, a learning rate of 0.001, a stride of 4, and a 2×2 pooling filter with max pooling, where the number of channels in the output is 48 channels.

Inputting the output of the previous layer into the second (hidden) layer of the neural net. For example, the scene recognition module 106 is configured to input the output of the previous layer into the second (hidden) layer of the neural net, such as a 5×5 convolutional layer with a ReLU activation function, a learning rate of 0.001, and a 2×2 pooling filter layer with max pooling, where the number of channels in the output is 128.

Inputting the output of the previous layer into the third (hidden) layer of the neural net, such as a 3×3 convolutional layer with a ReLU activation function and a learning rate of 0.001, where the number of channels in the output can be 192.

Inputting the output of the previous layer into the fourth (hidden) of the neural net, such as a 3×3 convolutional layer with a ReLU activation function and a learning rate of 0.001, where the number of channels in the output can be 192.

Inputting the output of the previous layer into the fifth (hidden) layer of the neural net, such as a 3-pixel×3-pixel convolutional layer with a ReLU activation function, a learning rate of 0.001, a 2×2 pooling filter with max pooling. The number of channels in the output can be 128 channels.

Inputting the output of the previous layer into a fully connected layer with a ReLU activation function and a learning rate of 0.001. The number of channels in the output can be 2048 channels.

Inputting the output of the previous layer into a (second) fully connected layer, such as a fully connected layer with a ReLU activation function and a learning rate of 0.001. The number of channels in the output can be 2048 channels.

Inputting the output of the previous layer into a 1000-way softmax function which produces a distribution over the 1000 class labels. The number of channels in the output can be 1000 channels.

Step 702 illustrates the re-training of the resulting model on images labelled by the materials (e.g., textures) they depict. For example, the re-training includes using, as an overall training architecture, stochastic gradient descent with Softmax as a loss function, a batchsize of 128, a dropout rate of 0.5, a momentum of 0.9, and a base learning rate of 10–3. Each of the input images from the dataset (which are likely to be untraditional sizes given that they capture textures) are resized to 3 different scales: $1/\sqrt{2}$, 1, and $\sqrt{2}$. The model is retrained by, for each of the three versions:

1) Inputting the image into the first input layer of the neural net, a 11×11 convolutional layer with a ReLU activation function, a learning rate of 0.001, a stride of 0.5, and a 2×2 pooling filter with max pooling, where the number of channels in the output is 48.

2) Inputting the output of the previous layer into the second (hidden) layer of the neural net, a 5×5 convolutional layer with a ReLU activation function, a learning rate of 0.001, and a 2×2 pooling filter layer with max pooling, where the number of channels in the output is 128.

3) Inputting the output of the previous layer into the third (hidden) layer of the neural net, a 3×3 convolutional layer with a ReLU activation function and a learning rate of 0.001, where the number of channels in the output is 192.

4) Inputting the output of the previous layer into the fourth (hidden) of the neural net, a 3×3 convolutional layer with a ReLU activation function and a learning rate of 0.001, where the number of channels in the output is 192.

5) Inputting the output of the previous layer into the fifth (hidden) layer of the neural net, a 3×3 convolutional layer with a ReLU activation function, a learning rate of 0.001, a 2×2 pooling filter with max pooling, where the number of channels in the output is 128.

6) Inputting the output of the previous layer into a fully convolutional layer with a ReLU activation function and a learning rate of 0.001, where the number of channels in the output is 2048.

7) Inputting the output of the previous layer into a (second) fully convolutional layer with a ReLU activation function and a learning rate of 0.001, where the number of channels in the output is 2048.

8) Inputting the output of the previous layer into a 1000-way softmax function which produces a distribution over the 1000 class labels, where the number of channels in the output is 1000.
9) Returning the output to the original size of the input image by either upsampling or downsampling using bilinear interpolation;

Step 704 illustrates prediction of the texture of pixels in target digital content by:

1) Resizing the input frame to 3 different scales: $1/\sqrt{2}$, 1, and $\sqrt{2}$;
2) Creating a new image by averaging the values of the three output images;
3) In step BB38, the scene recognition module 106 is configured to convert, if necessary, the merged image to Lab color space; and
4) Predicting a label for each pixel in the merged image by passing the output image to a conditional random field (CRF), which uses the following energy:

$$E(x|I) = \sum_i \psi_i(x_i) + \sum_{i<j} \psi_{ij}(x_i, x_j)$$

$$\psi_i(x_i) = -\log p_i(x_i)$$

$$\psi_{ij}(x_i, x_j) = w_p \delta(x_i \neq x_j) k(f_i - f_j)$$

where $\psi_i$ is the unary energy—e.g., the negative log of the aggregated softmax probabilities, $\psi_{ij}$ is the single pairwise term—with a Potts label compatibility term $\delta$ weighted by wp and unit Gaussian kernel k—that connects every pair of pixels in the image, and where the Lab values:

$(I_i^L, I_i^a, I_i^b)$ are used along with the position (px, py) are used as the features for each pixel, with d being the smaller image dimension:

$$f_i = \left[ \frac{p_i^x}{\theta_p d}, \frac{p_i^y}{\theta_p d}, \frac{I_i^L}{\theta_L}, \frac{I_i^a}{\theta_{ab}}, \frac{I_i^b}{\theta_{ab}} \right],$$

Figure 8:
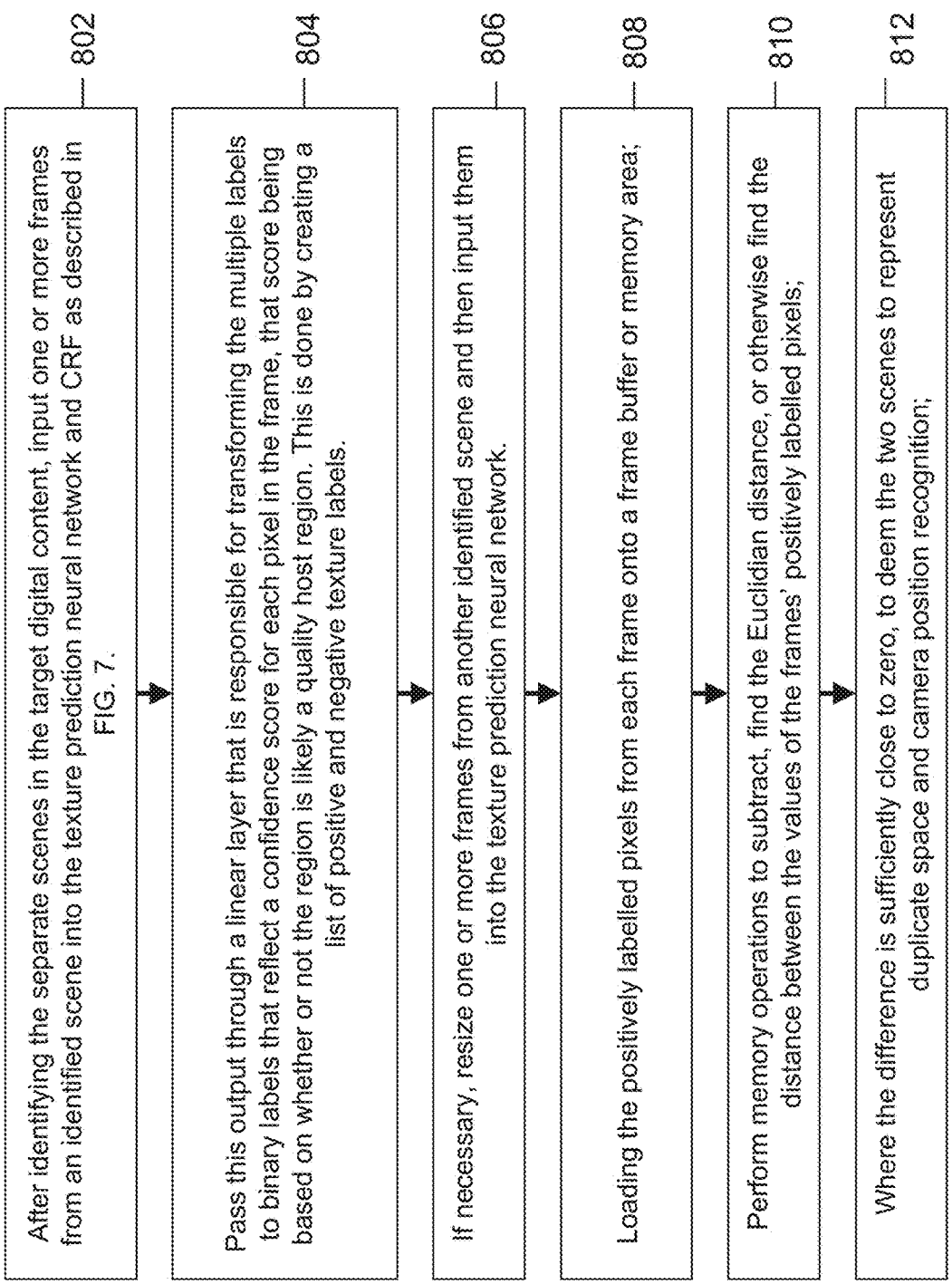
FIG. 8 illustrates use of a neural network model to predict the texture of pixels of one more frames in accordance with some embodiments.

FIG. 8 illustrates the use, in accordance with FIG. 7, of a neural network model to predict the texture of pixels of one or more frames from different scenes of target digital content in accordance with some embodiments. The neural network model is configured to model and compare the background of those scenes for the purpose of determining if they represent duplicate space and camera position recognition. Step 802 illustrates the inputting, after identifying the separate scenes in the target digital content, of one or more frames from an identified scene into the texture prediction neural network and CRF described in FIG. 7. Step 804 illustrates the inputting of the output of Step 802 through a linear layer that is responsible for transforming the multiple labels to binary labels that reflect a confidence score for each pixel in the frame, that score being based on whether or not the region is likely a quality host region. This is done by creating a list of positive and negative texture labels, where the positive labels reflect textures that commonly represent background regions and might include: 'brick', 'carpet', 'metal', 'paper', 'plastic', 'polished stone', 'stone', 'tile', 'wallpaper', 'wood', 'painted', and 'sky', while negative categories reflect textures that commonly represent foreground regions and might include 'hair', 'skin', 'food', 'foliage', 'fabric', 'leather', 'glass', 'water', and 'mirror.'

Step 806 illustrates the resizing, if necessary, of one or more frames from another identified scene and then input them into the texture prediction neural network. Step 808 illustrates the loading of the positively labelled pixels from each frame onto a frame buffer or memory area. Step 810 illustrates the performing of memory operations to subtract, find the Euclidian distance, or otherwise find the distance between the values of the frames' positively labelled pixels. Step 812 illustrates the deeming of the two scenes, where the difference is sufficiently close to zero, to represent duplicate space and camera position recognition. In some embodiments, duplicate space and camera position recognition is repeated for all pairs of scenes.

Figure 9:
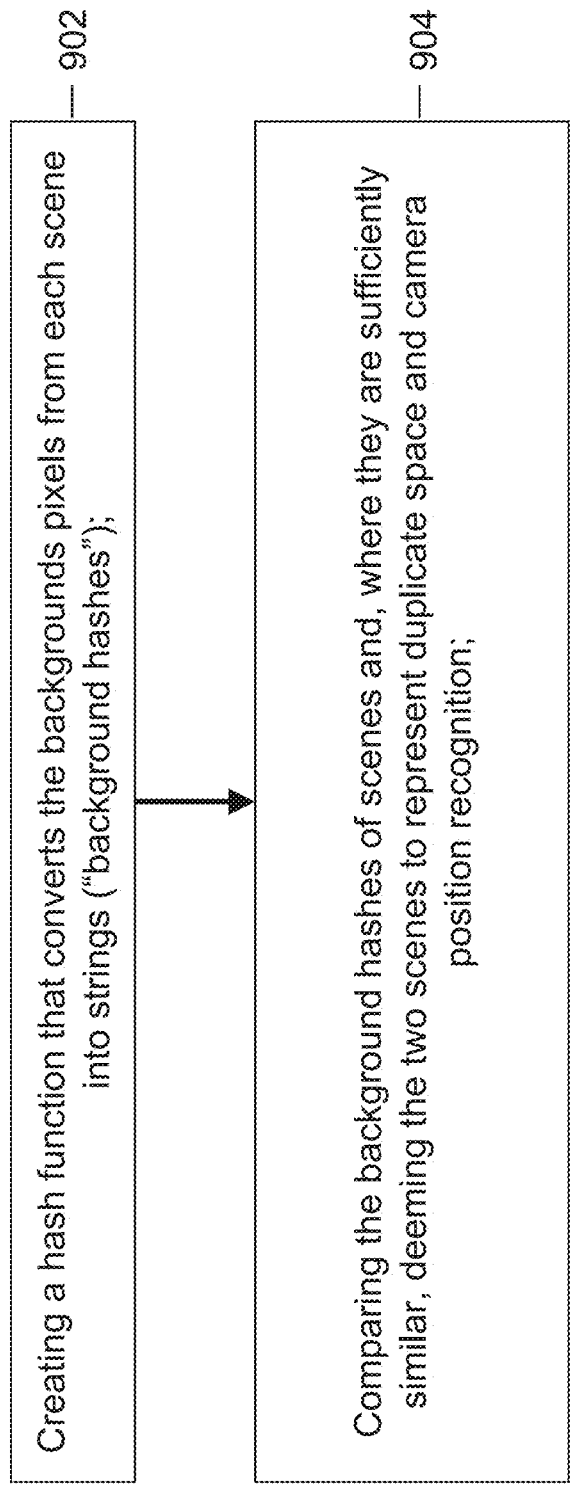
FIG. 9 illustrates reduction of time complexity of duplicate space and camera position recognition through use of a hash function in accordance with some embodiments.

FIG. 9 illustrates the reduction of the time complexity of duplicate space and camera position recognition through the use of a hash function in accordance with some embodiments. Step 902 illustrates the creation of a hash function that converts the backgrounds pixels from each scene into strings ("background hashes"). Step 904 illustrates the comparison of the background hashes of scenes and, where they are sufficiently similar, deeming the two scenes to represent duplicate space and camera position recognition.

In some embodiments, the data generated during background modeling for the purpose of duplicate space and camera position recognition may be stored and accessed again during host region identification where host region identification relies on searching the target digital content or its components for those parts of the target digital content or its components which represent the background of a scene and, thus, may constitute a host region.

In some embodiments, a preliminary step in host region identification includes grouping scenes within the target digital content that, while neither sequential and nor representing the same camera positioning, nonetheless depict the same contiguous physical space ("duplicate space recognition"). This grouping can assist with the parallelization of the host region identification process. This can also assist 3D reconstruction-based methods of host region identification by expanding the amount of data about a given physical space.

Figure 10:
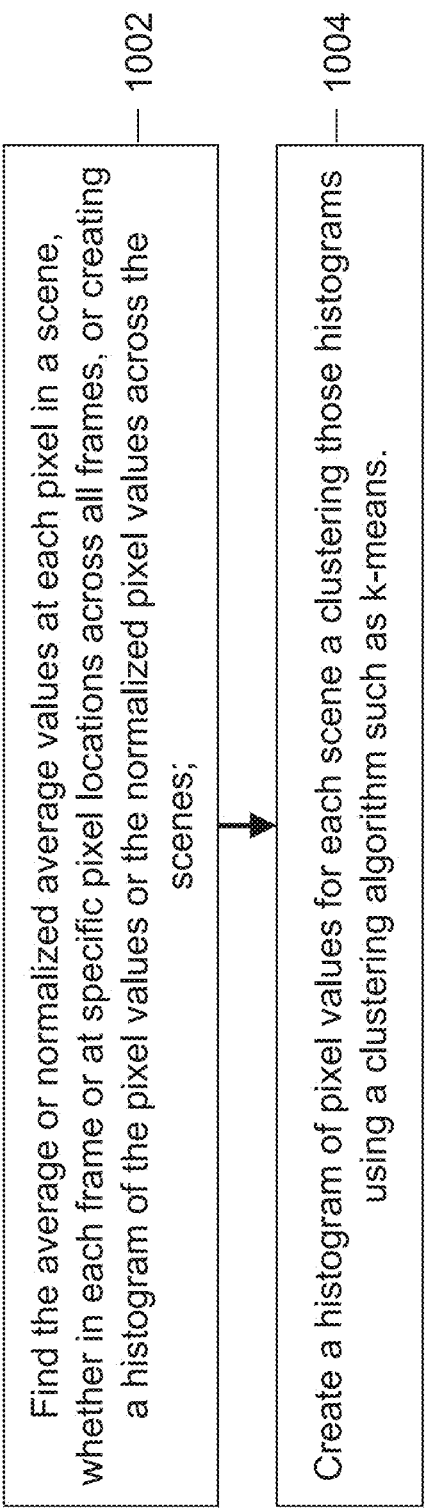
FIG. 10 illustrates duplicate space recognition as performed by a scene recognition module in accordance with some embodiments.

FIG. 10 illustrates duplicate space recognition as performed by the scene recognition module 106 in accordance with some embodiments. In step 1002, the scene recognition module 106 is configured to find the average or normalized average values at each pixel in a scene, whether in each frame or at specific pixel locations across all frames, or creating a histogram of the pixel values or the normalized pixel values across the scenes. In steps 1004, the scene recognition module 106 is configured to create a histogram of pixel values for each scene a clustering those histograms using a clustering algorithm such as k-means.

Camera Motion Classification

In some embodiments, as a preliminary step in host region identification, the content integration system can use a camera motion classification module 108 to classify the target digital content's scenes or other components according to the presence and/or degree of camera motion ("camera motion classification"). This can improve the distribution or parallelization of host region identification and/or other processes.

In some embodiments, camera motion classification is performed using a dedicated and specialized procedure, function, thread, process, application, memory, cache, disk or other storage, database, computer, device, or network sitting in the communication network ("camera motion classification module").

In some embodiments, the camera motion classification module 108 is co-located with both the scene recognition module 106 and the target digital content source. This allows for both scene recognition and camera motion classification to occur up-front, such that later steps in the content integration process can be distributed or parallelized according to the type of camera motion in each scene.

Figure 11:
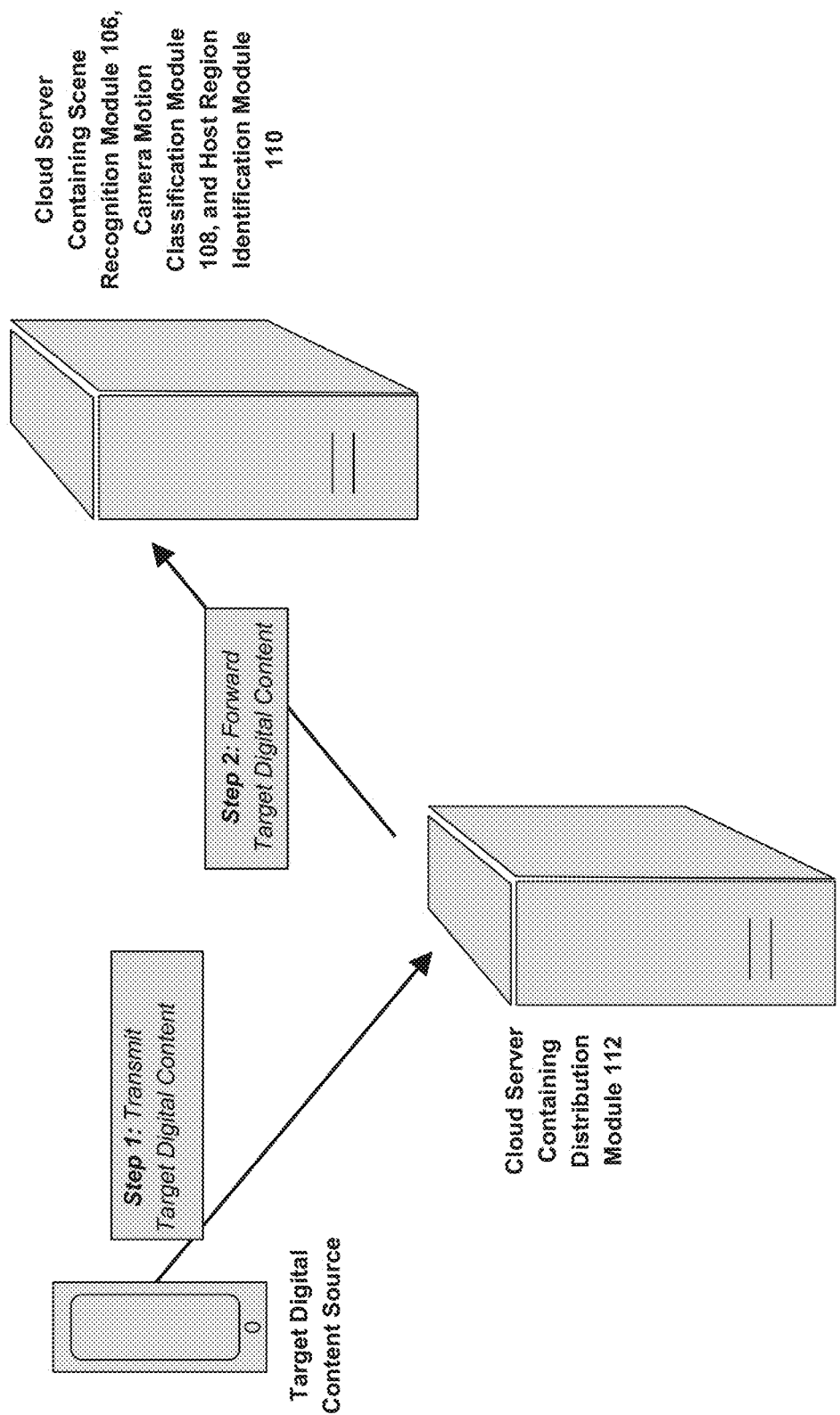
FIG. 11 illustrates a system in which a camera motion classification module is co-located with a scene recognition model in accordance with some embodiments.

In some embodiments, the camera motion classification module 108 is co-located with the scene recognition module 106, but not the target digital content source, and the co-located camera motion classification module 108 and scene recognition module 106 are the first point of contact for the target digital content source, meaning that the target digital content is transmitted directly from the target digital content source to them, without intermediary modules. This allows for scene recognition and camera motion classification to occur relatively up-front, such that later steps in the content integration process can be distributed or parallelized according, yet allows for scene recognition and camera motion classification to occur on specialized processes or equipment (e.g., GPUs) that are impractical to contain on the target digital content source. FIG. 11 illustrates a system in which camera motion classification module 108 is co-located with the scene recognition model 106 in accordance with some embodiments.

In some embodiments, the camera motion classification module 108 is not co-located with either the target digital content source or the scene recognition module, but is the first point of contact in the network for the scene recognition module. This allows for camera motion classification to occur relatively up-front, such that later steps in the content integration process can be distributed or parallelized accordingly, yet on specialized processes or equipment that are impractical to contain on either the target digital content source or the scene recognition module.

In some embodiments, where the camera motion classification module is not co-located with either the target digital content source, the scene recognition module 106, or both, the distribution module 114 controls the messages and transmission of data between the modules.

In some embodiments, camera motion classification is achieved using a machine learning classifier that has been trained on examples of target digital content or its components that have potentially been labelled according to their degree of camera motion.

Figure 12:
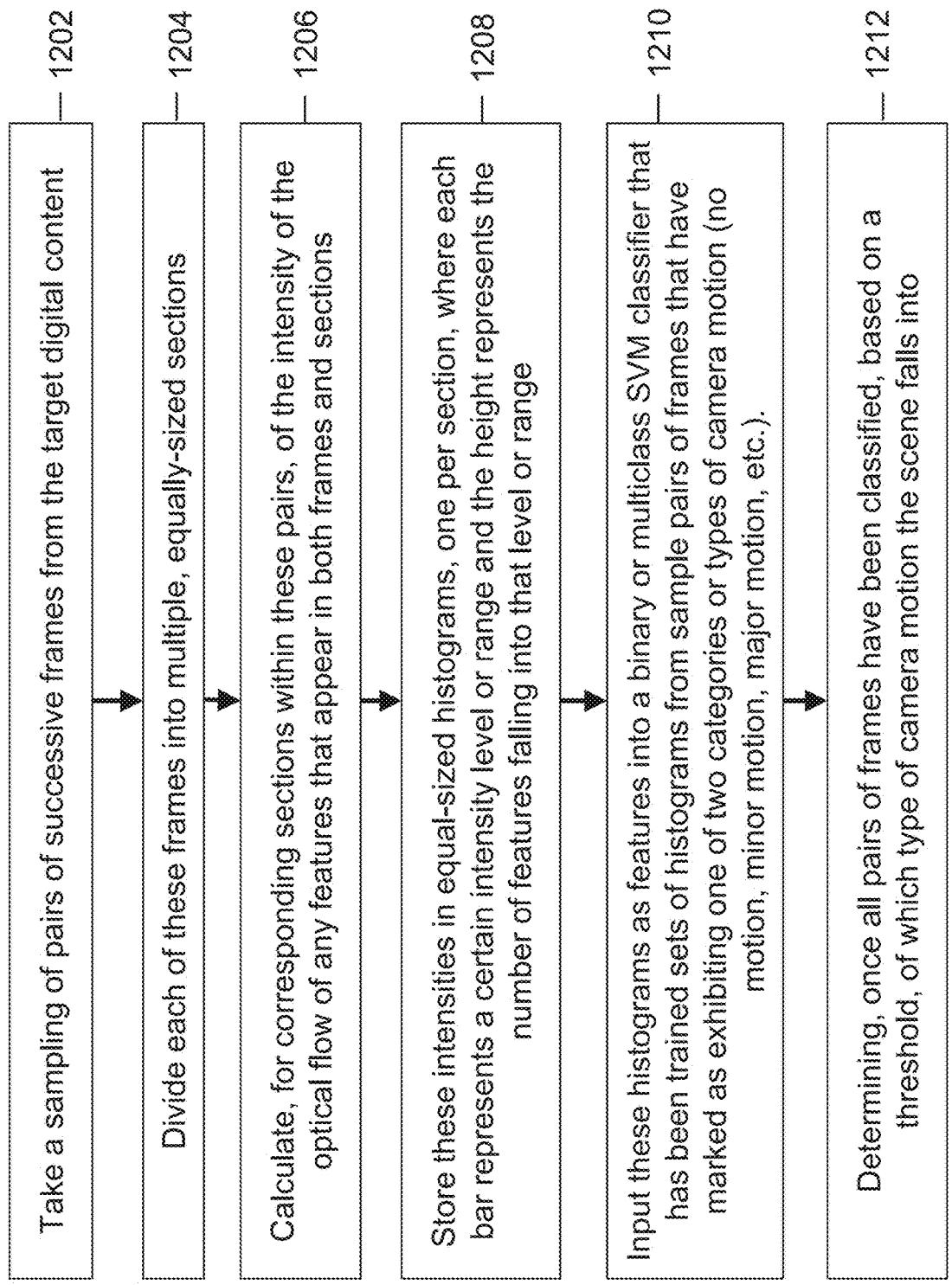
FIG. 12 illustrates use of a machine learning classifier to achieve camera motion classification in accordance with some embodiments.

FIG. 12 illustrates the use of a machine learning classifier to achieve camera motion classification in accordance with some embodiments. Step 1202 illustrates taking a sampling of pairs of successive frames from the target digital content. Step 1204 illustrates the division of each of these frames into multiple, equally-sized sections. Step 1206 illustrates the calculation, for corresponding sections within these pairs, of the intensity of the optical flow of any features that appear in both frames and sections. Step 1208 illustrates the storage of these intensities in equal-sized histograms, one per section, where each bar represents a certain intensity level or range and the height represents the number of features falling into that level or range. Step 1210 illustrates inputting these histograms as features into a binary or multiclass SVM classifier that has been trained sets of histograms from sample pairs of frames that have marked as exhibiting one of two categories or types of camera motion (no motion, minor motion, major motion, etc.). Step 1212 illustrates the determination, once all pairs of frames have been classified, based on a threshold, of which type of camera motion the scene falls into.

Host Region Identification Generally

In some embodiments, at any time during or after its origination, the target digital content or its components are delivered to one or more procedures, functions, processes, threads, applications, memories, caches, disks or other storage, databases, computers, devices, or networks sitting in the network (e.g., host region identification module 110) dedicated to host region identification.

In some embodiments, at any time during or after its origination, the target digital content or its components, after camera motion classification, are delivered to one or more host region identification sub-modules, each of which is specialized toward a type of camera motion. Since type of camera motion can increase the length of the host region identification process, this architecture allows for parallelizing and load-balancing by dedicating comparatively more host region identification modules or more computation resources to scenes whose type of camera motion require more processing.

In some embodiments, the host region identification module 110 is co-located with the target digital content source, the scene recognition module 106, and the camera classification module 108. This allows for host region identification, scene recognition, and camera classification module to occur up-front, such that later steps in the content integration process can be distributed or parallelized according to host region.

In some embodiments, the host region identification module(s) 110 is not co-located with the target digital content source, but is co-located with the scene recognition 106 and camera motion classification module 108. This allows for scene recognition, camera motion classification, and host region identification, to occur relatively up-front, such that later steps in the content integration process can be distributed or parallelized accordingly, yet on specialized processes or equipment that are impractical to contain on target digital content sources (e.g., GPUs) but would be advantageous for host region identification as well as scene recognition and/or camera motion classification.

In some embodiments, the host region identification module(s) 110 are not co-located with the scene recognition modules, camera motion classification module, or target digital content source, but are the first point of contact for the camera motion classification module. This allows for scene recognition to occur relatively up-front, such that later steps in the content integration process can be distributed or parallelized accordingly, yet on specialized resources or in specialized modules that are impractical to contain on target digital content sources, scene recognition modules, or camera motion classification modules and, further, may be specialized according to type of camera motion.

In some embodiments, where the host region identification module(s) 110 are not co-located with either the target digital content source, the scene recognition module 106, the camera motion classification module 108, or any of them, the distribution module 114 may control the messages and transmission of data between them.

In some embodiments, host region identification relies on computerized identification using so-called "markers", e.g., graphical identifiers placed inside the real or illustrated scene portrayed by the target digital content ("marker-based computerized host region identification"), computerized identification using non-marker-based techniques ("non-marker-based computerized host region identification"), manual identification by users ("manual host region identification"), or some combination of these methods.

In some embodiments, at any time during or after host region identification, an identified host region may be excluded from further consideration because it fails to satisfy some size or duration threshold or is otherwise deemed unable to favorably host source digital content.

Marker-Based Computerized Host Region Identification

In some embodiments, where marker-based computerized host region identification is used, the host region identification module 110 is configured to search the target digital content or its components for representations of pre-selected markers. This is achieved by comparing the available features present in the target digital content or its components to a template or model representing corresponding features in the marker, as described in, for example, Köhler et al., *Detection and Identification Techniques for Markers Used in Computer Vision*, VLUDS (2010), herein incorporated by reference in the entirety. If, based on this comparison, it is decided that there is sufficient similarity and a representation of the marker exists in the target digital content or its components, then it is also assumed that the target digital content's creator has placed the representation of the marker inside the target digital content in order to identify the surface, texture, material, plane, object, place, space, location, or area which is inside the scene portrayed by the target digital content and which is associated with the marker as a host region.

In some embodiments, the resulting host region is sold as an advertising space, with the price of that space based on the physical dimensions of the marker that was placed in the scene depicted by the target digital content (e.g. the dimensions of a billboard-sized marker placed in a sports stadium, regardless of how it appears in digital recordings of games from the stadium).

In some embodiments, the resulting host region is sold as an advertising space, with the price of that space based on the size of the resulting placement, in the target digital content, of source digital content upon the host region (e.g. the dimensions of the placement, inside digital recordings of games, of source digital content on the billboard-sized marker placed in a sports stadium).

In some embodiments, the marker is a special graphic that offers ample potential correspondences between the template or model and a representation of a marker placed in the scene depicted by the target digital content, including but not limited to an ArUco marker, described in S. Garrido-Jurado et al., *Automatic generation and detection of highly reliable fiducial markers under occlusion*, Pattern Recognition, 47 (6), 2280-92 (June 2014), which is herein incorporated by reference in the entirety.

In some embodiments, the marker is a graphic or text with aesthetic, informational, or advertising value even when it is not serving as a marker and when source digital content is not being placed upon it. For example, the marker can be one version of a company's logo. Thus, it has advertising value even when not used as a marker and when source digital content is not placed upon it. Yet it also has value as a marker, enabling the placement of source digital content (such other versions of the company's logo) upon it.

In some embodiments, the marker is a graphic, part of which possesses aesthetic, informational, or advertising value, even when not used as a marker and when source digital content is not placed upon it, and part of which includes, in its design, a special graphic that offers ample potential correspondences between the template or model and a representation of a marker placed in the scene depicted by the target digital content, including but not limited to an ArUco marker.

Figure 13A:
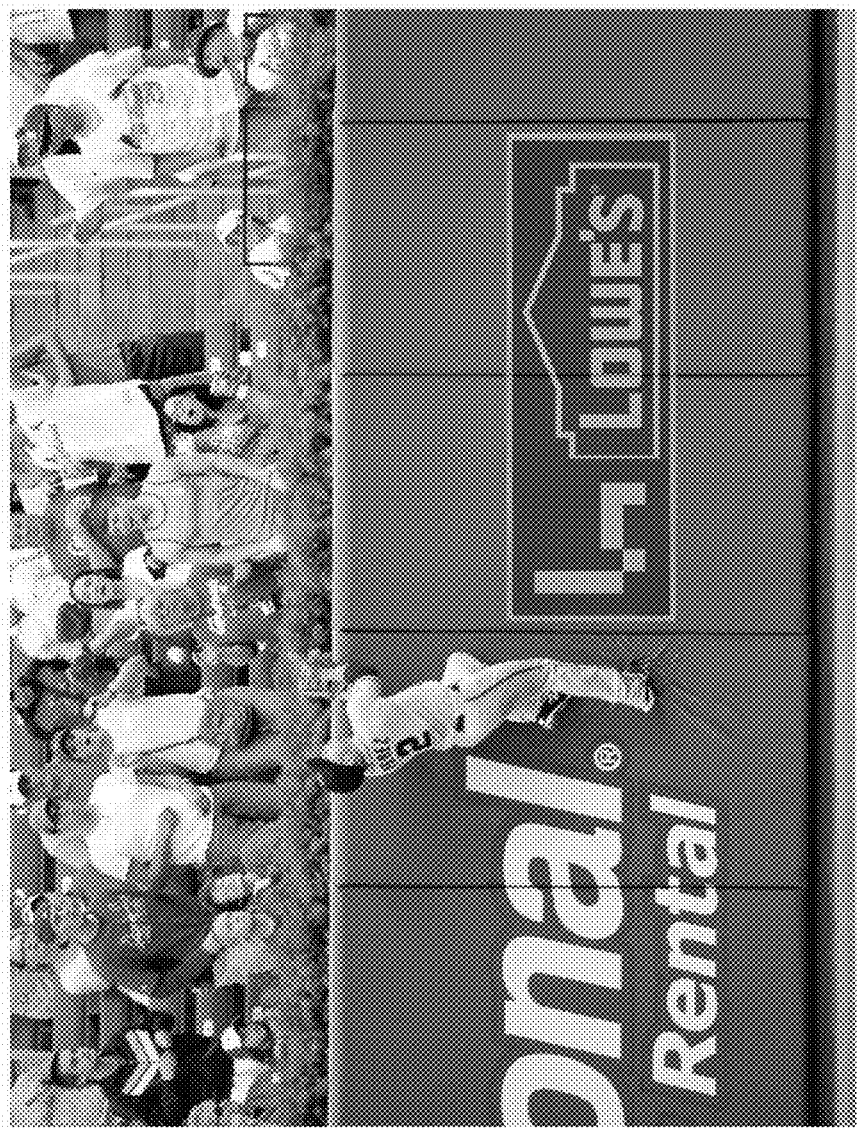
FIGS. 13A-13B illustrate an embodiment in which the marker is a graphic in accordance with some embodiments.
Figure 13B:

FIGS. 13A-13B illustrate an embodiment in which the marker is a graphic in accordance with some embodiments. FIG. 13A illustrates a marker which is one version of a company's logo with an ArUco marker placed inside it. Thus, it has advertising value even when not used as a marker and when source digital content is not placed upon it. Yet it also has value as a marker, enabling the (more reliable) placement of source digital content (such other versions of the company's logo) upon it, as depicted in FIG. 13B.

In some embodiments, where the use case is advertising, a competitor's logo or graphic is used as a marker. In this way, a company or brand is able to identify and replace competitor logos and graphics with their own inside the target digital content.

Non-Marker-Based Computerized Host Region Identification

Where non-marker-based computerized host identification is used, the host region identification module 110 can be configured to identify the host regions by searching the available attributes of the target digital content or its components for patterns or qualities that suggest the existence of a host region.

In some embodiments, where non-marker-based computerized host identification is used, host regions are identified by searching the available attributes of the target digital content or its components for patterns or qualities that suggest the existence of a host region, a single frame in a scene (for example, the first frame, a randomly chosen frame, or a frame with the median values, compared to all the frames, of some available attribute) is selected as the starting point or, in the case of a scene without camera motion, the sole focal point for the search.

In some embodiments, where the target digital content is being created on an ongoing basis (e.g., is live or streaming) and where non-marker-based computerized host identification is used, host regions are identified by searching the available attributes of the target digital content or its components for patterns or qualities that suggest the existence of a host region, the present or most recent frame in a scene is selected as the starting point or, in the case of a scene without camera motion, sole focal point for the search.

In some embodiments, where non-marker-based computerized host identification is used and host regions are identified by searching the available attributes of the target digital content or its components for patterns or qualities that suggest the existence of a host region, each individual pixel in one or more frames of the target digital content may be assigned a score or probability based on the likelihood that it represents a host region.

Figure 14:
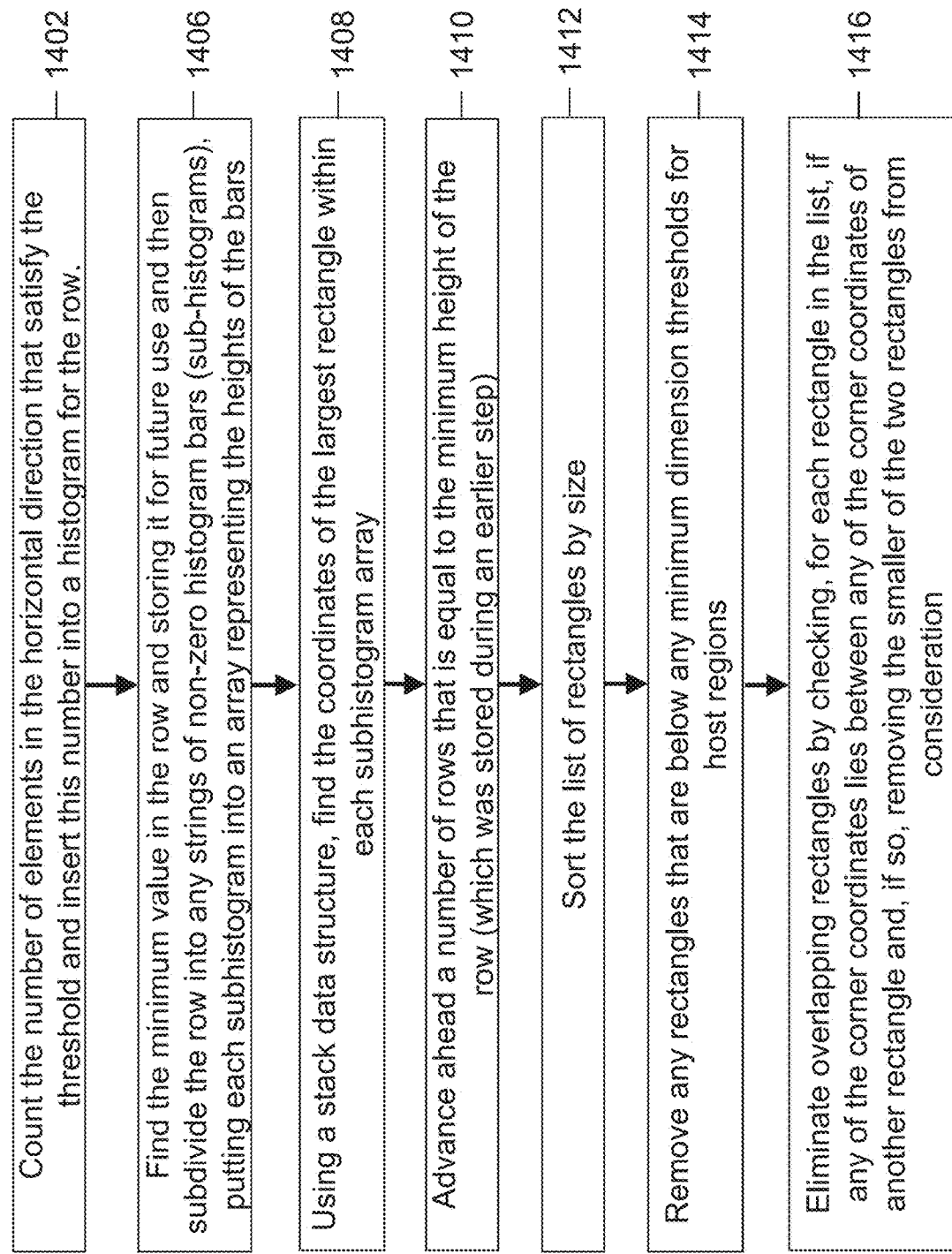
FIG. 14 illustrates a procedure for finding maximally sized rectangles in each frame of target digital content in accordance with some embodiments.

FIG. 14 illustrates a procedure for finding the maximally sized rectangles in each frame of the target digital content in accordance with some embodiments. Individual pixels in one or more frames of the target digital content are assigned a score or probability based on the likelihood that they represent a host region, and the rectangles include pixels having a score greater than a predetermined threshold. This helps ensure, when using this approach to host region identification, that the size of the host regions being identified are as large as possible.

Step 1402 illustrates starting at the first row of the frame, going in the vertical direction and for each element (e.g., pixel), counting the number of elements in the horizontal direction that satisfy the threshold and inserting this number into a histogram for the row. Step 1404 illustrates finding, once the histogram for the row is complete, the minimum value in the row, storing it for future use and then subdividing the row into any strings of non-zero histogram bars (sub-histograms), putting each histogram into an array representing the heights of the bars. Step 1406 illustrates finding the largest rectangle within each sub histogram by: (1) Initializing an empty integer stack and a variable for the maximum rectangle ("max_rectangle") with area of 0; (2) Creating a pointer ("i") to the first position of the bar height array and initializing it at 0; (3) Pushing the first array index to the stack and increment i (i=1); (4) While i<length of the histogram: (a) If the current height (histogram[i]) is bigger than the height of the bar that the index on top of the stack points to, pushing the current index to the stack and incrementing i; (b) If the current height (histogram[i]) is not bigger than the height of the bar that the index on top of the stack points to, popping the top item of the stack and: (i) If the stack is empty, calculating the area of the current rectangle by multiplying the height of the index you just popped and the index itself (the index is the width) and, if the area is bigger than the max_rectangle, replacing max_rectangle with that; (ii) If the stack is not empty, the width of the current rectangle can be equal to the current index popped—top index in the stack and the height will still be the height of the current index that was just popped and, if the area is bigger than the max_rectangle, replacing max_rectangle with that; (c) If, by the end of the for loop, the stack is not empty, keep popping the elements and, for each element, perform step 4-b; (d) At the end, your max_rectangle will contain the height, the width and the current index of the max rectangle in that sub histogram. To transform that into coordinates: (i) The x coordinate can be starting index (split point) of the sub histogram+current index (i) of the max_rectangle; (ii) The y coordinate can be the current row of the sub-histogram we are using; (iii) The w coordinate can be the width of the max_rectangle; (iv) The h coordinate can be the height of the max_rectangle. Step 1410 illustrates advancing ahead a number of rows that is equal to the minimum height of the row (which was stored during an earlier step). Step 1412 illustrates sorting the list of rectangles by size. Step 1414 illustrates removing any rectangles that are below any minimum dimension thresholds for host regions. Step 1416 illustrates eliminating overlapping rectangles by checking, for each rectangle in the list, if any of the corner coordinates lies between any of the corner coordinates of another rectangle and, if so, removing the smaller of the two rectangles from consideration.

In some embodiments, host regions are identified by using background modeling to determine which regions of the target digital content or its components represent the background, rather than the foreground, of the scene depicted by the target digital content and, thus, may host source digital content (since a scene's background is usually of less interest to viewers).

In some embodiments, where a host region is identified by searching the target digital content or its components for regions representing the background, rather than the foreground, of the scene depicted by the target digital content, the quality of the resulting host regions may additionally be scored based on factors such as position in the frame, luminance value, color value, level of visual salience, etc.).

In some embodiments, the determination that a region represents the background, rather than the foreground of the real or illustrated scene depicted by the target digital content, and is therefore a host region, is based on using texture recognition to analyze whether the target digital content or its components possess a texture or material commonly associated with the background of images (including but not limited to brick, sky, or forest textures).

In some embodiments, where the determination that a region represents the background, rather than the foreground of the real or illustrated scene depicted by the target digital content, and is therefore a host region is based on using texture recognition to analyze whether the target digital content or its components possess a texture or material commonly associated with the background of images (including but not limited to brick, sky, or forest textures), that determination may be stored and re-used for other steps in the algorithm (such as the removal of host regions whose texture or material represents poor host regions).

In some embodiments, the results of texture recognition for the purpose of determining whether or not a region represents the background of an image and, thus, a host region, may also be used to make a determination about whether or not a region represents a host region because it possesses a texture that is generally favorable or unfavorable for host regions (regardless of whether that region is background or foreground).

In some embodiments, the determination that a region represents the background, rather than the foreground of the real or illustrated scene depicted by the target digital content, and is therefore a host region, is based on the comparison of the available attributes of the target digital content or its components and a template capturing the available attributes of materials that are commonly associated with the background of images.

In some embodiments, the determination that a region represents the background, rather than the foreground of the real or illustrated scene depicted by the target digital content, and is therefore a host region, is based on the classification of the target digital content or its components as possessing a texture commonly associated with the background of images (including but not limited to brick, wood paneling, trees, sea, or sky textures), as determined by inputting the original digital or its components into a neural network that has been trained on examples of original digital or its components that have been labelled according to the texture they depict.

In some embodiments, the determination that a region represents the background, rather than the foreground of the real or illustrated scene depicted by the target digital content, and is therefore a host region, is based on the fact that object detection ("object detection") has been used to search the target digital content or its components for representations of objects, textures, materials, shapes, places, spaces, or areas that commonly represent background objects (e.g., clouds, trees).

In some embodiments, the neural-network classification of the target digital content or its components according to texture for the purpose of determining that a region represents the background, rather than the foreground of the real or illustrated scene depicted by the target digital content, and is therefore a host region, may run concurrently with the classification of target digital content or its components as representing materials or textures that are favorable or unfavorable as host regions (regardless of whether they are background or foreground).

In some embodiments, where the determination that a region represents the background, rather than the foreground of the real or illustrated scene depicted by the target digital content, and is therefore a host region, is based on neural network classification of the region as possessing a texture or material commonly associated with the background of images, the classification of the target digital content may be stored and re-used for other steps in the algorithm (such as the removal of host regions whose texture or material represents poor host regions).

In some embodiments, the determination that a region represents the background, rather than the foreground of the real or illustrated scene depicted by the target digital content, and is therefore a host region, is based on background modeling using depth information contained in the target digital content (e.g., a formats such as RGB-D where each pixel in a frame is associated with a depth value, possibly via a two-dimensional "depth map" matrix associated with each frame).

In some embodiments, the determination that a region represents a host region is based on using texture recognition to identify the region as possessing a texture this commonly favorable for a host region, including, for example, wall, wood paneling, or sky textures.

In some embodiments, the determination that a region represents a host region is based on using texture recognition to identify the region as possessing a texture this commonly favorable for a host region, including, for example, wall, wood paneling, or sky textures relies on using a neural network to classify the textures of various regions.

In some embodiments, where a host region is identified by using texture recognition to locate regions inside the target digital content or its components that possess textures that are commonly favorable for a host region, the quality of the resulting host regions may additionally be scored based on factors such as position in the frame, luminance value, color value, level of visual salience, etc.

In some embodiments, the determination that a region can be used as a host region can be performed using a neural network model. In particular, the neural network model can recognize texture to identify a region as possessing a texture that can accommodate a source digital content. For example, the neural network model can assign to each pixel in a frame one or more pairs of probabilities and texture labels, with each reflecting the predicted probability of that pixel possessing the particular texture and the label, and then pass these probabilities and texture label pairs through a linear layer that is responsible for transforming them into binary labels that reflect whether the pixel is part of a host region or not. Specifically, this linear layer can assign a positive binary label to any pixel whose highest probability belongs to a texture label that is listed as positive because it represents favorable host regions, where positive texture labels might include: 'brick', 'carpet', 'metal', 'paper', 'plastic', 'polished stone', 'stone', 'tile', 'wallpaper', 'wood', 'painted', and 'sky.' Conversely, the linear layer can assign a negative binary label to any pixel whose highest probability belongs to a texture label that is listed as negative because it represents favorable host regions, where negative labels might include 'hair', 'skin', 'food', 'foliage', 'fabric', 'leather', 'glass', 'water', and 'mirror'.

In some embodiments, host regions are identified by searching the target digital content or its components for contiguous regions whose available attributes possess a level of uniformity across the region (e.g., white walls, patches of blue sky), a quality that often indicates the region can host source digital content in an aesthetically appealing and/or unobtrusive manner.

In some embodiments, where a host region is identified by searching the target digital content or its components for contiguous regions whose available attributes possess a level of uniformity across the region, the quality of the resulting host regions may additionally be scored based on factors such as position in the frame, luminance value, color value, level of visual salience, etc.

In some embodiments, host regions are identified by searching the target digital content or its components for regions whose available attributes possess a level of uniformity across the region because there is an absence of edges or texture.

Figure 15:
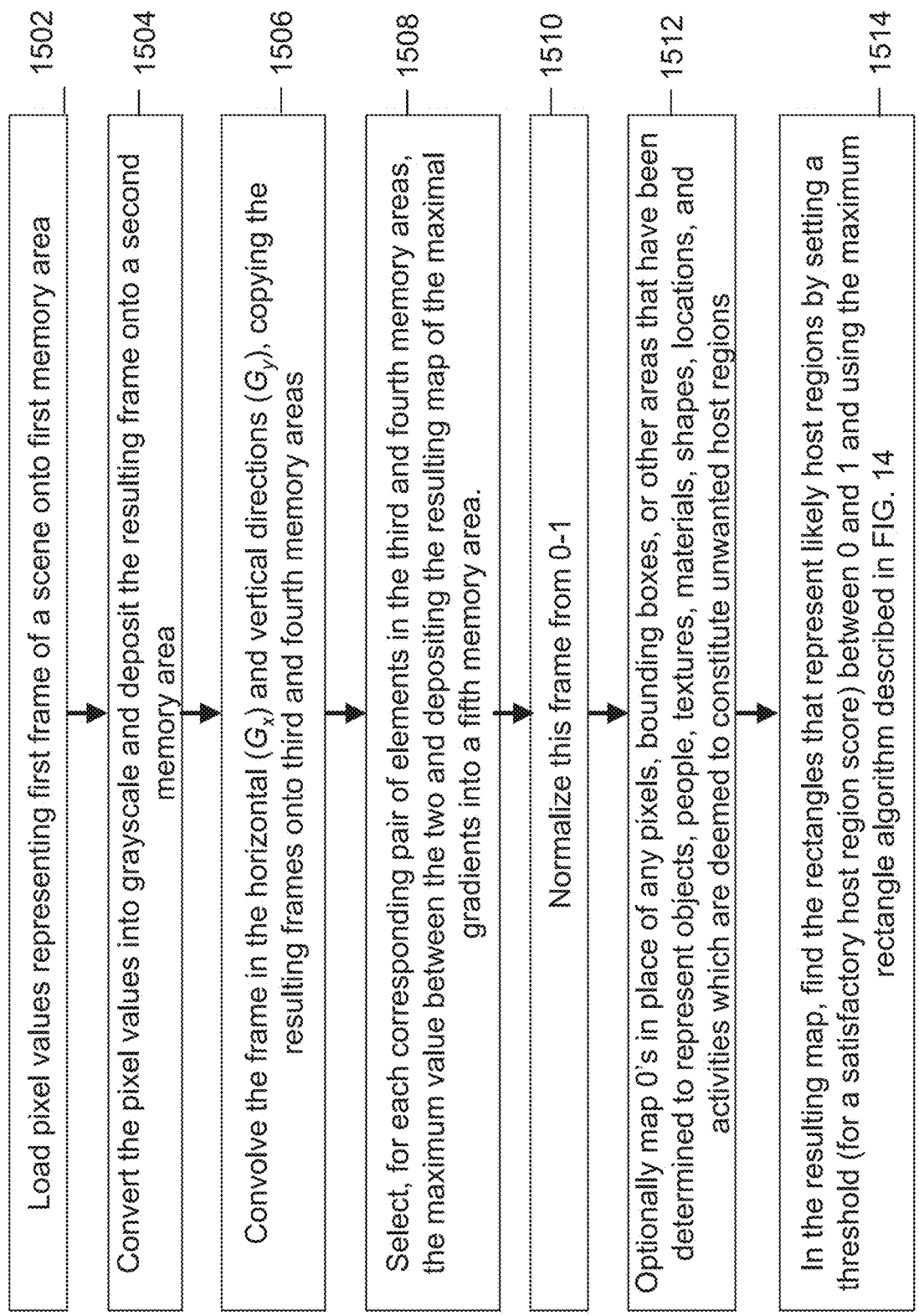
FIG. 15 illustrates identification of host regions based on their absence of edges or texture as performed by a host region identification module in accordance with some embodiments.

FIG. 15 illustrates the identification of host regions based on their absence of edges or texture as performed by the host region identification module 110 in accordance with some embodiments.

In step 1502, the host region identification module 110 is configured to load the pixel values representing a frame of a scene onto a frame buffer or memory area. In step 1504 the host region identification module 110 is configured to convert the pixel values into grayscale and depositing the resulting frame onto a frame buffer or memory area. In step 1506 the host region identification module 110 is configured to convolve the frame from the scene with a Prewitt, Sobel, combined Prewitt and Sobel, or other kernel in the horizontal ($G_x$) and vertical directions ($G_y$) and depositing the resulting frames onto frame buffers or memory areas. In step 1508, the host region identification module 110 is configured to select for each corresponding element in the frames representing the results of convolutions in the ($G_x$) and vertical directions ($G_y$) the maximum value between the two and depositing it in a frame (map of the maximal gradients) that has been loaded onto a frame buffer or memory area. In step 1510, the host region identification module 110 is configured to normalize this frame from 0-1. In step 1512, the host region identification module 110 is configured to optionally map, onto this normalized map of maximal gradients, 0's in place of any pixels, bounding boxes, or other areas that have been determined to represent objects, people, textures, materials, shapes, locations, and activities (such as skin, hair, fur, water, etc.) which are deemed to constitute unwanted host regions, that determination being made by:

i) Texture recognition;
ii) Object recognition;
iii) Using a human facial recognition and detection algorithms such as OpenCV's Haar Wavelet-based face detection tool;
iv) Deformable parts human segmentation algorithms, including but not limited to OpenCV's deformable parts model.

In step 1514, in the resulting map, finding the rectangles that represent likely host regions by setting a threshold (for a satisfactory host region score) somewhere between 0 and 1, and then relying on the algorithm in FIG. 14.

In some embodiments, host regions are identified by searching the target digital content or its components for contiguous regions whose available attributes suggest a common texture across those region (e.g. brick walls, patches of cloudy sky), a quality that indicates that the region might host source digital content in an aesthetically appealing and/or unobtrusive manner.

In some embodiments, where a host region is identified by searching the target digital content or its components for contiguous regions whose available attributes suggest a common texture across those region, the quality of the resulting host regions may additionally be scored based on factors such as position in the frame, luminance value, color value, level of visual salience, etc.

In some embodiments, host regions are identified by searching the target digital content or its components for contiguous regions whose available attributes suggest a common texture across those region (e.g. brick walls, patches of cloudy sky), by using a filter, including but not limited to Gabor filter, as described in Fogel & Sagi, *Gabor*

*filters as Texture Discriminator*, Biological Cybernetics 61 (1989), herein incorporated by reference in the entirety, to compare textures of different parts of the frame.

In some embodiments, host regions are identified by using object recognition to search the target digital content or its components for representations of objects, textures, materials, shapes, places, spaces, or areas that can host source digital content, such as billboards, guitar bodies, stadium jumbotrons, brick texture, sky texture, quadrilaterals, etc.

In some embodiments, where a host region is identified by using object recognition to search the target digital content or its components for representations of objects, textures, materials, shapes, places, spaces, or areas that can host source digital content in a favorable manner, the quality of the resulting host regions may additionally be scored based on factors such as position in the frame, luminance value, color value, level of visual salience, etc.

In some embodiments, where host regions are identified by object recognition, the data about the particular object, textures, or shapes identified (or not identified) is captured in a host region object as metadata about the host region ("host region defining data").

In some embodiments, where host regions are identified by object recognition, host regions are identified by comparing the available attributes of the target digital content or its components to the available attributes of pre-constructed object-, texture-, material-, shape-, place-, space-, or area-specific templates, considering changes in template position, and, where there is sufficient similarity, making a determination that the objects, textures, materials, shapes, places, spaces, or areas are or are not present in the target digital content or its components.

In some embodiments, where host regions are identified by comparing the available attributes of the target digital content or its components to the available attributes of object-, texture-, material-, shape-, place-, space-, or area-specific templates or using machine learning models in order to predict labels thus to determine whether or not the objects, textures, materials, shapes, places, spaces, or areas are represented in the target digital content or its components has been made, metadata about the template (e.g., the template name or the name of the object, texture, material, shape, place, space, or area that it represents), the labels and/or probabilities predicted by the machine learning models, and/or data about the determination that those objects, textures, materials, shapes, places, spaces, or areas are or are not represented in the target digital content or its components is captured in a host region object as host region defining data.

In some embodiments, where host regions are identified by object recognition, host regions are identified by inputting available attributes of the target digital content or its components into a classifier that has been trained on examples of target digital content or its components labelled by objects, textures, materials, shapes, places, spaces, or areas, and will classify the input as one or more objects, textures, materials, shapes, places, spaces, or areas.

Figure 16:
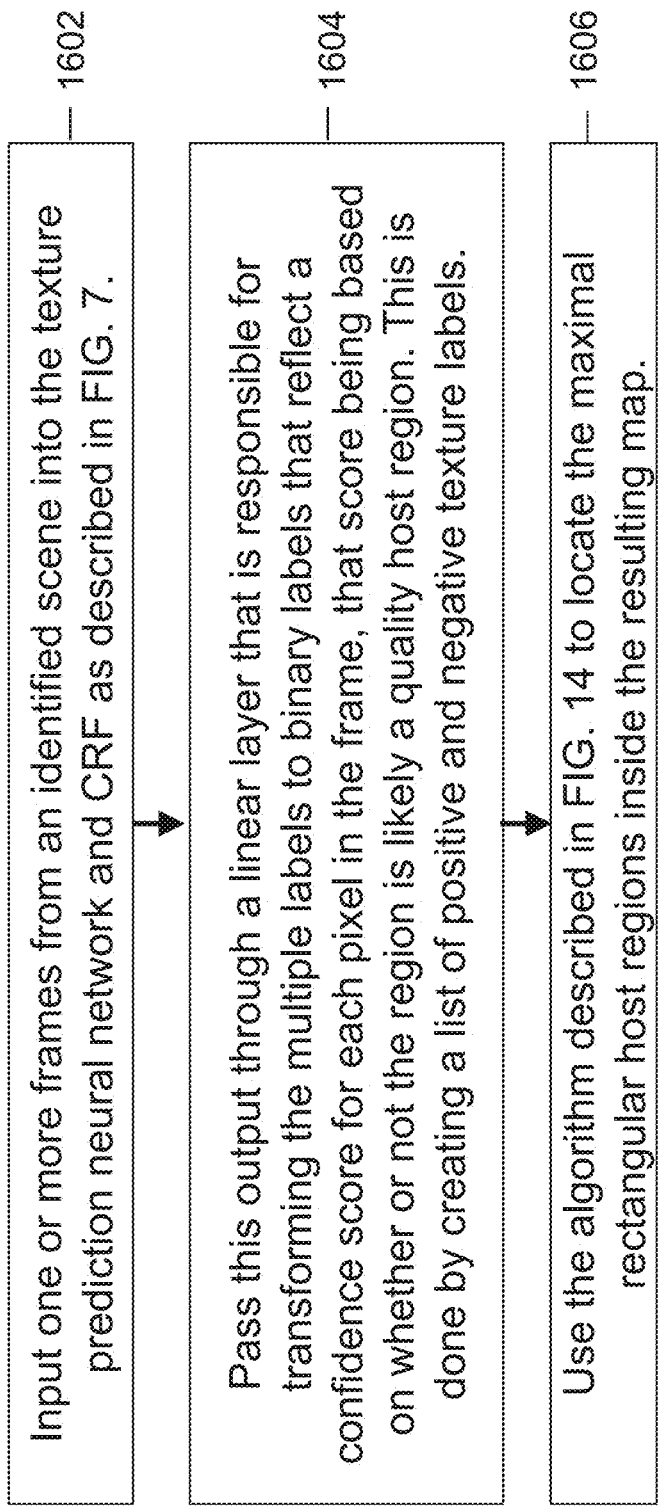
FIG. 16 illustrates identification of host regions by inputting frames of the target digital content through a neural network model in accordance with some embodiments.

FIG. 16 illustrates the identification of host regions by inputting frames of the target digital content through a neural network model as described in FIG. 7 in accordance with some embodiments. Step 1602 illustrates the inputting of one or more frames from an identified scene into the texture prediction neural network and CRF as described in FIG. 7. Step 1604, illustrates the passing, by host region identification module 110, of the resulting this output through a linear layer that is responsible for transforming the multiple labels to binary labels that reflect a confidence score for each pixel in the frame, that score being based on whether or not the region is likely a quality host region. This is done by creating a list of positive and negative texture labels. Positive labels might include: 'brick', 'carpet', 'metal', 'paper', 'plastic', 'polished stone', 'stone', 'tile', 'wallpaper', 'wood', 'painted', and 'sky' while negative categories might include 'hair', 'skin', 'food', 'foliage', 'fabric', 'leather', 'glass', 'water', and 'mirror'. Step 1606 illustrates the use of the process described in FIG. 14 to locate the maximal rectangular host regions inside the resulting map.

In some embodiments, where host region identification relies on object recognition, host region identification relies on classifiers that have been trained on examples of target digital content or its components labelled by objects, textures, materials, shapes, places, spaces, or areas they represent, and will classify the input as one or more objects, textures, materials, shapes, places, spaces, or areas, the resulting classification is captured in as host region defining data.

In some embodiments, where host region identification relies on object recognition, host regions are identified by accepting a message from a user wherein that message contains an indication that a particular object, texture, material, shapes, place, space, or area is or is not represented in the target digital content or its components.

In some embodiments, host region locations in the target digital content are predicted using a machine learning classifier, trained on the available attributes or other data from examples of host regions or the labelled as positive or negative examples, the target digital content or its components, and/or metadata about the target digital content. This machine learning classifier may take the form of, among other things, a: (A) linear classifier; (B) Fisher's linear discriminant; (C) logistic regression; (D) naive Bayes classifiers; (E) perceptron; (F) support vector machines; (G) least squares support vector machines; (H) quadratic classifiers; (I) kernel estimation; (J) k-nearest neighbors; (K) decision trees; (L) random forests; (M) conditional random fields; (N) neural networks including but not limited to: (i) convolutional neural networks, as described in Krizhevsky et al., *ImageNet Classification with Deep Convolutional Neural Networks*, NIPS (2012), herein incorporated by reference in the entirety, including the unique implementation where the neurons in the network are grouped in different layers, where each layer analyses windows of a frame, determining an output score for each pixel, where the highest score pixels are the ones in windows that match a region of that frame that is able to host, in an aesthetically-pleasing and unobtrusive manner, source digital content, and where the output scores are used to determine the coordinates of the regions of that frame that are best able to host, in an aesthetically-pleasing and unobtrusive manner, source digital content; (ii) FMM neural networks; (O) learning vector quantization; (P) meta-algorithms such as boosting and cascade classifiers, described in Viola & Jones, *Robust Real-time Object Detection*, IJCV (2001), herein incorporated by reference in the entirety; (Q) combinations of any of the above.

In some embodiments, where host regions locations in the target digital content are predicted using a machine learning classifier, predictive models may be continually refined by retraining the models on the new examples of positive or negative host regions that are produced as users make manual selections, approvals, or customizations of predicted host regions.

In some embodiments, where a host region is predicted using a machine learning classifier, the quality of the resulting host regions may additionally be scored based on factors such as position in the frame, luminance value, color value, level of visual salience, etc.

In some embodiments, a convolutional neural network model is trained on frames from examples of target digital content whose labels are positive and/or negative examples of host region defining data (e.g., the coordinates the corners of the bounding box of a host region in that particular frame, or a list of the pixels it includes). When new frames are inputted into the model, it will predict the host region defining data that defines the host region(s) in the inputted frames.

In some embodiments, after their scoring by the neural net, the pixel scores are additionally weighted based on other available attributes that speak to the favorability of a host region (such as location in frame(s), luminance, color value, etc.).

In some embodiments, host regions are identified by identifying lines and then parallelograms in the frame using methods including but not limited to the method described in Tam, Shen, Liu & Tang, *Quadrilateral Signboard Detection and Text Extraction*, CIS ST (2003), herein incorporated by reference in the entirety.

In some embodiments, the frames of the target digital content are parsed into a grid. For each section of the grid, the values of the pixels are subtracted from subsequent, similar sections across the frames of the source digital content. Where the difference is zero or sufficiently close to it based on some predetermined threshold, that part of the frame is determined to be a non-active or non-dynamic one across the source digital content and, therefore, a host region.

In some embodiments, the frames of the target digital content are searched for segments that lack gradient change or texture; this suggests that it is likely to be a flat or uniform surface and, thus, a host region. For example, this can be achieved by calculating the gradients in each direction at each pixel and then passing sliding windows of various sizes on the derivatives that have been calculated (in x and y), calculating the covariance matrix of the gradient direction vectors within each window, calculating the sum of the values along each diagonal of that matrix (or the eigenvalues along each diagonal of that matrix) and, where both sums (or both eigenvalues) of a region are sufficiently close to 0, assuming that the region lacks edges and, thus, is a host region.

Manual Host Region Identification, Approval, or Customization

In some embodiments, the host region identification module 110 receives from a user a selection message over the communication network, where the selection message represents the host region defining data or host region objects for one or more host regions selected by a user.

Figure 17A:
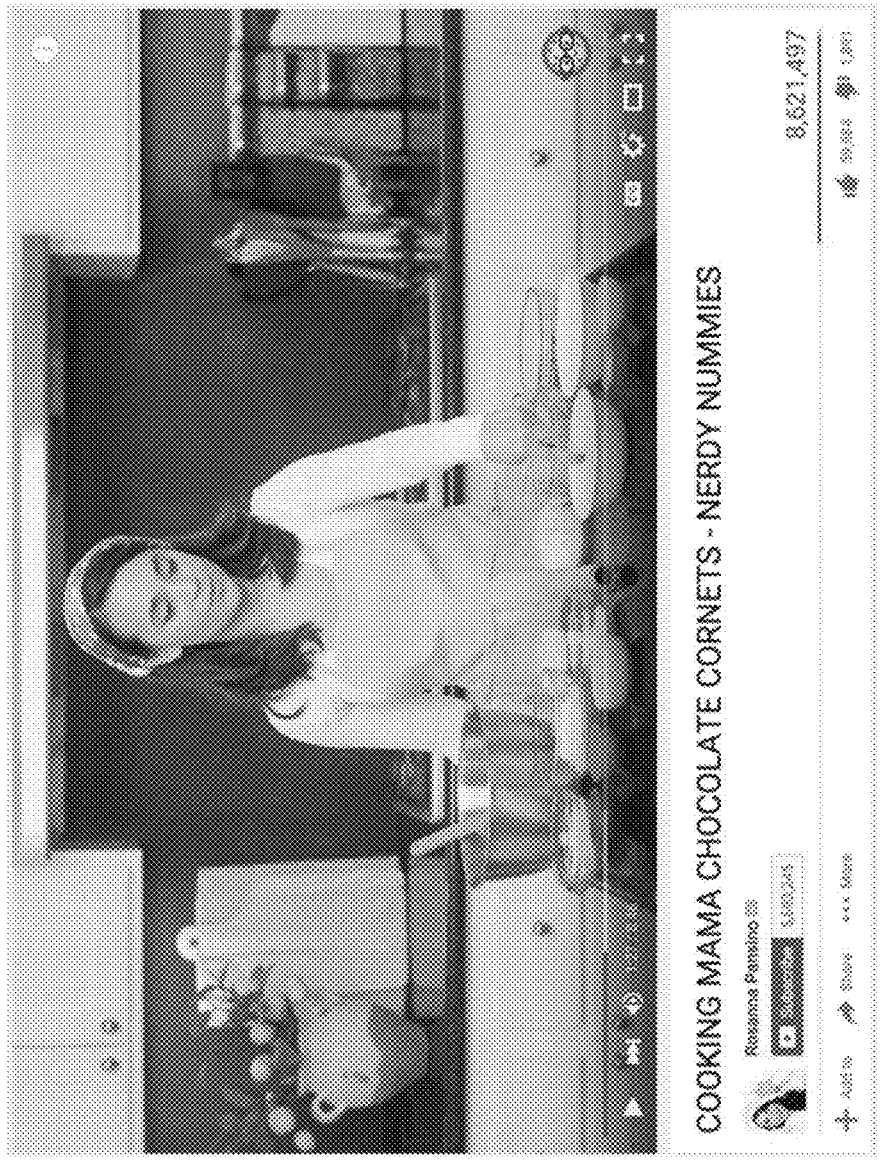
FIGS. 17A-17D illustrate an embodiment in which a host region is identified through selection in a graphical user interface in accordance with some embodiments.
Figure 17B:
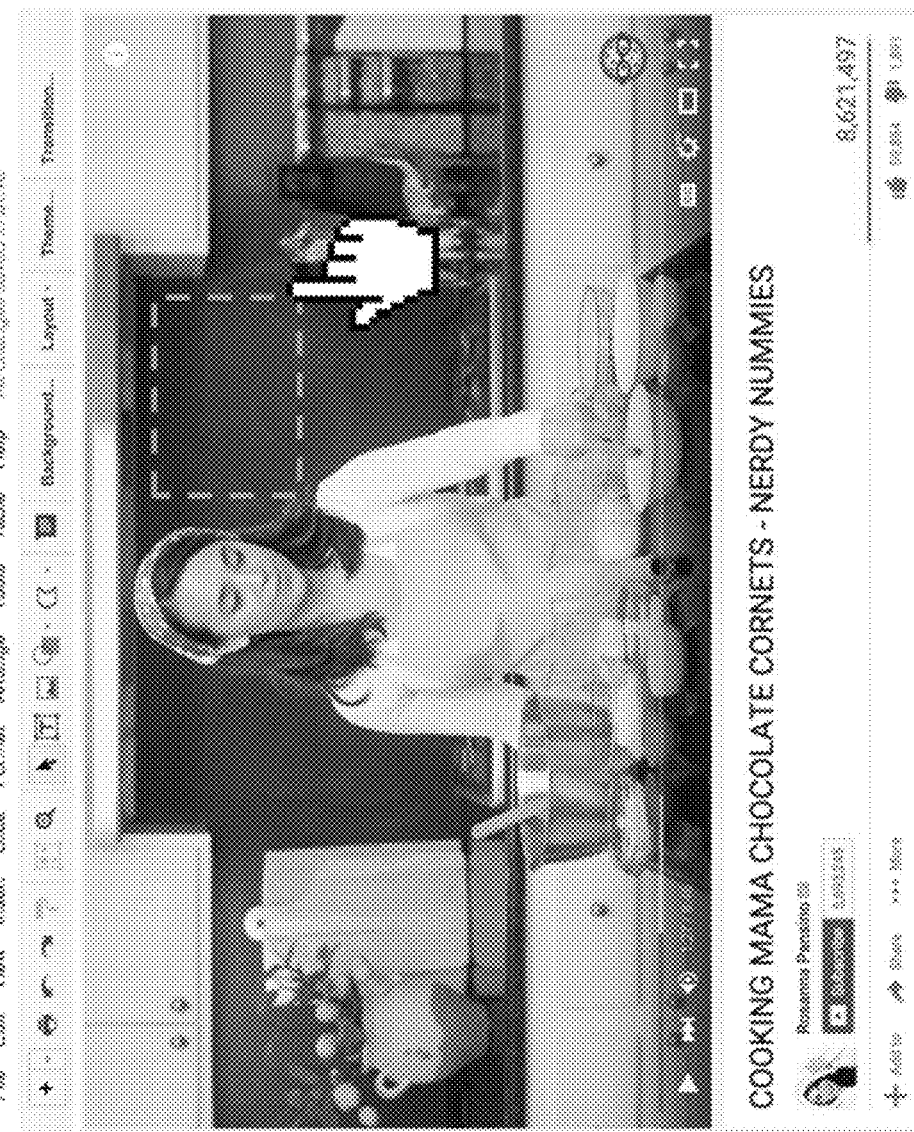
Figure 17C:
Figure 17D:
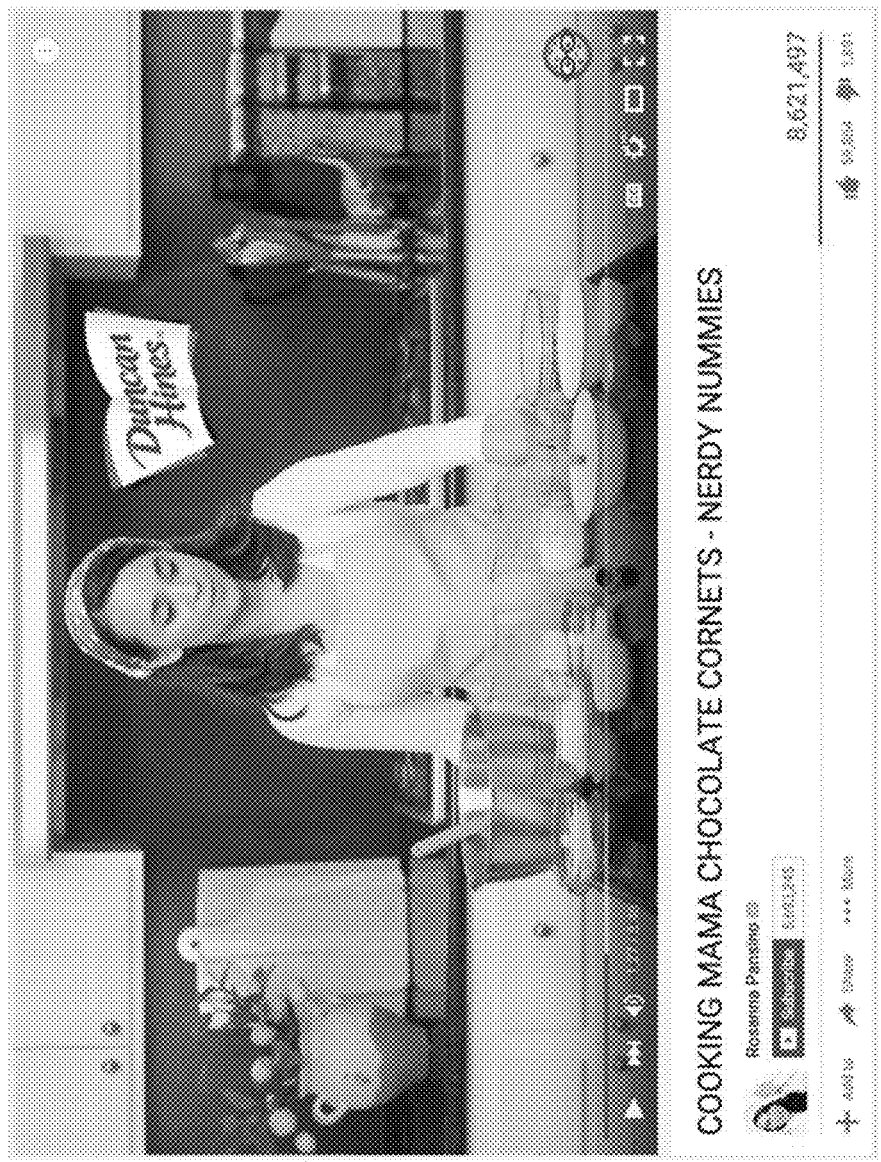

FIGS. 17A-17D illustrate an embodiment in which a host region is identified through selection in a graphical user interface in accordance with some embodiments. FIG. 17A illustrates a frame of target digital content including a video. FIG. 17B illustrates a host region, demarcated by rectilinear bounding boxes, as identified in the frame by a user inside a graphical user interface that communicates the selection to host region identification module 110. FIG. 17C illustrates a single frame of source digital content including a Portable Network Graphics (PNG) raster graphics file, depicting an advertisement image. FIG. 17D illustrates the integration of the source digital content in FIG. 17C into the host region in the frame of the target digital content, after the source digital content has been transformed to accommodate the occlusion, luminance, texture, and blur of the host region.

In some embodiments, one or more servers, procedures, functions, processes, applications, computers or devices sitting in the communication network receive from a user a selection message over the communication network, where the selection message represents the host region defining data or host region objects for one or more host regions as selected by host region identification module 110.

In some embodiments, the user selection message takes the form of a series of corners (in the case where the host region is a quadrilateral, polygon, or other shape that can be defined by its corner positions), parameters, an outline, a bounding box, list of pixels, or any other information that can be used to separate the host region from the rest of the content in one or more frames of the content.

In some embodiments, at any time during or after computerized host region identification, the host region approval module 112 is configured to receive a message over the communication network where the message includes one or more instances of host region defining data, host region objects, and/or the target digital content and its metadata.

In some embodiment, the host region approval module 112 receives, from the distribution module 114, a message including one or more of host region defining data, host region objects, and/or the target digital content and its metadata.

In some embodiment, the host region approval module 112 receives, from the host region identification module 110, a message including one or more of host region defining data, host region objects, and/or the target digital content and its metadata.

In some embodiments, at any time during or after computerized host region identification, a procedure, function, thread, process, application, memory, cache, disk or other storage, database, computer, device, or network sitting in the communication network receives, from the host region approval module 112, a message over the communication network where the message includes an indication that a host region embodied in the host region defining data or host region objects it has received is approved or selected or where the message includes one or more new, customized instances of host region defining data or host region objects (with, potentially, customized transformation objects), possibly with new metadata added.

In some embodiments, the host region approval module 112 informs the user's approval, selection, or customization of host region by providing data, guidelines, or feedback about: (1) which, if any, standard host region dimensions the approved, selected, or customized host regions can be associated with; (2) in the advertising use case, prior selling prices of the approved, selected, or customized host regions; (3) summary statistics on the approved, selected, or customized host regions.

In some embodiments, the host region approval module 112 is configured to transmit, to the distribution module 114, a message indicating that a host region is approved or selected, or a message that includes one or more one or more customized instances of host region defining data, or host region objects (with, potentially, customized transformation objects), possibly with new metadata added.

In some embodiments, the host region approval module 112 is configured to transmit, to the storage module 116, a message indicating that a host region is approved or selected, or a message that includes one or more customized instances of host region defining data, or host region objects (with, potentially, customized transformation objects), possibly with new metadata added.

In some embodiments, the host region approval module 112 is configured to transmit, to the host region identification module 110, a message indicating that a host region is approved or selected, or a message that includes one or more customized instances of host region defining data, host region objects (with, potentially, customized transformation objects), or lightweight host region objects, possibly with new metadata added. host region defining data, or host region objects (with, potentially, customized transformation objects), or lightweight host region objects, possibly with new metadata added.

In some embodiments, the host region approval module 112 is part of a device or user account operated by the same user as that of the device or user account originating the target digital content.

Creation of Transformation Objects, Generally

In some embodiments, any time after or during host region identification, the available attributes or other qualities of the host region or target digital content are used to create one or more masks, filters, kernels, homography or other matrices, images, arrays, lists of coordinates or other objects or data structures ("transformation objects"), that enable a placement of the source digital content to emulate the location, motion, pose, luminance, texture, and/or level of blur in the surface, texture, material, plane, object, place, space, location, or area which is associated the host region and, thus, to appear more immersed in the target digital content, improving viewer experience.

In some embodiments, the creation of transformation objects is handled by the host region identification module(s) 110 since host region identification and transformation object creation processes may be interwoven and may share compatible resources (e.g. GPUs).

In some embodiments, a procedure, function, process, application, computer, or device that is sitting in the network and is dedicated to the selection of source digital content to be placed upon the host region ("source digital content selection module") receives the host region defining data, host region object, the target digital content, and/or metadata about the target digital content and the transformation object creation process does not commence until it receives a return message from that the content integration module 120 containing the source digital content or an indication about whether there is appropriate source digital content to place upon the identified host region or interest in placing source digital content upon the identified host region. This saves the expense of creating transformation objects in case there is no appropriate source digital content or interest.

In some embodiments, where host region defining data or host region objects are transmitted to one or more content integration modules 120 and the transformation object creation process waits for an indication from those content integration modules 120 that there is interest from interested parties (e.g. advertisers) in placing source digital content upon the host region before proceeding, those interested parties may express interest or bid on the host region without knowledge of its eventual level of occlusion, luminance, or blur, and may, retrospectively, after the determination of the transformation object, receive a settlement or reimbursement for any surplus in occlusion or blur or lack of luminance in the eventual placement.

In some embodiments, host region defining data or host region objects are transmitted to one or more source digital content selection modules 118 at the same time that the transformation object creation process begins. This aids parallelization by allowing the process of creating the transformation objects to start while source digital content is still being selected.

Host Region Tracking and Pose Estimation

In some embodiments, where there is camera motion and/or motion or transformation of the surface, texture, material, plane, object, place, space, location, or area that is associated with the host region across the frames of the target digital content, the location or the pose of that surface, texture, material, plane, object, place, space, location, or area is tracked across those frames (collectively, "host region tracking"), so that the integration of the source digital content upon the host region can emulate that location and pose and, thus, achieve a more immersed and realistic feel, improving viewer experience.

In some embodiments, when the surface, texture, material, plane, object, place, space, location, or area that is associated with the host region lacks sufficient features to enable host region tracking ("trackable features")—e.g., it is a blank wall—the host region is temporarily augmented with a "buffer" of additional pixels in order to capture, within the buffer, more features that can be used to track the surface, texture, material, plane, object, place, space, location, or area. After host region tracking is complete, the buffer can be subtracted from the host-region defining data.

In some embodiments, host region tracking is achieved using methods including but not limited to: (A) feature tracking (e.g., video tracking), including but not limited to methods based on (i) optical flow, including but not limited to the method described in Lucas & Kanade, *An Iterative Image Registration Technique with an Application to Stereo Vision*, IJCAI (1981), herein incorporated by reference in the entirety; (ii) kernel-based optical flow, including but not limited to the methods described in Weinzaepfel et al., *DeepFlow: Large Displacement Optical Flow with Deep Matching*, ICCV (2013), herein incorporated by reference in the entirety, Farneback, *Two frame Motion Estimation based on Polynomial Expansion*, SCIA (2003), herein incorporated by reference in the entirety, or Comaniciu et al., *Real-time Tracking of Non-rigid Objects Using Mean Shift*, CVPR (2000), herein incorporated by reference in the entirety; (B) Kalman filters, including but not limited to the method described in Arulampalam et al., *A Tutorial on Particle Filters for Online Nonlinear/Non-Gaussian Bayesian Tracking*, IEEE TSP (2000); (C) particle filters, including but not limited to the method described in Chandrasekaran, *Parametric & Non parametric Background Subtraction Model with Object Tracking for VENUS*, PhD thesis, RIT (2010); Martinez-del-Rincon et al., *Tracking Human Position and Lower Body Parts Using Kalman and Particle Filters Constrained by Human Biomechanics*, IEEE SMC (2010), or Mihaylova et al., *Object Tracking by Particle Filtering Techniques in Video Sequences, in Advances and Challenges in Multisensor Data and Information*, NATO Security Through Science Series, 8 (2007); (D) egomotion (e.g., the practice of determining the 3D motion of a camera within an environment) using visual odometry techniques including but not limited to those which rely on feature detection to construct an optical flow from the frames in the target digital content ("egomotion"); (E) ArUco-marker-based tracking; (F) OpenCV's Object Tracking algorithm; (G) some combination of these methods.

In some embodiments, host region tracking is achieved using optical flow, along with RANSAC to reduce the effect of outliers, and producing, for each frame in the content, a host region positioning and a homography matrix that describes how the host region in the starting frame may be transformed to approximate the positioning of the host region in each of the other frames in the content.

In some embodiments, at any time during or after host region tracking, an identified host region may be excluded from further consideration because it fails to satisfy some size or duration threshold or is otherwise deemed unable to favorably host source digital content.

In some embodiments, where egomotion is the method of tracking the host region, the egomotion data may be saved as metadata, and, later, used to aid the process of determining the visual salience heat map of the particular target digital content or its components.

Figure 18:
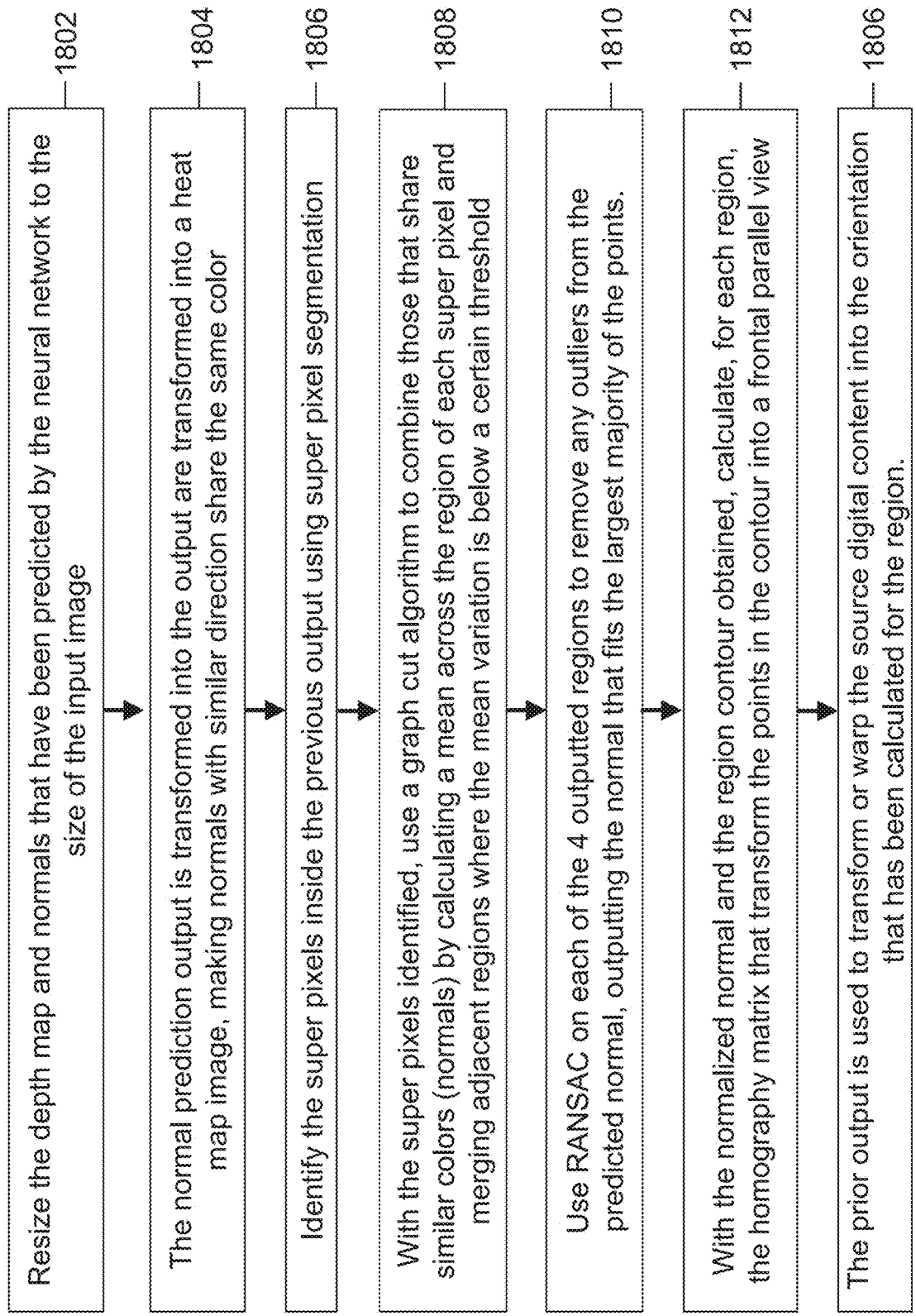
FIG. 18 illustrates a system of neural networks of varying coarseness that is designed to transform a source digital content using the depth map and normals in accordance with some embodiments.

FIG. 18 illustrates a system of neural networks of varying coarseness that is designed to transform a source digital content using the depth map and normals in accordance with some embodiments. The outputs of the process in FIG. 5 (depth map and normal) can be used in conjunction with the original image to fit planes to region and thus, to create transformation objects that emulate the pose of the host region.

In step 1802, the depth map and normals that have been predicted by the neural network are resized to the size of the input image.

In step 1804, the normal predictions (dimension HxWx1) from FIG. 5 are transformed into a heat map image, in which the normals with similar direction share similar colors (dimension HxWx3).

In step 1806, the super pixels inside the heat map image are identified using a super pixel segmentation algorithm such as optical flow-based, edge detection, meanshift, graph based, blob-based, SLIC, watershed, quick shift, or neural network based superpixel segmentation.

In step 1808, a graph cut algorithm is used to combine super pixels that share similar colors (normal). This is done by calculating a mean across the region of each super pixel and merging adjacent regions where the mean variation is below a certain threshold.

In step 1810, RANSAC is used on each of the 4 outputted regions (which represent the segmented regions inside the image where all points share a similar normal) to remove any outliers from the predicted normal, outputting the normal that fits the largest majority of the points (and using a threshold of 80%; if 80% of the points fit, the algorithm converges).

In step 1812, after the normal of a surface and the points in the contour of that surface are obtained, a homography matrix is calculated using the surface normal/depth map to transform the points in the contour to a fronto-parallel pose (e.g., parallel to the camera). This allows the system to approximate the surface as if it was not seen from a perspective (e.g., an object being seen from the top). Once the contour in the fronto-parallel pose is obtained, the source digital content is placed inside that contour.

In step 1814, the inverse of the homography matrix from the prior step (a transformation that will transform something from the frontal parallel view to the same orientation as the region selected) are calculated for each region.

In step 1816, the prior output is used to transform or warp the source digital content into the orientation that has been calculated for the region.

Occlusion Handling

In some embodiments, any time after or during host region identification, the available attributes or other qualities of the host region or target digital content are used to create a mask, filter, kernel, matrix, image, array, or other object or data structure ("occlusion transformation object") that enables a placement of the source digital content to allow or appear to allow any representations of objects which, inside the scene depicted by the target digital content, pass between the camera or viewer perspective and the surface, texture, material, plane, object, place, space, location, or area which is associated with the host region to occlude the host region (e.g., block it from view) just as they would in the physical world. This gives the resulting placement a more immersed and realistic feel, improving viewer experience.

In some embodiments, the host region identification module 110 is configured to keep a count, during the determination of the occlusion transformation object, of the number of pixels in the host region marked occluded in each frame in which the host region appears. This facilitates the pairing of the host region with source digital content (e.g., the selling of the host region for advertising purposes) by detailing how much of the eventual placement will actually be seen by a viewer.

In some embodiments, the occlusion transformation object is a set of images, lists, multidimensional arrays, or matrices, one for each frame of the content that the host region occupies in the target digital content or one for each frame of the content that is meant to host a placement of source digital content, with each element or pixel in each image, list, array, or a matrix being associated with a particular pixel in the host region and containing a binary indicator of whether or not the pixel is occluded.

In some embodiments, the occlusion transformation object is a lightweight data-interchange format, including but not limited to JSON or XML, or lightweight image format that includes a list of images, lists, multidimensional arrays, or matrices, one for each frame of the content that the host region occupies in the target digital content or one for each frame of the content that is meant to host a placement of source digital content, with each element or pixel in each image, list, array, or a matrix being associated with a particular pixel in the host region and containing a binary indicator of whether or not the pixel is occluded.

In some embodiments, the occlusion transformation object is a so-called "foreground mask" for either the host region or the frames it occupies—e.g., a binary image marking, for each frame in which the host region appears, background pixels (here, those belonging to the surface, texture, material, plane, object, place, space, location, or area that is associated with the host region) with one value and foreground pixels (here, those belonging to representations of objects which, inside scene depicted by the target digital content, pass between the camera or viewer perspective and the surface, texture, material, plane, object, place, space, location, or area associated with the host region) with another value. Later, when source digital content is placed on the target digital content, this foreground mask acts as a guide, with its values dictating whether to expose the source digital content's pixels to the viewer (as is the case when a particular pixel in the mask holds the value for non-occlusion) or to expose the target digital content pixels to the viewer (as is the case when a particular pixel in the mask holds the value for occlusion).

In some embodiments, the occlusion transformation object is a so-called "foreground mask" with the same dimensions as the host region. This reduces computation time.

Figure 19:
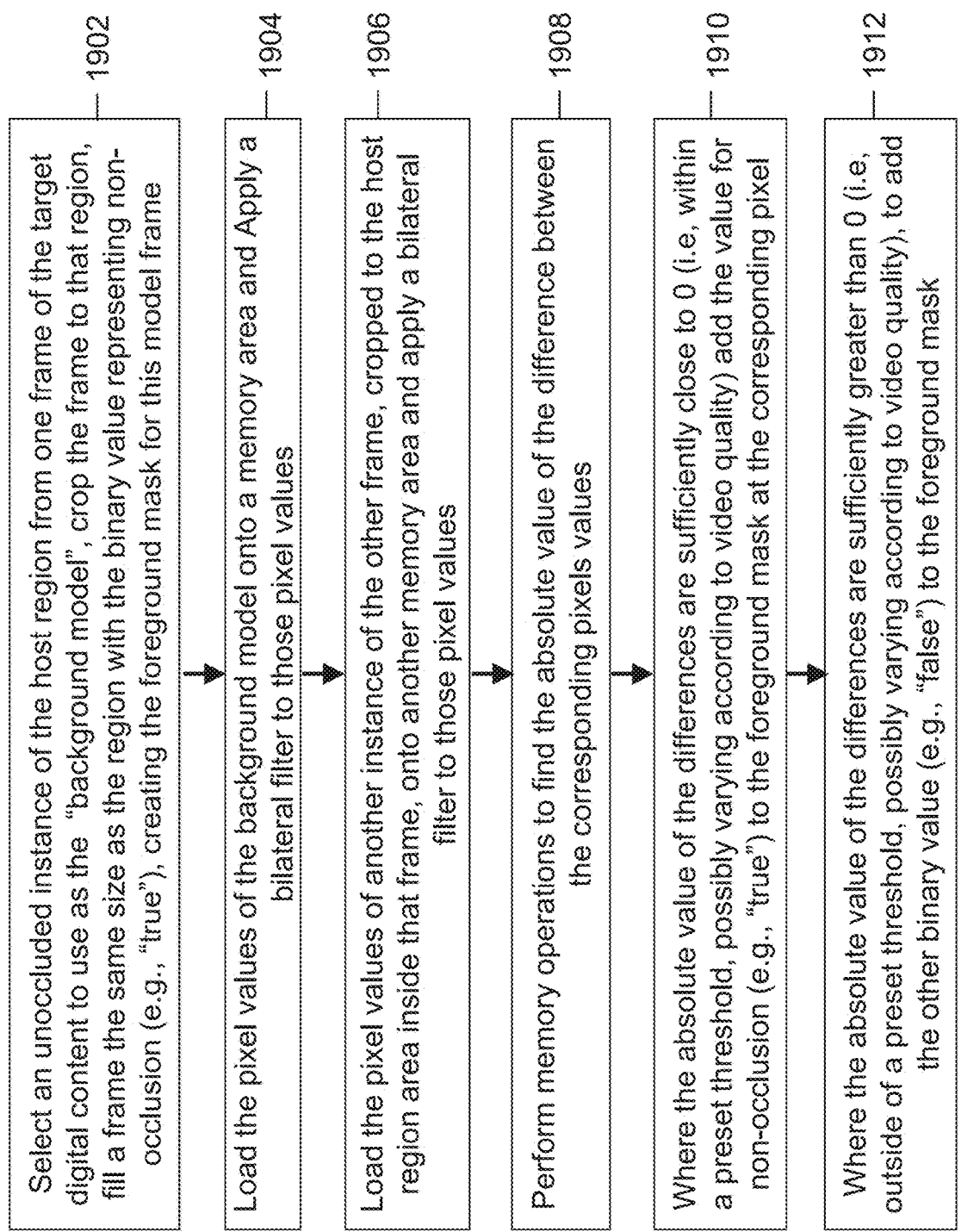
FIG. 19 illustrates determination of a foreground mask transformation object using background subtraction as performed by a host region identification module in accordance with some embodiments.

FIG. 19 illustrates the determination of a foreground mask transformation object using background subtraction as performed by the host region identification module 110 in accordance with some embodiments. In step 1902, the host region identification module 110 is configured to select an unoccluded instance of the host region from one frame of the target digital content to use as the "background model", to crop the frame to that host region, and to fill a frame solely by the binary value representing non-occlusion (e.g., "true"), representing the foreground mask for this model frame. In step 1904—step 1916, the host region identification module 110 is configured to create foreground masks for all other frames. In step 1904 the host region identification module 110 is configured to load the pixel values of the background model onto a frame buffer or memory area and to apply a bilateral filter, as described in Carlo Tomasi and Roberto Manduchi, "Bilateral Filtering for Gray and Color Images," IEEE (1998), herein incorporated by reference in the entirety ("bilateral filter") to those pixel values in order to smooth out noise while preserving edges. In step 1906 the host region identification module 110 is configured to load the pixel values of another instance of the other frame, cropped to the host region area inside that frame, onto another frame buffer or memory area and to apply a bilateral filter to those pixel values. In step 1908 the host region identification module 110 is configured to perform memory operations to find the absolute value of the difference between the corresponding pixels values. In step 1910 the host region identification module 110 is configured, where the absolute value of the differences is sufficiently close to 0 (e.g., within a preset threshold, possibly varying according to video quality), to add the value for non-occlusion (e.g., "true") to the foreground mask at the corresponding pixel. In step 1912, the host region identification module 110 is configured, where the absolute value of the differences is sufficiently greater than 0 (e.g., outside of a preset threshold, possibly varying according to video quality), to add the other binary value (e.g., "false") to the foreground mask.

Figure 20:
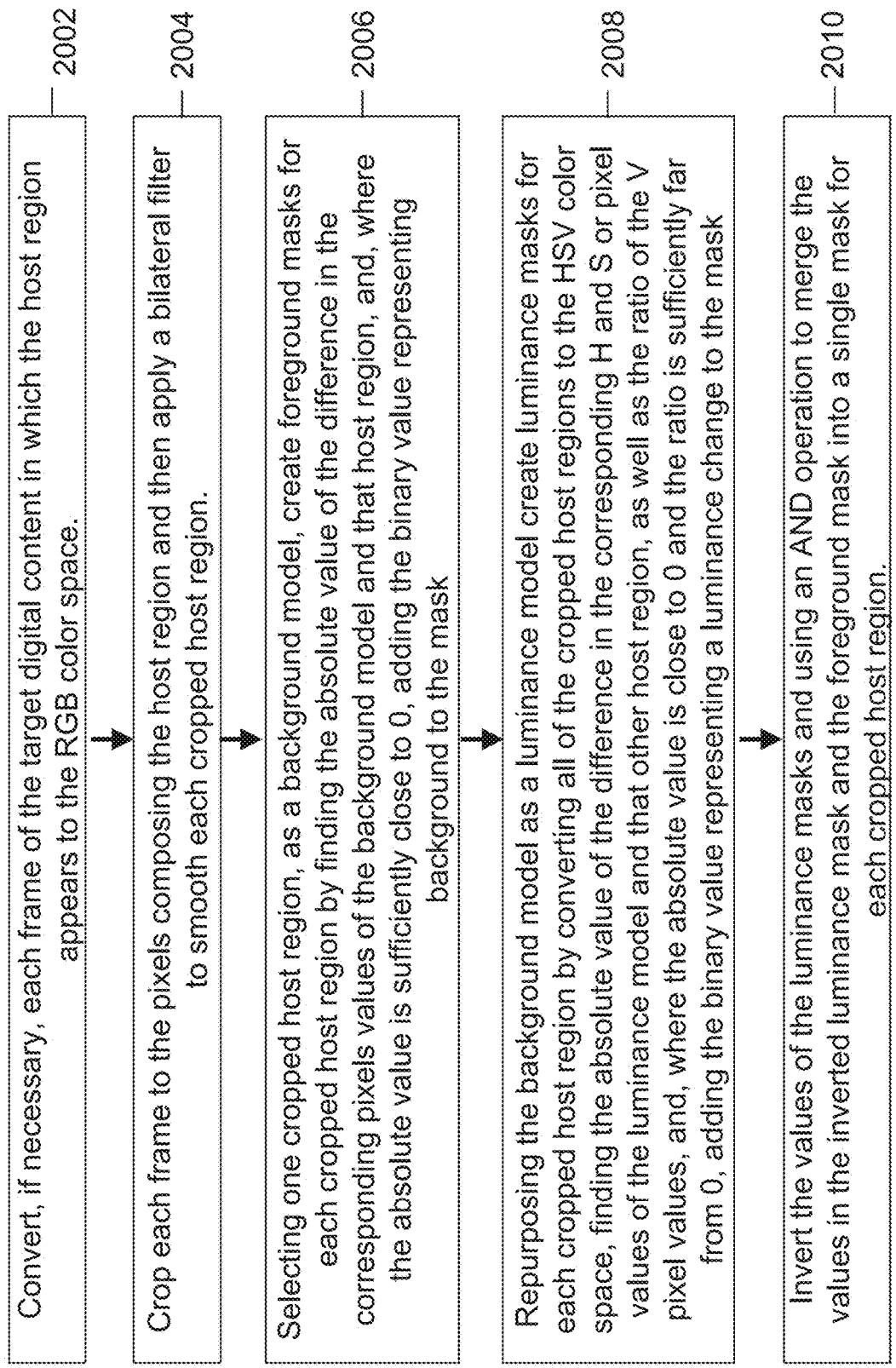
FIG. 20 illustrates determination of a foreground mask transformation object using background subtraction, and, in parallel, creation of a luminance mask as performed by a host region identification module in accordance with some embodiments.

FIG. 20 illustrates the determination of a foreground mask transformation object using background subtraction and, in parallel, the determination of a luminance mask that enhances the foreground mask as performed by the host region identification module 110 in accordance with some embodiments.

In some embodiments, a foreground mask is created using so-called "background subtraction" supplemented by the determination of "luminance mask" that enable the removal of shadows and other changes in luminance (which, in the physical world, do not occlude in same the way that objects do) from the foreground mask. Here, an instance of the host region from one frame of the target digital content that is both unoccluded and unaffected by changes in luminance (e.g., represents the luminance status quo) is used as the "background model" for both the foreground mask and the luminance mask. For the luminance mask, the frame is converted to Lab, HSV, or any other color space with a luminance-related channel. For this frame, both the foreground mask and the luminance mask are populated solely by the binary value representing non-occlusion and the absence of luminance changes (e.g., "true"). Foreground masks and luminance masks for all other frames are created by first applying bilateral filters to each of these versions of the frame representing the background model and luminance model and then:

In step 2002, the host region identification module 110 is configured to convert, if necessary, each frame of the target digital content in which the host region appears to the RGB color space.

In step 2004, the host region identification module 110 is configured to crop each frame to just those pixels composing the host region and then to apply a bilateral filter is applied to smooth each cropped host region.

In step 2006, the host region identification module 110 is configured to select the cropped host region from one frame (e.g., the first frame) as the background model, to load the original pixel values of the cropped host region representing the background model onto a frame buffer or memory area, to load, for every other cropped host region, the pixel values onto another frame buffer or memory area, to perform memory operations to find the absolute value of the difference between the corresponding pixels values of the background model and the other cropped host region, and, where the absolute value of the differences are sufficiently close to 0 (e.g., within a preset threshold, possibly varying according to video quality), to add the value for background (e.g., "true") to the foreground mask at the corresponding pixel or, where the absolute value of the differences are sufficiently greater than 0 (e.g., outside of a preset threshold, possibly varying according to video quality), to add the other binary value (e.g., "false") to the foreground mask.

In step 2008, the host region identification module 110 is configured to load the pixel values the cropped host region representing the luminance model (often, the same one representing the background model) onto a frame buffer or memory area, to convert the values to the HSV color space, to perform memory operations to find the absolute value of the difference between the corresponding H and S pixel values and to calculate the ratio of corresponding V pixel values and if the V ratio is sufficiently far from 0 (e.g., beyond a preset threshold, possibly varying according to video quality) and the absolute value of the differences in the H and S values is sufficiently close to 0 (e.g., within a preset threshold, possibly varying according to video quality), to add the value indicating a change in luminance (e.g., "true") to the luminance mask at the corresponding pixel or where the thresholds are not met, to add the other binary value (e.g., "false") to the foreground mask.

In step 2010, the host region identification module 110 is configured to invert the values of the luminance mask for each cropped host region to apply an AND operation to merge the inverted luminance mask and the foreground mask for each cropped host region, with the output being copied to a frame or memory buffer.

In some embodiments, where a foreground mask is created using so-called "background subtraction" and supplemented by the determination of "luminance mask" that enable the removal of shadows and other changes in luminance (which, in the physical world, do not occlude in same the way that objects do) from the foreground mask, the luminance mask is created by using a Gabor filter to capture, as described in Fogel & Sagi, *Gabor filters as Texture Discriminator*, Biological Cybernetics 61 (1989), herein incorporated by reference in the entirety, the texture of the host region from one frame of the target digital content that is both unoccluded and unaffected by changes in luminance (e.g., represents the luminance status quo) and is used as the "background model" for both the foreground mask and the luminance mask. A "luminance mask" can then be created by comparing the texture information from this background model to other frames, marking the pixels which similar texture as shadows or areas of luminance change (rather than as occluding objects, which would not have the same texture). After this is done for a particular frame, its values can be inverted and then an AND operation can be applied with the luminance mask and the foreground mask for each frame, with the output being copied to a frame or memory buffer.

Figure 21:
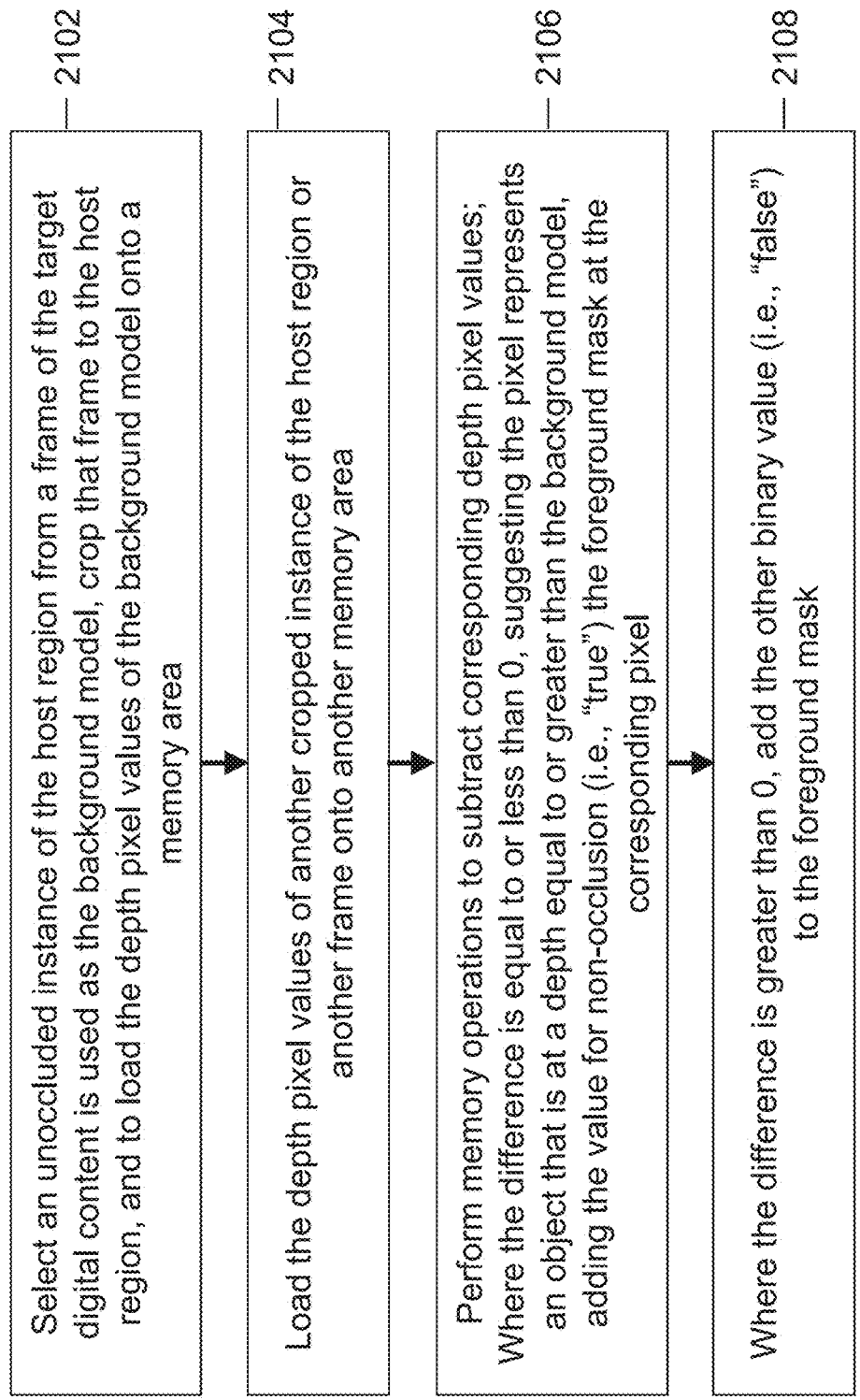
FIG. 21 illustrates determination of a foreground mask transformation object using depth information as performed by a host region identification module in accordance with some embodiments.

FIG. 21 illustrates the determination of a foreground mask transformation object using depth information as performed by the host region identification module 110 in accordance with some embodiments. The depth information can be either intrinsic to the target digital content (e.g., an RGB-D video) or calculated based on the available attributes of the target digital content or its components.

In step 2102, the host region identification module 110 is configured to select an un-occluded instance of the host region from a frame of the target digital content is used as the background model, to crop that frame to the host region, and to load the depth pixel values of the background model onto a frame buffer or memory area.

In step 2104, the host region identification module 110 is configured to load the depth pixel values of another cropped instance of the host region or another frame onto another frame buffer or memory area.

In step 2106, the host region identification module 110 is configured to perform memory operations to subtract corresponding depth pixel values; Where the difference is equal to or less than 0, suggesting the pixel represents an object that is at a depth equal to or greater than the background model, adding the value for non-occlusion (e.g., "true") the foreground mask at the corresponding pixel.

In step 2108, the host region identification module 110 is configured, where the difference is greater than 0, to add the other binary value (e.g., "false") to the foreground mask.

Figure 22:
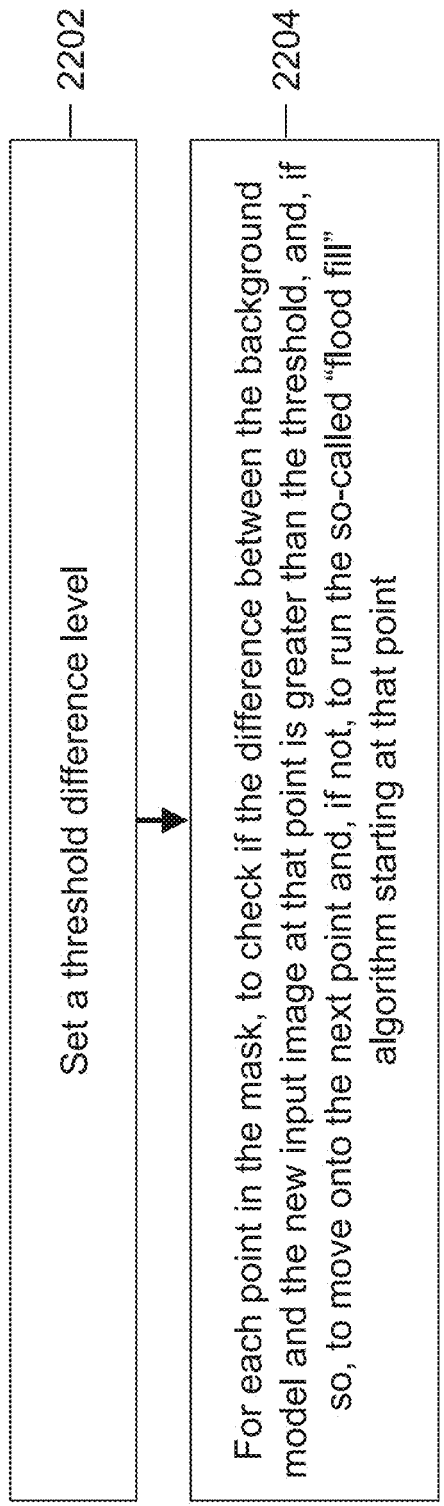
FIG. 22 illustrates improvement of a foreground mask transformation object by removing noise and outliers as performed by a host region identification module in accordance with some embodiments.

FIG. 22 illustrates the improvement of a foreground mask or combined foreground and luminance mask transformation object by removing noise and outliers as performed by the host region identification module 110 in accordance with some embodiments. In step 2202, the host region identification module 110 is configured to set a threshold difference level. In step 2204, the host region identification module 110 is configured, or each point in the mask, to check if the difference between the background model and the new input image at that point is greater than the threshold, and, if so, to move onto the next point and, if not, to run the so-called "flood fill" algorithm starting at that point.

In some embodiments, the selection of the background model for the creation of a foreground mask or combined foreground and luminance mask involves selecting the version of the identified host region in the first frame of a given scene of the target digital content.

In some embodiments, where or, if the target digital content is live or streamed, the selection of the background model for the creation of a foreground mask or combined foreground and luminance mask involves selecting the version of the identified host region in the current or most recently generated frame.

Luminance Handling

In some embodiments, any time after or during host region identification, the available attributes or other qualities of the host region or target digital content are used to create a mask, filter, kernel, matrix, image, array, or other object or data structure ("luminance transformation object") that enables the placement of source digital content on a host region to reflect the luminance changes (e.g., from shadows or specular light) that affect the surface, texture, material, plane, object, place, space, location, or area which is depicted in the target digital content and which is associated the host region. This gives the eventual placement of the source digital content a more immersed and realistic feel, improving viewer experience.

In some embodiments, the luminance transformation object is a list of lists, multi-dimensional arrays, or matrices, each capturing values that (through multiplication, addition, or any other operator) are able to transform the pixels of the source digital content or its placement such that they reflect the luminance values possessed by the host region as it exists in the target digital content.

In some embodiments, the luminance transformation object is created by using a version of the host region (one that is devoid of luminance changes) from a particular frame as a "luminance model" and comparing that luminance models' host region luminance-related pixel values (e.g., the L channel in Lab) to those of all the other frames the host region occupies. Differences in luminance-related pixel values are captured as a luminance transformation object, each of whose elements represent a transformation value that, when applied to the source digital content, dictates how and how much to adjust (by addition, multiplication, or any other operation) its pixel values in order to match the luminance changes in the host region as it exists in the target digital content.

Figure 23:
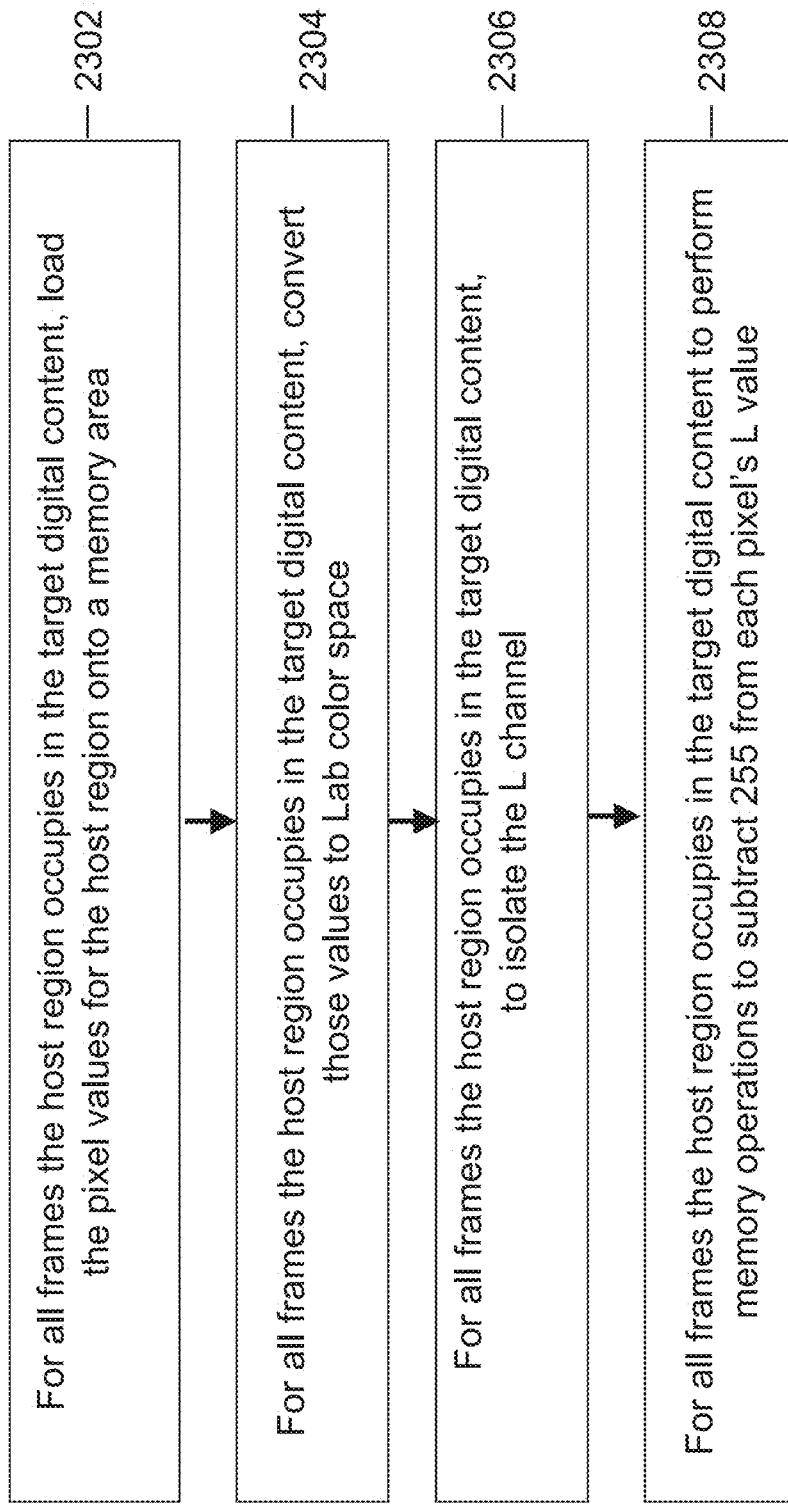
FIG. 23 illustrates determination of a luminance transformation object by a host region identification module in accordance with some embodiments.

FIG. 23 illustrates the determination of a luminance transformation object by the host region identification module 110 in accordance with some embodiments.

In step 2302, the host region identification module 110 is configured, for all frames the host region occupies in the target digital content, to load the pixel values for the host region onto a frame buffer or memory area.

In step 2304, the host region identification module 110 is configured, for all the frames the host region occupies in the target digital content, to convert those values to Lab.

In step 2306, the host region identification module 110 is configured, for all frames the host region occupies in the target digital content, to isolate the L channel.

In step 2308, the host region identification module 110 is configured, for all frames the host region occupies in the target digital content, to perform memory operations to subtract 255 from each pixel's L value.

In some embodiments, where the source digital content possesses a different shape or geometry than the host region (as is the case, for example, when placing source digital content representing a 3D object such as a barber pole on a host region that represents a 2D surface such as a wall), a 3D reconstruction of the geometry of (i) the scene depicted by the original content; (ii) the light sources in that space; and (iii) the 3D object represented by the source digital content is used to predict how luminance changes will affect the placement of the source digital content. This gives the eventual placement of the source digital content a more immersed and realistic feel, improving viewer experience.

In some embodiments, where the source digital content depicts a texture or material that is different than that of the host region (as is the case, e.g., when placing source digital content representing metallic lettering on a host region associated, in the scene depicted by the target digital content, with a wood wall), 3D reconstruction of the geometry of the scene depicted by the original content, data about the light sources (e.g., lamps or the sun) in that 3D reconstruction, and models that predict how certain textures or materials respond to luminance changes are used to model and/or modify the behavior of source digital content or its placement as it is subject to luminance changes that affected the host region. This gives the placement of the source digital content an immersive, realistic feel and improves the experience of the viewer.

In some embodiments, the luminance transformation object is a lightweight data-interchange format, including but not limited to JSON or XML.

Texture Handling

In some embodiments, any time after or during host region identification, the available attributes or other qualities of the host region or target digital content are used to create a mask, filter, kernel, matrix, image, array, or other object or data structure ("texture transformation object") that enables a placement of source digital content on the host region to reflect the original texture(s) of the surface, texture, material, plane, object, place, space, location, or area in the target digital content which is associated the host region. This gives the eventual placement of the source digital content a more immersed and realistic feel, improving viewer experience.

In some embodiments, the texture transformation object is a list of lists, multi-dimensional arrays, or matrices, each capturing values that (through multiplication, addition, or any other operator) are able to transform the pixels of the source digital content or its placement such that they reflect the textures possessed by the host region as it exists in the target digital content.

In some embodiments, the texture transformation object is a lightweight data-interchange format, including but not limited to JSON or XML.

Blur Handling

In some embodiments, any time after or during host region identification, the available attributes or other qualities of the host region or the target digital content is used to create a mask, filter, kernel, matrix, image, array, or other object or data structure ("blur transformation object") that enables any placement of source digital content on the host region to reflect the original level of blur of the surface, texture, material, plane, object, place, space, location, or area in the target digital content which is associated the host region. This gives the eventual placement of the source digital content a more immersed and realistic feel, improving viewer experience.

In some embodiments, the blur transformation object is a list of lists, multi-dimensional arrays, or matrices, each capturing values that (through multiplication, addition, or any other operator) are able to transform the pixels of the source digital content or its placement such that they reflect the level of blur possessed by the host region as it exists in the target digital content.

In some embodiments, the blur transformation object is created by using depth information gained during, for example, background modeling to predict the level of blur transformation that is necessary for the placement of source digital content to reflect the original level of blur of the surface, texture, material, plane, object, place, space, location, or area in the scene that the host region is associated with the host region in the target digital content.

In some embodiments, the blur transformation object is created by using blur detection algorithms such as OpenCV's blur detection tool, to detect and then replicate the original level of blur of the surface, texture, material, plane, object, place, space, location, or area in the scene that the host region is associated with the host region in the target digital content.

In some embodiments, the tracking of the host region leads to an understanding of the rate of motion of the surface, texture, material, plane, object, place, space, location, or area that is associated with the host region across the frames such that the eventual placement can be blurred accordingly in order to recreate the blur caused by the motion of pixels across time in the original content.

In some embodiments, the blur transformation object is a lightweight data-interchange format, including but not limited to JSON or XML.

Merged Transformation Objects

In some embodiments, after their separate creation, the transformation objects dedicated to different transformations are merged into one or more masks, filters, kernels, matrices, images, arrays, or other objects or data structures ("merged transformation object").

In some embodiments, the merged transformation object is a set of matrices, images, or arrays, one for each frame of the content, whose values that transform (e.g. through multiplication, subtraction, or addition) the source digital content so that it reflects the occlusion, texture, luminance, and blur of the host region.

In some embodiments, the merged transformation object is a set of matrices, images, or arrays, one for each frame of the content, with each element including an 8-bit string, the first of which indicates whether or not the associated pixel is occluded or not (e.g., it acts as a foreground mask), with the remaining bits being used to contain one or more integers that indicate the transformation value that non-occluded pixels must be multiplied by, added to or subtracted from in order to reflect the occlusion, texture, luminance, and blur of the host region.

In some embodiments, the merged transformation object is a lightweight data-interchange format, including but not limited to JSON or XML.

Host Region Identification Output, Summary, and Standardization

In some embodiments, the output of host region identification is data defining the location and/or duration of the host region in one or more frames of the target digital content, as well as each frame's necessary transformation objects ("host region defining data").

In some embodiments, the host region defining data includes a list of triples, quadruples, quintuples, or septuples including a frame number, a list of the coordinates—e.g., a series of (x, y) coordinate pairs or (x, y, z) coordinate triples—that bound the host region in that frame, and the homography matrices or separate or merged transformation objects that can be applied to transform the source digital content in that frame.

In some embodiments, the host region defining data includes a list of triples, quadruples, quintuples, or septuples including a frame number, a list of the coordinates of the pixels that compose the host region in that frame, and the homography matrices or separate or merged transformation objects that can be applied to transform the source digital content in that frame.

In some embodiments, the host region defining data includes a list of triple, quadruple, quintuple, or septuple including a frame number, an array, image, or other data structure capturing the shape and location of the host region in that frame, and the homography matrices or separate or merged transformation objects that can be applied to transform the source digital content in that frame.

In some embodiments, the host region defining data includes a starting frame and, for each frame of the host region's duration, a tuple, triple, quadruple, or quintuple including list of the coordinates—e.g., a series of (x, y) coordinate pairs or (x, y, z) coordinate triples—that bound the host region in that frame, and the homography matrices or separate or merged transformation objects that can be applied to transform the source digital content in that frame.

In some embodiments, the host region defining data includes a starting frame and, for each frame of the host region's duration, a tuple, triple, quadruple, or quintuple including a list of the coordinates of the pixels that compose the host region in that frame and the homography matrices or separate or merged transformation objects that can be applied to transform the source digital content in that frame.

In some embodiments, the host region defining data includes a starting frame and, for each frame of the host region's duration, a tuple, triple, quadruple, or quintuple including an array, image, or other data structure capturing the shape and location of the host region in that frame and the homography matrices or separate or merged transformation objects that can be applied to transform the source digital content in that frame.

In some embodiments, the host region defining data includes a starting frame, a starting set of coordinates, and, for each frame of the host region's duration other than the first, a homography matrix that describes the necessary transformation between the starting set of coordinates and the coordinates that bound the host region in that frame.

In some embodiments, where, across all frames of the host region, there is no camera motion and the surface, texture, material, plane, object, place, space, location, or area associated with the host region neither moves nor transforms, the host region defining data is a starting time or frame, an ending time or frame, a single list of coordinates (e.g., sequence of (x, y) coordinate pairs or (x, y, z) coordinate triples) bounding the host region, and a list, one for each frame, of all the homography matrices or separate or merged transformation objects that can be applied to transform the source digital content in that frame.

In some embodiments, where, across all frames of the host region, there is no camera motion and the surface, texture, material, plane, object, place, space, location, or area associated with the host region neither moves nor transforms, the host region defining data is a starting time or frame, an ending time or frame, single list of the positions of the pixels comprising the host region and a list, one for each frame, of all the homography matrices or separate or merged transformation objects that can be applied to transform the source digital content in that frame.

In some embodiments, where, across all frames of the host region, there is no camera motion and the surface, texture, material, plane, object, place, space, location, or area associated with the host region neither moves nor transforms, the host region defining data is a starting time or frame, an ending time or frame, a single array, image, or other data structure capturing the shape and location of the host region in that frame, and a list, one for each frame, of all the homography matrices or separate or merged transformation objects that can be applied to transform the source digital content in that frame.

In some embodiments, host region defining data, along with, potentially, metadata about the host region or the target digital content, is collected in one or more data structures or object specific to the host region ("host region object").

In some embodiments, the target digital content may include more than one host region objects. One or more host regions in the target digital content can be a host region defining data, providing a lightweight summary of the host region defining data and/or its metadata.

In some embodiments, one lightweight version of the host region object merely includes the duration of the host region (in frames), its dimensions, and/or its total number of pixels.

In some embodiments, the host region object is a lightweight data-interchange format, including but not limited to JavaScript Object Notation ("JSON") or Extensible Markup Language ("XML").

In some embodiments, where identified host regions occupy the same frame of target digital content, those host region's host region defining data or host region objects may be merged into "frame objects", with each frame object containing the host region defining data or host region objects for all of the host regions that occupy that frame.

In some embodiments, where identified host regions occupy the same scene of target digital content, those host region's host region defining data or host region objects may be merged into "scene objects", with each scene object containing the host region defining data or host region objects for all of the host regions that occupy that scene.

In some embodiments, frame objects may be regrouped into scene objects, where each scene object contains the frame objects for one or more of the frames comprising that scene.

In some embodiments, all of a video's scene objects are grouped together inside one "content object" that covers all of the scenes for the piece of target digital content.

In some embodiments, all of a video's frame objects are grouped together inside one "content object" that covers all of the frames for the piece of target digital content.

In some embodiments, the host region objects, frame objects, scene objects, or content objects are lightweight data-interchange formats, including but not limited to JSON or XML which contain, in a list, their respective subcomponent objects.

In some embodiments, at some point during or after host region identification, statistics regarding the host region are calculated and added to its metadata or the host region object in order to facilitate the pairing of the host region with source digital content for placement.

In some embodiments, the level of occlusion of the host region across the frames it occupies is calculated and added to its metadata or the host region object.

In some embodiments, the level of occlusion of the host region across the frames it occupies is calculated by counting the number of instances of the binary value representing occlusion in the foreground masks that constitute the occlusion objects, with the occlusion score reflecting those instances as a percentage of the total elements of the masks across all the frames.

In some embodiments, the level of occlusion of the host region across the frames it occupies is calculated and used to generate an "occlusion score" that is added to as metadata to the host region object.

In some embodiments, the occlusion score is weighted to favor levels of occlusion that lie between 0% occlusion and 100% occlusion, with the lowest scores lying at each end of the spectrum and the highest score lying somewhere between those points (e.g., the scale has a normal or skewed parabolic shape). The advantage here is assigning the highest score to host regions with enough occlusion that the placement draws attention (since occlusion often indicates that the action, and thus the interesting part of the content, occurs in or around the host region), but not so much occlusion so as to keep the placement from being noticed.

In some embodiments, the level of visual salience of the host region across the frames it occupies is calculated and added as metadata to the host region object.

In some embodiments, the level of visual salience of the host region across the frames it occupies is calculated and used to generate a "visual salience score" that is added as metadata to the host region object.

In some embodiments, the visual salience score of the host region is calculated by comparing the pixels contained in the host region to some baseline data or heat map that captures the level of salience of pixels based on their location in a frame and has been derived from pre-existing data about the portions of a frame with the highest visual salience.

In some embodiments, the target digital content's metadata related to subject matter, objects, people, or locations is used to select the most appropriate baseline heat map to use for the calculation of the visual salience score. E.g., target digital content that has metadata suggesting its subject matter is football may be paired with a baseline heat map that is specific to football content.

In some embodiments, the target digital content's metadata related to egomotion is used to select the most appropriate baseline heat map to use for the calculation of the visual salience score. For example, target digital content whose egomotion metadata suggests that its subject matter is tennis may be paired with a baseline heat map that is specific to tennis content.

In some embodiments, the level of visual salience is based on some baseline understanding of salience that is derived from real-time or near real-time data tracking they eyeball, head, or body motion of a particular user.

In some embodiments, the highest visual salience score lies between high salience and low salience, with the lowest scores lying at either end of the spectrum (e.g., the scale has a parabolic shape). This is because low visual salience means the host region will not be seen and high visual salience means the host region is likely too close to the focal point of the target digital content and will distract or annoy viewers.

In some embodiments, at any time during or after the calculation of summary statistics, an identified host region may be excluded from further consideration because it fails to satisfy some size or duration threshold or is otherwise deemed unable to favorably host source digital content.

In some embodiments, an identified host region's host region defining data is compared to a set of standard host region sizes and durations ("standard host region dimensions") (e.g., a 200 pixel by 100-pixel rectangle lasting for 100 frames of target digital content) and the host region is associated with the one whose dimensions are nearest to its host region defining data. Associating identified host regions with standard host regions in this way makes it more efficient for collaborators or advertisers (collectively, "interested parties") to request, buy, bid on, and prepare source digital content to for placement on host regions reliably and at scale, and for marketplaces, auctions, or exchanges (collectively, "marketplaces") to efficiently offer identified host regions for order, sale, or bidding.

In some embodiments, the host region defining data is compared to any number of preset, standard host region dimensions and associated with the one whose dimensions are nearest to, but never larger than, its own. This ensures that interested parties are never delivered a smaller host region than they have requested, ordered, bought, or paid for.

In some embodiments, if the host region defining data is compared to any number of preset, standard host region dimensions and it is determined that its dimensions are below those of the smallest standard, then that host region is exempted from future steps in the process and is not paired with source digital content or offered to interested parties.

In some embodiments, once a host region is associated with a standard host region, the standard host region's dimensions, identification code, or other identifying information is added to the host metadata, and/or host region object.

In some embodiments, once a host region is associated with a standard host region, the standard host region dimensions, identification code, or other identifying information is added to the host metadata, and/or the host region object.

In some embodiments, the fact that a host region has been associated with a standard host region, is captured as message, data structure or object that can be transmitted in a lightweight fashion to the source digital content selection module 118.

In some embodiments, although a standard host region (or an indication of one) is delivered to the source digital content selection module 118, once the host region is paired with source digital content, the placement conforms to the original host region's host region defining data (e.g., dimensions).

In some embodiments, when a standard host region (or an indication of one) is delivered to the source digital content selection module 118, once the host region is paired with source digital content, the placement conforms to the standard host region's host region defining data (e.g., dimensions).

In some embodiments, there are no standard host region dimension and, instead, host regions are requested, bought, and bid on a per-pixel per-frame basis (e.g., a there is a price per pixel per frame of placement). Thus a placement of 100 pixels across 10 frames would cost 1000× the per-pixel per-frame price. This negates the need for predetermined standard host region dimensions, while still providing a reliable pricing scheme In some embodiments, where placements on host regions are sold (e.g., to advertisers), after a buyer places an order for a standard host region, the order is filled by placing the buyer's source digital content (e.g., an advertiser's ad or "creative") into newly identified host regions have been associated with that standard, with the placement reflecting the dimensions of the standard host region. For example, if a newly identified 500-pixel×1000-pixel rectangular host region lasting 20 seconds is associated with a standard 300-pixel×600-pixel rectangular host region lasting 15 seconds and sold to a buyer who has placed an order for an instance of that standard host region, the resulting placement of the source digital content on the target digital content will represent a 300-pixel×600-pixel rectangle that lasts 15 seconds.

In some embodiments, where placements on host regions are sold (e.g., to advertisers), after a buyer places an order for a standard host region, the order is filled by placing the buyer's source digital content (e.g., an advertiser's ad or "creative") into newly identified host regions that have been associated with that standard, with the placement reflecting the dimensions of the identified host region. For example, if a newly identified 500-pixel×1000-pixel rectangular host region lasting 20 seconds is associated with a standard 300-pixel×600-pixel rectangular host region lasting 15 seconds and sold to a buyer who has placed an order for an instance of that standard host region, the resulting placement of the source digital content on the target digital content will represent a 500-pixel×1000-pixel rectangle lasting 20 seconds.

In some embodiments, when an identified host region is determined to be large enough to contain more than one standard host region, the host region is parsed and associated with two or more standard host regions.

Storage Before Source Digital Content Selection

In some embodiments, at any point during or after host region identification, a storage module 116 is configured to store the host region defining data, transformation objects, host region object, the target digital content, and/or metadata about the target digital content. In some embodiments, the storage module 116 can be part of the distribution module 114. In other embodiments, the storage module 116 can be part of the host region identification module 110 or can be co-located with the host region identification module 110.

In some embodiments, after receiving the host region defining data, transformation objects, host region object, the target digital content, and/or metadata about the target digital content, the storage module 116 can receive an indication that there has been a request for the target digital content to be viewed and, in response to the request, transmit, to a content integration module 120, a message that includes the host region defining data, transformation objects, host region object, the target digital content, and/or metadata about the target digital content.

In some embodiments, after receiving the host region defining data, transformation objects, host region object, the target digital content, and/or metadata about the target digital content, the storage module 116 is configured to receive an indication that there has been a request for the target digital content to be viewed and, in response to the indication, transmit to the content integration module 120 a message that includes the host region defining data, transformation objects, host region object, the target digital content, and/or metadata about the target digital content.

In some embodiments, upon receiving the message that includes the host region defining data, transformation objects, host region object, the target digital content, and/or metadata about the target digital content from the storage module 116, the content integration module 120 is configured to display the received information. In some cases, the content integration module 120 can include a client-side web browser or other client-side digital content viewing application.

In some embodiments, where the content integration module 120 receiving the message that includes the host region defining data, transformation objects, host region object, the target digital content, and/or metadata about the target digital content from the storage module 116 is a client-side web browser or other client-side digital content viewing application, the host region defining data, transformation objects, host region object, the target digital content, and/or metadata about the target digital content is delivered as part of the web page source code that is delivered to the client-side web browser or other client-side digital content viewing application in response to its requests to view the target digital content (or the web page where it resides).

In some embodiments, where the content integration module 120 receiving the message that includes the host region defining data, transformation objects, host region object, the target digital content, and/or metadata about the target digital content from the storage module 116 is a client-side web browser or other client-side digital content viewing application, and where the host region defining data, transformation objects, host region object, the target digital content, and/or metadata about the target digital content is delivered as part of the web page source code that is delivered to the client-side web browser or other client-side digital content viewing application in response to it when it initially requests to view the target digital content (or the web page where it resides), the web page source code additionally includes a program, instructions, or code (e.g., a "plug-in") that directs the client-side web browser or other client-side digital content viewing application to send, to the source digital content selection module 118, a request for selection of source digital content that includes the host region defining data, transformation objects, host region object, and/or data about the particular impression or about the particular viewer of the target digital content, including but not limited to time and location of impression or individual viewer ID, demographics, or prior content-viewing habits ("impression data"), and to receive the resulting selection.

In some embodiments, the content integration module 120 is co-located with or part of the distribution module 114.

Source Digital Content Selection, Generally

In some embodiments, at any point during or after host region identification, a procedure, function, process, application, computer, or device that is sitting in the network and is dedicated to the selection of source digital content to be placed upon the host region (source digital content selection module 118) receives the host region defining data, transformation objects, host region object, the target digital content, metadata about the target digital content, and/or impression data regarding one or more requested or anticipated views of the target digital content.

In some embodiments, at any point during or after host region identification, a procedure, function, process, application, computer, or device that is sitting in the network receives from the source digital content selection module 118 a selection message containing the source digital content that it has selected to integrate with the target digital content for one or more impressions and/or data about that source digital content or its selection.

In some embodiments, the source digital content selection module 118 is a database that stores the host region defining data, transformation objects, host region object, the target digital content, and/or metadata about the target digital content and makes them searchable and selectable to users, who may select one or more host regions and the source digital content to integrate into them for one or more impressions, returning the selections in a selection message.

In some embodiments, the source digital content selection module 118 is a marketplace or exchange where the source digital content is selected based on a ordering, bidding, or purchasing process, with the returned selection message including other source digital content (e.g., where the marketplace is an advertising marketplace, the bidder or purchaser's advertisement) that the winner or purchases wishes to integrate into the target digital content for one or more impressions In some embodiments, where the source digital content selection module 118 is a marketplace or exchange where the source digital content is selected based on an ordering, bidding, or purchasing process, the ordering, bidding, or purchase, and thus the selection, is automated and made based on inputs such as one or more parties' bid or offer price for one or more impressions of their provided source digital content integrated into host regions of certain dimensions, host regions satisfying a certain standard host region dimension, or host regions whose metadata or whose target digital content metadata satisfies particular preset criteria and/or is compatible with provided source digital content data.

In some embodiments, where the source digital content selection module 118 is a marketplace or exchange where the source digital content is selected based on an ordering, bidding, or purchasing process, with that process being automated, the orderer, bidder, or purchaser has an opportunity to consent to a suggested selection that has been automatically made for them before it proceeds to other steps in the content integration process.

In some embodiments, the source digital content selection module 118 is a marketplace where interested parties may purchase or bid on host regions that have been pre-standardized around a finite set of standards and/or segregated according to dimensions, duration, shape, or level of occlusion or visual salience, pre-standardized based on a finite set of standards, possibly without seeing the target digital content and solely based on indications that inventory that conforms with standard host regions exists, or possibly based on additional metadata about the content such as subject matter or publisher.

Generation and Use of Metadata to Assist Pairing of Host Regions with Source Digital Content In some embodiments, the source digital content selection module 118 uses the target digital content's metadata to pair a host region of a target digital content with source digital content to be placed upon it.

In some embodiments, the source digital content selection module 118 uses the source digital content's metadata to pair a host region with source digital content to be placed upon it. The source digital content's metadata ("source digital content metadata") can indicate, for example, the source digital content's duration, pixel value histogram, mean or average pixel values, audio transcription and/or text, optical character recognition-derived text, creator/publisher (e.g., name, audience size, history of source digital content placements, past target digital content subject matter, and preferred advertisers), subject matter, setting, or the objects, people, textures, materials, locations, or activities that it depicts, or the brand, advertiser, or product represented.

In some embodiments, the target digital content's metadata is generated or supplemented by a process that is run in parallel, at the host region identification module 110 or any other servers, procedures, functions, processes, applications, computers or devices sitting in the communication network, to host region identification and which searches the target digital content or its components for objects, textures, materials, shapes, people, places, spaces, areas, locations, settings, or activities.

In some embodiments, where host region identification relies on comparing the available attributes of the target digital content or its components to the available attributes of pre-constructed object-, texture-, material-, shape-, place-, space-, or area-specific templates and, where there is sufficient similarity, making a determination that the objects, textures, materials, shapes, places, spaces, or areas are or are not represented in the target digital content or its components, a determination that those objects, textures, materials, shapes, places, spaces, or areas are represented in the target digital content or its components is logged as host region defining data.

In some embodiments, the source digital content selection module 118 compares the target digital content's metadata with the source digital content's metadata, in order to make a determination about whether or not to pair the host region of the target digital content and the source digital content.

In some embodiments, the source digital content selection module 118 compares the target digital content's metadata with the source digital content's metadata with the existence of identical, similar, or compatible metadata used to accrue a score that is used to select or rank the source digital content that represents the best pairing with the host region.

In some embodiments, the source digital content selection module 118 transmits, to a content integration module 120 and/or one or more servers, procedures, functions, processes, applications, computers or devices sitting in the communication network, one or more pairings of the host region and source digital content to place upon it, along with, potentially, the target digital content, the host region objects, and/or the source digital content.

In some embodiments, the source digital content selection module 118 receives, from one or more servers, procedures, functions, processes, applications, computers or devices sitting in the communication network, a selection message over the communication network, where the selection message represents the user's approval or ranking of one or more pairings of the host region and source digital content to place upon it.

In some embodiments, the creators, owners, or publishers of the source digital content (e.g., advertisers) append the source digital content with source digital content's metadata that indicates which target digital content's metadata is appropriate, inappropriate, or prerequisite for placement.

In some embodiments, the results of the comparison source digital content metadata that creators, owners, or publishers have appended to source digital content's metadata is used to accrue or decrement a score that is used to select or rank the source digital content that represents the best pairing with the host region.

In some embodiments, metadata can be parsed according to the arrival of new objects, people, or subject matter in the frame at different times. In this way, the arrival of a new object or person (e.g. a celebrity) can trigger the placement of a different type of digital content (e.g., an ad related to that celebrity).

In some embodiments, for the advertising or collaborative use cases, digital content creators associate target digital content and any potential host regions inside it with metadata that indicates what advertisers or collaborators are acceptable or favorable to them and, therefore, which source digital content may be placed up on their target digital content. When a host region is identified and this metadata matches or is compatible with the metadata of a particular piece of source digital content (e.g., it is a brand that exists on in the metadata's list of favorable brands) this is deemed a favorable placement. Conversely, when there is not a match, that source digital content may be downgraded or bypassed. In this way, creators of content can select the brands they would like to work with.

In some embodiments, the creator, owner, or publisher of the target digital content selects those advertisers or collaborators whose source digital content they will or will not allow to be placed on their target digital content, with those selections appended to one or more pieces of existing or future target digital content as metadata.

Transfer to a Content Integration Module

At some point after the selection of the source digital content, one or more servers, procedures, functions, processes, applications, computers or devices sitting in the communication network ("content integration module") may receive the file representing the source digital content or the individual frames which include it and, either immediately or upon request, implement or display the favorable placement of the source digital content within the original content.

Transforming the Source Digital Content for the Integration

At some point during or after the selection of the source digital content, certain steps, in addition to the application of transformation objects, may be taken to transform the source digital content in order to improve its integration into the target digital content. The transformation can be performed in any one or more of the modules described in FIG. 1.

In some embodiments, the source digital content is automatically resized.

In some embodiments, the source digital content is automatically centered inside the host region in order to occupy it in an aesthetically pleasing manner.

In some embodiments, where the surface, texture, material, plane, object, place, space, location, or area associated with the host region has been identified as representing or possessing a particular shape, plane, contour, geometry, or object either (i) automatically adjusting the source digital content to match, cover, attach to, sit atop, surround, interact with, or otherwise engage the shape or object, by selecting, from a library generated alongside the source digital content, an iteration of the source digital content whose particular pose or shape matches that particular shape, plane, contour, geometry, or object.

In some embodiments, where the source digital content is a fully manipulable, three dimensional asset or model and where the surface, texture, material, plane, object, place, space, location, or area associated with the host region has been identified as representing or possessing a particular shape, plane, contour, geometry, or object, the source digital content asset or model is automatically manipulated to match, cover, attach to, sit atop, or otherwise engage that shape, plane, contour, geometry, or object.

In some embodiments, all the pixels that lie between the periphery or border of the source digital content and its edges or textures nearest to that periphery or border are automatically converted into white, translucent, empty, or other colors. This can make the placement feel more immersed without reducing the integrity of the source digital content.

In some embodiments, the source digital content is automatically altered such that it fades in and fades out periodically, changes color periodically, raises or lowers luminance levels periodically, appears to sparkle or glimmer, or otherwise alters periodically in order to garner more attention after its placement.

In some embodiments, the average or median pixel values of the source digital content are compared to the average or median pixel values of the host region and, if they are sufficiently similar, they can be automatically decreased, increased, or otherwise changed from their original values in order to ensure they stand out against the region and/or are not camouflaged when placed. As an example, when any pixel values of the source digital content are sufficiently close to the colors of the host region, they can be inverted (e.g., turned from black to white or low to the opposite); or shifted a number of luminance or color space values away from those of the host region to achieve this.

In some embodiments, different versions of the source digital content, distinguished by their differing color and luminance pixel values, are supplied and the one with farthest difference from the pixel values of the surface, texture, material, plane, object, place, space, location, or area associated with the host region is selected for placement. In this way, it can be ensured that the source digital content stands out as much as possible when placed into the target digital content, yet still represents a pre-approved embodiment.

In some embodiments, the method of texture handling involves making the source digital content or its placement more transparent by converting it to RGBA or another color space with transparency as a channel and then raising the transparency level of that channel. This allows the texture of the host region to be visible underneath or through the source digital content in the placement.

Implementing the Integration

In some embodiments, the content integration module 120 is configured to integrate a source digital content into a host region in the target digital content. The content integration module 120 is configured to accept, as input, the target digital content, the source digital content, data or output (e.g., metadata) that defines the dimension and/or the location of the host region in the target digital content (as well as, if appropriate, metadata surrounding the host region), and/or transformation objects that define the transformations that can be operated on the source digital content prior to the integration into the host region in the target digital content.

In some embodiments, the content integration module 120 is configured to implement the integration by altering and/or creating, re-encoding, or saving a new version of the target digital content with the pixel values inside the host region portion permanently replaced with the pixel values of the source digital content, possibly after their transformation by the various transformation objects. This operation is sometimes referred to as versioning.

In some embodiments, the content integration module 120 is configured to overlay the source digital content over the target digital content during the display of the target digital content to a viewer and, in doing so, rely on the guidance provided by the data or output that defines the dimension and location of host regions in the target digital content (as well as, if appropriate, metadata surrounding the host region) and/or transformation objects that define the transformations for the target digital content to seamlessly integrate with the host region in the target digital content. This operation is sometimes referred to as overlaying.

In some embodiments, during versioning, the integration of the source digital content into the target digital content is smoothed or blended using smoothing algorithms such as Gaussian blur, Poisson blending, or the algorithm described in Perez et al., *Poisson Image Editing*, SIGGRAPH (2003), herein incorporated by reference in the entirety, which allows the luminance and color space values of the source digital content and the target digital content to equalize while maximally preserving the edges or gradients of the source digital content.

In some embodiments, after versioning, the new version of target digital content may be transmitted to a procedure, function, thread, process, application, memory, cache, disk or other storage, database, computer, device, or network for the purpose of immediate or future display, publishing, storage, or sharing, or any other permanent or temporary use.

In some embodiments, after versioning, the frames are streamed on a frame-by-frame basis rather than as one file.

In some embodiments, the content integration module 120 includes a procedure, function, thread, process, application, memory, cache, disk or other storage, database, computer, device, which allows for the sharing or publishing, whether automated or manual, of the new version of the target digital content to various media websites and social networks.

In some embodiments, after versioning, the new version of target digital content is streamed directly from the content integration module 120 to a browser or a viewing application.

In some embodiments, after versioning, new versions of the frames are streamed directly from the content integration module 120 to a browser or a viewing application on a frame-by-frame basis rather than as one file.

In some embodiments, the content integration module 120 from which the new version of the target digital content is also streamed is co-located with the host region identification module 110.

In some embodiments, after versioning, the new version of the target digital content may be streamed or transmitted to the same browser, application, or client from which where the target digital content was initially transmitted in order to begin the process of placing source digital content upon it (e.g., a self-service application aimed at letting users upload target digital content and insert new digital content into it).

In some embodiments, the content integration module 120 is a server belonging to the digital content website or social network to which the target digital content was uploaded to begin with and, after integration, the new version of the target digital content is streamed to the browser of a viewer. This has the advantage of emulating their streaming process for other digital content.

One appealing method of placement involves creating an overlay, of the host region or of the entire frame, that is transparent in any areas meant to be unaffected by the integration of the source digital content and which, when played between the viewer and the target digital content, is in synchronization with the target digital content, gives the appearance that the source digital content (possibly after transformation by various transformation objects) has been embedded in or is part of the target digital content.

In some embodiments, the content integration module 120 that executes this overlay is inside the digital content viewing application (e.g., the browser, monitor, television, or Virtual Reality (VR) goggles), on the client (e.g., viewer) side, and takes as its inputs the host region defining data, host region object, and/or transformation objects, as well as the source digital content.

In some embodiments, where the content integration module 120 that executes this overlay is inside the browser or other digital content viewing application, the content integration inputs (e.g., the host region data, host region objects, transformation objects, and the source digital content) are obtained by requests (e.g., by Asynchronous JavaScript And XML or "AJAX" calls) to external web servers, such as the source digital content selection module 118, and, potentially, the host region identification module 110, storage module 116, and/or distribution module 114, and the protocol or code for integrating the content by (1) making such requests; (2) using the inputs, once received, to transform the source digital content and create the overlay; and (3) synchronizing the overlay with the target digital content all being delivered to the browser or other digital content viewing application inside the source code of the target digital content, of the web page that envelopes it, or of the digital media site or social network hosting it, or inside a plug-in (e.g., Javascript plug-in) associated with.

In some embodiments, where the content integration module 120 that executes this overlay is inside the browser or other digital content viewing application, a buffering mechanism is used to collect transformation objects from an external server in batches, using each batch to transform the source digital content and play it in synch with the target digital content, while also continuing to request and load new batches of transformation objects.

In some embodiments, where the content integration module 120 that executes this overlay is inside the browser or other digital content viewing application, when a view of the target digital content is requested inside a browser or other viewing application, an external request to stream that target digital content is made to a location other than the viewing application or browser (e.g., the same server or network that hosts the host region identification), whereupon that procedure, function, thread, process, application, memory, cache, disk or other storage, database, computer, device, or network gathers the host region data and/or transformation objects as well as the source digital content, possibly by making a request to external web servers, and then transmits or streams both the raw digital content along with the overlay, as separate objects, back to the viewing application or browser where it has been requested, possibly on a frame-by-frame basis, where they are displayed to the viewer as an overlay, that overlay being delivered by a protocol contained in the source code of the target digital content, the web page that envelopes it, or the digital media site or social network hosting it, and/or as a plug-in (e.g. Javascript plug-in) to any of the above.

At some point before or during the implementation process, placements of source digital content on host regions may be merged according to frames, scenes, or file. In other words, different placements may be merged in the same overlay prior to display and different placements may result in different version of the target digital content being created prior to display or storage.

In some embodiments, the content integration module 120 is configured to execute the integration of the source digital content and the target digital content.

In some embodiments, the content integration module 120 is configured to execute the integration of the blend the source digital content and into the target digital content by overlaying the target digital content with a mostly-transparent source digital content overlay (e.g., video overlay such as an HTML Inline Frame Element or "iframe"), played at the same speed and in sync with the target digital content.

In some embodiments, the content integration module 120 exists in the web browser or other client-side digital content viewing application and, driven by the instructions or code in the source code of the target digital content or its web page or the plug-in, executes the integration of the blend the source digital content and into the target digital content by creating an overlay using the host region data or transformation objects, which are contained in the code of the target source digital content or its web page or requested from an intermediate storage module 116 point, in conjunction with the source digital content, which it can obtain via a request to a source digital content selection module 118, to create the overlay. This is appealing because it makes the placement undetectable to the viewer. The appeal of this system is that it involves relatively lightweight transfers of data and is thus scalable.

In some embodiments, the source digital content is associated with a web page or other information and either the entire overlay or any part of the overlay that is not transparent (e.g., the host region or the source digital content) is made clickable such that, if clicked, the browser is immediately directed to that web page, information, or destination.

In some embodiments, the source digital content is associated with a web page or other information and either the entire overlay or any part of the overlay that is not transparent (e.g., the host region or the source digital content) is made clickable such that, if clicked, it adds the web page, information, or destination to a list or "shopping cart" that is presented to the viewer after the end of the source digital content.

In some embodiments, the source digital content is associated with a web page or other information and either the entire overlay or any part of the overlay that is not transparent (e.g., the host region or the source digital content) is made hoverable such that, if hovered over by, for example, a mouse or other pointer, a web page, information, or a destination is revealed (e.g., in a "pop-up" window or bubble) to the viewer.

In some embodiments, host region objects (including the occlusion, luminance, texture, blur or merged transformation objects), which have been stored in the browser, are applied to transform the source digital content that is selected and used to create the overlay, all inside the browser, which is then played atop and in sync with the target digital content, creating the illusion that the source digital content is placed inside the target digital content.

In some embodiments, after its selection, the source digital content is transferred to the content integration module 120 for placing the source digital content into the target digital content by replacing the pixel values in the part of the target digital content comprising the host region with the non-transparent pixel values in the source digital content, and then streaming them to the viewer's browser. This configuration is appealing in the advertising use case because the resulting digital content it is not an advertisement that would be blockable by commercial ad block software such as AdBlock, which operate in the client browser.

In some embodiments, the content integration module 120 can be configured to remove a visible boundary between the source digital content and the target digital content by blending the source digital content and the target digital content using a Poisson image blending technique and/or a similar gradient-based blending technique.

In some embodiments, the content integration module 120 can be configured to modify the shading and/or the lighting of the source digital content to match the shading and/or the lighting of the target digital content. For example, the content integration module 120 is configured to estimate a shading and/or a lighting of the target digital content, re-render the source digital content to match the estimated shading and/or the estimated lighting of the target digital content, and blend the re-rendered source digital content into the target digital content.

In some embodiments, the source digital content selection module 118 is also the streaming location point that both selects the source digital content and places it into the target digital content, possibly by replacing the pixel values in the part of the target digital content comprising the host region with the non-transparent pixel values in the source digital content and then streaming them to the viewer's browser ("combined source digital content selection and streaming point"). This is appealing because it is not blockable by commercial ad block software such as AdBlock.

In some embodiments, the source digital content selection module 118 is a marketplace where interested parties (e.g. advertisers) can, based on the impression data and/or host region data, buy or bid to have their source digital content (e.g., ad) placed on the host region for one or more impressions of the target digital content.

In some embodiments, the source digital content selection module 118 is a marketplace where interested parties purchase or bid on host regions whose host region data, along with their metadata, is stored in a database, with selections being made based on collaborative filtering and other machine learning techniques, when the input is the interested parties' metadata or campaign goals.

In some embodiments, the source digital content selection module 118 can be configured to receive an approval of a suggested selection. The approval can be provided by, for example, a user.

In some embodiments, the source digital content selection module 118 is a marketplace where interested parties can purchase or bid on host regions without seeing the target digital content and solely based on indications that inventory that conforms with standard host regions exists.

In some embodiments, the source digital content selection module 118 is a marketplace where interested parties can purchase or bid on host regions by viewing the original digital in full with the host region identified or by viewing the part of the target digital content that contains the host region.

In some embodiments, the source digital content selection module 118 is a marketplace where interested parties may purchase or bid on host regions that have been pre-standardized around a finite set of standards and/or segregated according to dimensions, duration, shape, or level of occlusion or visual salience, pre-standardized based on a finite set of standards, possibly without seeing the target digital content and solely based on indications that inventory that conforms with standard host regions exists, or possibly based additional on metadata about the content such as subject matter or publisher.

Figure 24:
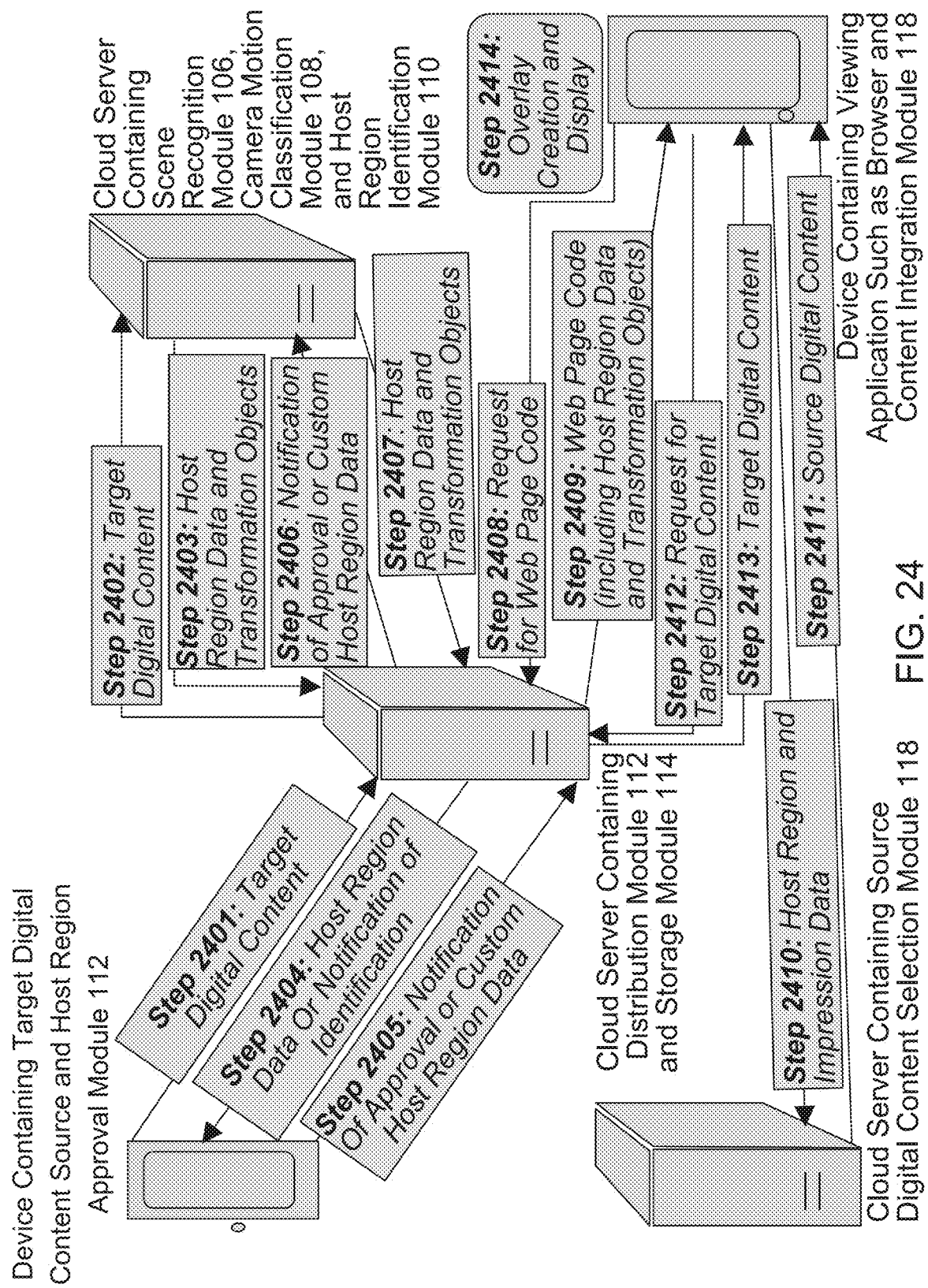
FIG. 24 illustrates a system in which the source digital content is integrated into the target digital content using an overlay method in accordance with some embodiments.

FIG. 24 illustrates a system in which the source digital content is integrated into the target digital content using an overlay method in accordance with some embodiments. FIG. 24 illustrates an embodiment that uses non-marker-based computerized methods to identify host regions in a two-dimensional target digital content (e.g., a video).

Step 2401 represents the transmission, after or while the target digital content is created, of the target digital content or its components from the its captured frames from their target digital content source, which also contain the host region approval module 112, to a distribution module 114 (e.g., a media website or a social network website dedicated to serving digital content), which may operate as or is co-located with storage module 116.

In step 2402, the distribution module 114, transmits the target digital content to a host region identification module 110, which may operate as or is co-located with the scene recognition module 106 and the camera motion classification module 108.

In step 2403, the host region identification module 110 returns one or more instances of host region data and transformation objects to the distribution module 114.

In step 2404, a notification of the identification of host regions or one or more instances of host region data are sent by the distribution module 114 to the target digital content source, which also contain the host region approval module 112.

In step 2405, a notification of approval or customizations of instances of host region data are sent from the target digital content source, which also contain the host region approval module 112, to the distribution module 114.

In step 2406, the distribution module 114 transmits the notification of approval or customizations of instances of host region data to the host region identification module 110 for the preparation of the transformation object.

In step 2407, the host region identification module 110 sends the transformation object to the distribution module 114, where it is integrated into the source code for the web page or application in which the target digital content is viewed and transmitted to storage module 116, which stores it.

In step 2408, a viewing application such as a browser, which also acts as the content integration module 120, issues, to the distribution module 114, a request for the source code of the web page or application in which the target digital content is viewed.

In step 2409, the source code of the web page or application in which the target digital content is viewed, including the host region data and transformation objects, as well as instructions to the source digital content selection module 118, are delivered from the distribution module 114 to the viewing application such as a browser.

In step 2410, the viewing application such as a browser transmits the host region and impression data to the source digital content selection module 118.

In step 2411, the source digital content selection module 118 transmits selected source digital content to the viewing application such as a browser, which also acts as the content integration module 120.

In step 2412, a viewing application such as a browser issues a request, which also acts as the content integration module 120, to the distribution module 114 for the target digital content.

In step 2413, the target digital content is delivered from the distribution module 114 to the content integration module 120, which is also a viewing application such as a browser.

In step 2414, the content integration module 120, which is also a viewing application such as a browser, integrates the source digital content into the target digital content by applying the transformation objects to the source digital content and then displaying it as an overlay on top of the target digital content.

Figure 25:
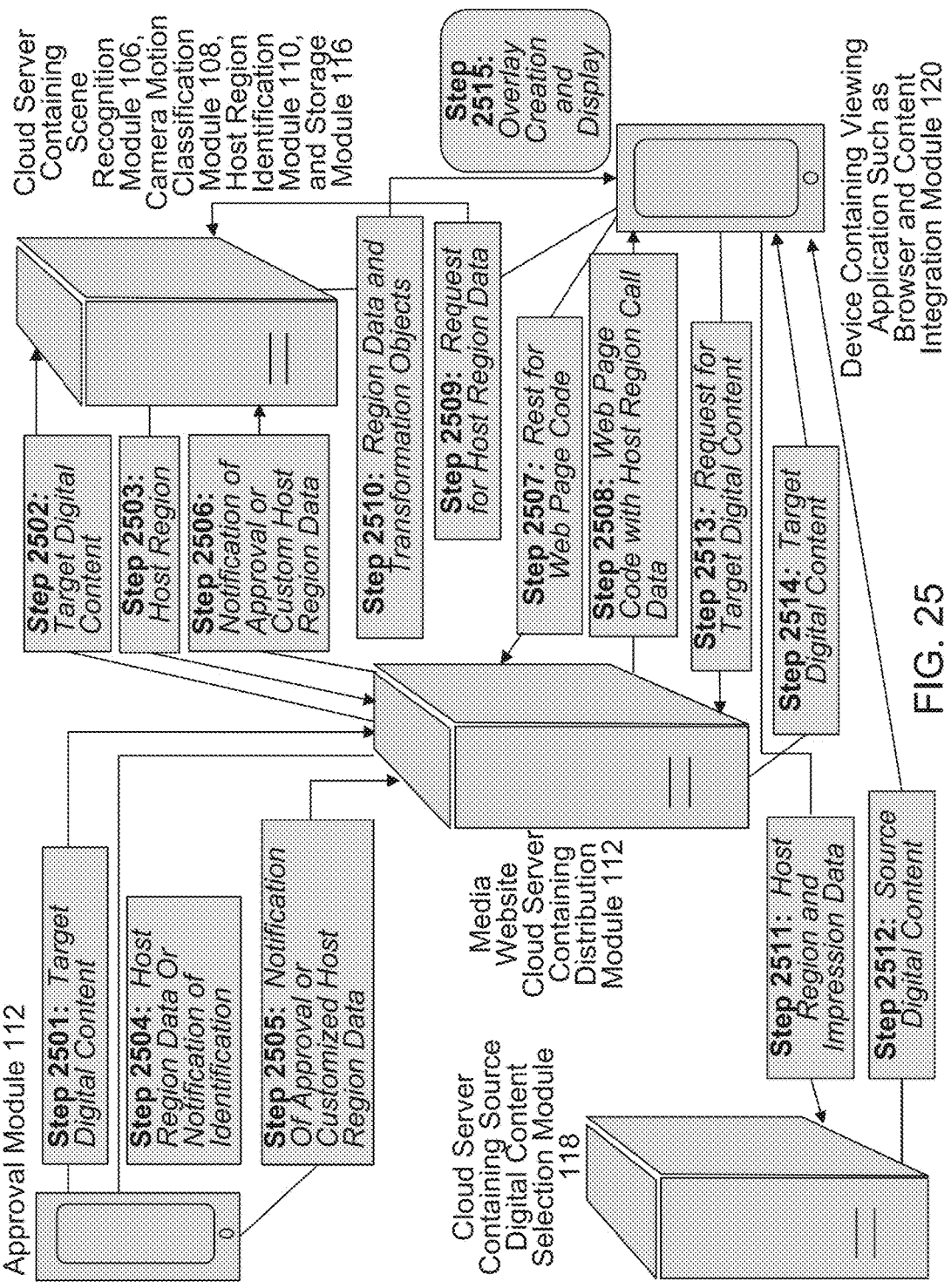
FIG. 25 illustrates a system in which the source digital content is integrated into the target digital content using an overlay method in accordance with some embodiments.

FIG. 25 illustrates a system in which the source digital content is integrated into the target digital content using an overlay method in accordance with some embodiments. FIG. 24 illustrates an embodiment that uses non-marker-based computerized methods to identify host regions in a two-dimensional target digital content (e.g., a video).

Step 2501 represents the transmission, after or while the target digital content is created, of the target digital content or its components from their target digital content source, which also contain the host region approval module 112, to a distribution module 114 (e.g., a media website or social network dedicated to serving digital content).

In step 2502, the distribution module 114 transmits the target digital content to a host region identification module 110, which may operate as or is co-located with the scene recognition module 106, the camera motion classification module 108, and the storage module 116.

In step 2503, the host region identification module 110 returns one or more instances of host region data to the distribution module 114.

In step 2504, a notification of the identification of host regions or one or more instances of host region data are sent by the distribution module 114 to the target digital content source, which also contain the host region approval module 112.

In step 2505, a notification of approval or customizations of instances of host region data are sent from the target digital content source, which also contain the host region approval module 112, to distribution module 114.

In step 2506, the distribution module 114 transmits the notification of approval or customizations of instances of host region data to the host region identification module 110, which prepares the transformation objects and transmits them and the host region data to the storage module 116, which stores them.

In step 2507, a viewing application such as a browser, which also acts as the content integration module 120, issues a request to the distribution module 114, for the source code of the web page or application in which the target digital content is viewed.

In step 2508, the web page source code, along with the host region data and the instructions or data for calling the host region identification module 110 and the source digital content selection module 118, is delivered from the distribution module 114 to the content integration module 120, which is also a viewing application such as a browser.

In step 2509, a viewing application such as a browser, which also acts as the content integration module 120, issues a request for the host region data to the host region identification module 110.

In step 2510, the host region identification module 110 returns the host region data, which it has obtained from the storage module 116, to the content integration module 120, which is also a viewing application such as a browser.

In step 2511, a viewing application such as a browser issues a request for the source digital content, along with data about the host region and the impression, to the source digital content selection module 118.

In step 2512, the source digital content selection module 118 transmits the selected source digital content to the viewing application such as a browser.

In step 2513, a viewing application such as a browser, which also acts as the content integration module 120, issues a request to the distribution module 114 for the target digital content.

In step 2514, the target digital content is delivered from the distribution module 114 to the content integration module 120, which is also the viewing application such as a browser.

In step 2515, the content integration module 120, which is also the viewing application such as a browser, integrates the source digital content into the target digital content by applying the transformation objects to the source digital content and then displaying it as an overlay on top of the target digital content.

Figure 26:
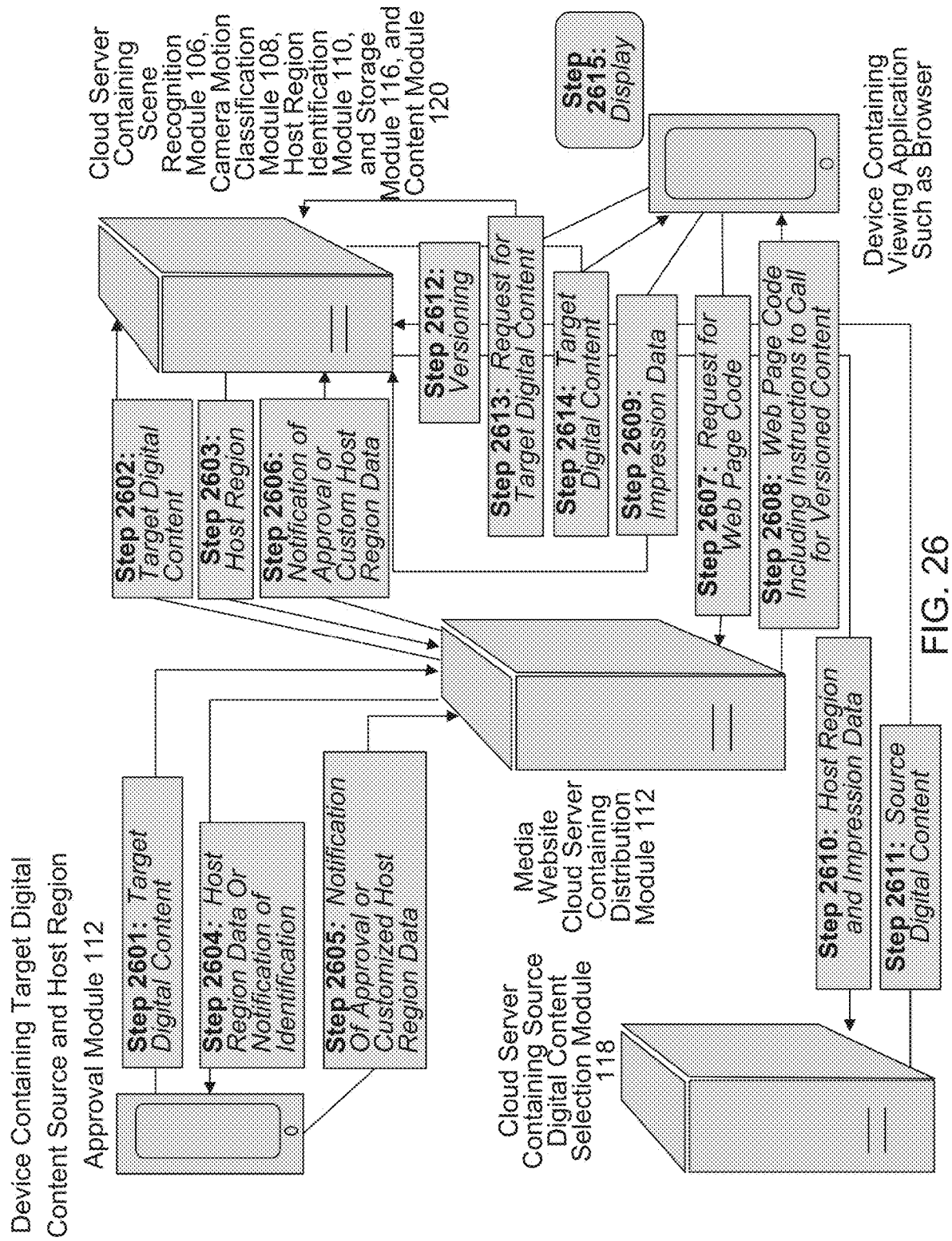
FIG. 26 illustrates a system in which the source digital content is integrated into the target digital content using a versioning method in accordance with some embodiments.

FIG. 26 illustrates a system in which the source digital content is integrated into the target digital content using a versioning method in accordance with some embodiments.

Step 2601 represents the transmission, after or while the target digital content is created, of the target digital content or its components from their target digital content source which also contain the host region approval module 112, to a distribution module 114 (e.g., a media website or social network dedicated to serving digital content).

In step 2602, the distribution module 114 transmits the target digital content to a host region identification module 110, which may operate as or is co-located with scene recognition module 106, the camera motion classification module 108, the storage module 116, and the content integration module 120.

In step 2603, the host region identification module 110 returns one or more instances of host region data to the distribution module 114.

In step 2604, a notification of the identification of host regions or one or more instances of host region data are sent by the distribution module 114 to the target digital content source, which also contain the host region approval module 112.

In step 2605, a notification of approval or customizations of instances of host region data are sent from the target digital content source, which also contain the host region approval module 112, to the distribution module 114.

In step 2606, a notification of approval or customizations of instances of host region data are relayed from the distribution module 114 to the host region identification module 110, which transmits them to the storage module 116, which stores them.

In step 2607, a viewing application such as a browser issues a request to the distribution module 114 for the source code of the web page or application in which the target digital content is viewed.

In step 2608, the web page source code, along with (1) the host region data, (2) instructions to request to send impression data to the host region identification module 110 and/or (3) instructions to route requests for the target digital content to the host region identification module 110, is delivered from the distribution module 114 to the viewing application such as a browser.

In step 2609, the viewing application such as a browser transmits the impression data to the host region identification module 110.

In step 2610, the host region identification module 110 transmits the host region and impression data to the source digital content selection module 118.

In step 2611, the source digital content selection module 118 transmits selected source digital content to the host region identification module 110, which also acts as the content integration module 120.

In step 2612, the host region identification module 110, which also acts as the content integration module 120, integrates the source digital content into the target digital content by creating a new version of it.

In step 2613, a viewing application such as a browser issues a request to the host region identification module 110, for the target digital content. In step 2514, the (new version of the) target digital content is delivered from the distribution module 114 to the viewing application such as a browser.

In step 2614, the viewing application such as a browser displays the new version of the target digital content.

Figure 27:
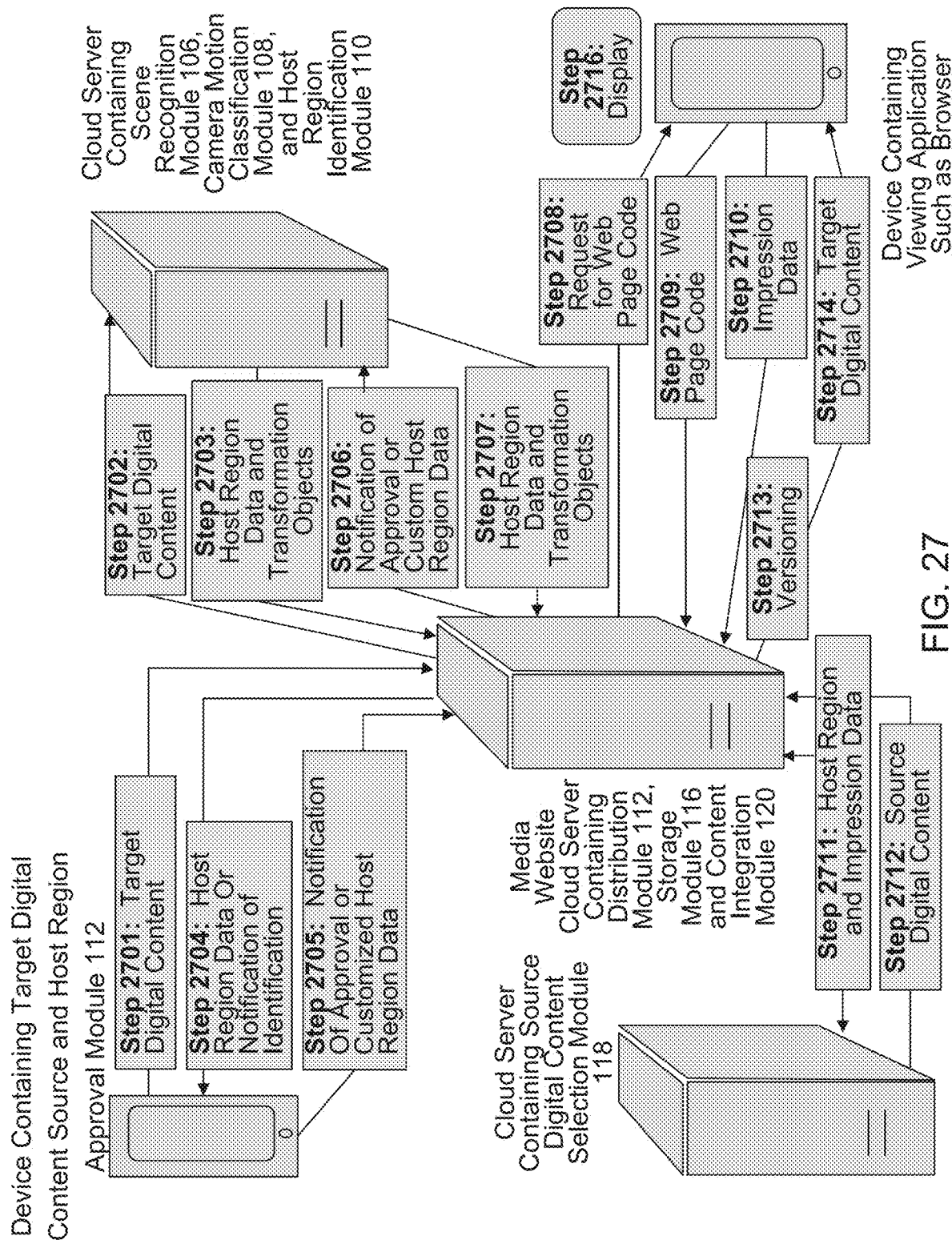
FIG. 27 illustrates outline an embodiment where content integration is implemented using a versioning method in a content integration module in accordance with some embodiments.

FIG. 27 illustrates outline an embodiment where content integration is implemented using a versioning method in the content integration module 120 in accordance with some embodiments. The content integration module 120 is co-located with the distribution module 114.

Step 2701 represents the transmission, after or while the target digital content is created, of the target digital content or its components from their target digital content source, which also contain the host region approval module 112, to a distribution module 114 (e.g., a media website or social network dedicated to serving digital content), which also acts as the storage module 116 and content integration module 120.

In step 2702, the distribution module 114 transmits the target digital content to the host region identification module 110, which may operate as or is co-located with the scene recognition module 106, and the camera motion classification module 108.

In step 2703, the host region identification module 110 returns one or more instances of host region data to the distribution module 114.

In step 2704, a notification of the identification of host regions or one or more instances of host region data are sent by the distribution module 114 to the target digital content source, which also contain the host region approval module 112.

In step 2705, a notification of approval or customizations of instances of host region data are sent from the target digital content source, which also contain the host region approval module 112, to distribution module 114.

In step 2706, a notification of approval or customizations of instances of host region data are relayed from the distribution module 114 to the host region identification module 110, which creates the transformation objects.

In step 2707, the host region identification module 110 transmits the transformation objects the distribution module 114, which transmits them, along with the host region data, to the storage module 116, which stores them.

In step 2708, a viewing application such as a browser issues a request to the distribution module 114 for the source code of the web page or application in which the target digital content is viewed.

In step 2709, the web page source code is delivered from the distribution module 114 to the viewing application such as a browser along with instructions to return the impression data to distribution model 114.

In step 2710, the viewing application such as a browser forwards the impression data to the distribution model 114.

In step 2711 the distribution module 114 transmits the impression data and the host region data, which it retrieves from the storage module 116, to a source digital content selection module 118.

In step 2712, the source digital content selection module 118 transmits selected source digital content to the distribution module 114, which also acts as the content integration module 120.

In step 2713, the distribution module 114, which also acts as the content integration module 120, integrates the source digital content into the target digital content by creating a new version of it.

In step 2714, a viewing application such as a browser issues a request to the distribution module 114 for the target digital content.

In step 2715, the target digital content is delivered from the distribution module 114 to the viewing application such as a browser.

In step 2716, the viewing application such as a browser displays the new version of the digital content.

In some embodiments, the software needed for implementing a process or a database includes a high level procedural or an object-orientated language such as C, C++, C#, Java, or Perl. The software may also be implemented in assembly language if desired. The language can be a compiled or an interpreted language. Packet processing implemented in a host server includes any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable—read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of examples, and that numerous changes in the details of implementation of the disclosure may be made without departing from the spirit and scope of the disclosure, which is limited only by the claims which follow. Other embodiments are within the following claims. For example, the server groups in the host server can each be a logical module running on a single server.

It should be noted that various changes and modifications to the presently preferred embodiments described herein can be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

Those of skill in the art would appreciate that the various illustrations in the specification and drawings described herein can be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware, software, or a combination depends upon the particular application and design constraints imposed on the overall system. Skilled artisans can implement the described functionality in varying ways for each particular application. Various components and blocks can be arranged differently (for example, arranged in a different order, or partitioned in a different way) all without departing from the scope of the subject technology.

The invention claimed is:

1. An apparatus comprising a processor configured to run a computer program stored in memory, wherein the computer program is operable to cause the processor to:
    detect a host region within target digital content for integrating source digital content into the target digital content, wherein detecting the host region comprises:
        determining, using a neural network or by convolving the target digital content with a kernel, a confidence score for each respective pixel in a first frame of the target digital content, the confidence score indicating a probability that the respective pixel is a pixel in a candidate host region; and
        determining, based on the confidence score for each respective pixel in the first frame of the target digital content, a maximal rectangular region in the first frame of the target digital content as the candidate host region, wherein the confidence score for each respective pixel in the maximal rectangular region is greater than a threshold confidence score;
    maintain a count of occluded pixels in the host region in a subsequent frame of the target digital content;
    determine a transformation object based on the occluded pixels, wherein the transformation object specifies a transformation for the source digital content;
    select the source digital content from among available source digital contents, based on the occluded pixels;
    apply the transformation object to the selected source digital content to implement the transformation; and
    integrate the selected source digital content, as transformed by the transformation object, into the host region within the target digital content.

2. The apparatus of claim 1, wherein:
    the computer program is operable to cause the processor to receive host region defining data associated with the target digital content;
    the host region defining data comprises a second transformation object that specifies a second transformation for the source digital content; and
    the computer program is operable to cause the processor to implement the second transformation on the source digital content prior to integrating the source digital content into the host region.

3. The apparatus of claim 2, wherein the transformation comprises replicating at least one of a location, motion, pose, luminance, texture, or a level of blur of the host region.

4. The apparatus of claim 1, wherein determining the confidence score for each respective pixel in the first frame of the target digital content comprises:
    classifying, by the neural network, the respective pixel as associated with a target texture class in a plurality of target texture classes; and
    determining the confidence score based on the classifying.

5. The apparatus of claim 1, wherein the computer program is operable to cause the processor to detect the host region from the target digital content based on at least one of: (1) a level of variance in pixel values, (2) a background segmentation indicating that a pixel of the target digital content corresponds to a background of a scene, (3) an object detected in the target digital content, (4) a machine learning model trained on sample host regions, or (5) a depth map of the first frame.

6. The apparatus of claim 1, wherein the computer program is operable to cause the processor to:
    parse the target digital content comprising a plurality of frames into a plurality of scenes, wherein each scene comprises one or more interrelated frames in the target digital content;
    identify a first host region within a second frame corresponding to a first one of the plurality of scenes; and
    based on a location of the first host region in the second frame, identify a second host region within a third frame corresponding to the first one of the plurality of scenes.

7. The apparatus of claim 6, wherein the computer program is operable to cause the processor to group the plurality of scenes into a first set of scenes and a second set of scenes, wherein the first set of scenes comprises scenes whose camera motion includes a translation less than a threshold percentage of a height or a width of a frame, and wherein the second set of scenes comprises scenes whose camera motion includes a translation greater than the threshold percentage of the height or the width of the frame.

8. The apparatus of claim 6, wherein the computer program is operable to cause the processor to group the plurality of scenes into a first set of scenes and a second set of scenes, wherein the first set of scenes comprises scenes whose camera motion includes a rotation less than a threshold angle, and wherein the second set of scenes comprises scenes whose camera motion includes a rotation greater than the threshold angle.

9. The apparatus of claim 1, wherein the computer program is operable to cause the processor to detect the host region from the target digital content based on a marker identifying a preselected host region within the target digital content.

10. The apparatus of claim 1, wherein the computer program is operable to cause the processor to:

create a gradient image of the first frame of the target digital content;
generate a set of windows and determine, for each window in the set of windows, a respective summation of gradient pixels within the window;
identify a first window within the gradient image in which the respective summation of gradient pixels within the first window is less than a threshold value; and
select the first window as the host region based on the respective summation of gradient pixels within the first window being less than the threshold value.

11. The apparatus of claim 1, wherein the computer program is operable to cause the processor to detect the host region by recognizing an object within the target digital content that is predetermined to be associated with the host region.

12. The apparatus of claim 1, wherein the computer program is operable to cause the processor to detect occlusion in one or more frames in the target digital content by merging a foreground mask and a luminance mask.

13. The apparatus of claim 1, wherein the computer program is operable to cause the processor to track the host region detected in the first frame of the target digital content across a plurality of frames in the target digital content using optical flow.

14. The apparatus of claim 1, wherein the computer program is operable to cause the processor to track the host region detected in the first frame of the target digital content across a plurality of frames in the target digital content by tracking features associated with the host region using optical flow.

15. The apparatus of claim 1, wherein the computer program is operable to cause the processor to integrate the source digital content into the host region in real-time using a web browser.

16. An apparatus comprising a processor configured to run a computer program stored in memory, wherein the computer program is operable to cause the processor to:
receive target digital content comprising a first frame and a second frame that are captured using an imaging device and depict a surface;
identify a relative motion between the imaging device and the surface based on an optical flow between the first frame and the second frame;
determine a transformation between the first frame and the second frame to capture the relative motion between the imaging device and the surface;
detect a first host region on the surface captured in the first frame based in part on a texture of the surface classified or recognized by a neural network;
identify a second host region in the second frame based in part on a location of the first host region in the first frame and the transformation;
create a host region defining data associated with the target digital content, wherein the host region defining data includes a first location of the first host region in the first frame and a second location of the second host region in the second frame; and
maintain a count of occluded pixels in the host region in the second frame of the target digital content;
determine a transformation object based on the occluded pixels, wherein the transformation object specifies a second transformation for source digital content;
select the source digital content from among available source digital contents, based on the occluded pixels;
apply the transformation object to the selected source digital content to implement the second transformation; and
integrate the selected source digital content, as transformed by the transformation object, into the host region within the target digital content.

17. The apparatus of claim 16, wherein the computer program is operable to cause the processor to determine an occlusion mask corresponding to the second frame, wherein pixels in the occlusion mask indicate the occluded pixels in the host region in the second frame.

18. The apparatus of claim 16, wherein:
the computer program is operable to cause the processor to retrieve the target digital content and the host region defining data associated with the target digital content; and
integrating the selected source digital content in the host region within the target digital content comprises integrating the selected source digital content into the first host region in the first frame and the second host region in the second frame identified by the host region defining data.

19. A method comprising detecting a host region within target digital content for integrating source digital content into the target digital content, by:
determining, using a neural network or by convolving the target digital content with a kernel, a confidence score for each respective pixel in a first frame of the target digital content, the confidence score indicating a probability that the respective pixel is a pixel in a candidate host region; and
determining, based on the confidence score for each respective pixel in the first frame of the target digital content, a maximal rectangular region in the first frame of the target digital content as the candidate host region, wherein the confidence score for each respective pixel in the maximal rectangular region is greater than a threshold confidence score;
maintaining a count of occluded pixels in the host region in a subsequent frame of the target digital content;
determining a transformation object based on the occluded pixels, wherein the transformation object specifies a transformation for the source digital content;
selecting the source digital content from among available source digital contents, based on the occluded pixels;
applying the transformation object to the selected source digital content to implement the transformation; and
integrating the source digital content, as transformed by the transformation object, into the host region within the target digital content.

* * * * *